United States Patent

[11] 3,568,155

[72] Inventors Chacko T. Abraham
Yorktown Heights;
Sakti P. Ghosh, Peekskill, N.Y.; Dwijendra
K. Ray-Chaudhuri, Worthington, Ohio

[21] Appl. No. 629,485
[22] Filed Apr. 10, 1967
[45] Patented Mar. 2, 1971
[73] Assignee International Business Machines Corporation
Armonk, N.Y.

[54] METHOD OF STORING AND RETRIEVING RECORDS
9 Claims, 41 Drawing Figs.

[52] U.S. Cl. .................................................... 340/172.5
[51] Int. Cl. .................................................... G11c 15/00, G06f 15/40
[50] Field of Search .................................... 340/172.5; 235/157

[56] References Cited

UNITED STATES PATENTS

| | | | |
|---|---|---|---|
| 3,366,927 | 1/1968 | Falkoff | 340/172.5 |
| 3,317,898 | 5/1967 | Hellerman | 340/172.5 |
| 3,311,887 | 3/1967 | Muroga | 340/172.5 |
| 3,293,619 | 12/1966 | Luhn | 340/172.5 |
| 3,289,175 | 11/1966 | Rice | 340/172.5 |
| 3,243,786 | 3/1966 | Davies | 340/172.5 |
| 3,241,123 | 3/1966 | Boucheron, Jr. | 340/172.5 |
| Re. 26,429 | 8/1968 | Kaufman et al | 340/172.5 |

*Primary Examiner*—Gareth D. Shaw
*Attorneys*—Hanifin and Jancin and John E. Dougherty, Jr.

ABSTRACT: The method is embodied in a data processing apparatus in which a plurality of records, each having a number of different attributes, are stored in the memory file of the machine and the file is then interrogated to retrieve those records which include a particular combination of attributes. The records are first prepared in machine readable form and applied as an input to the machine. The machine circuitry is controlled to store each input record in the memory file of the machine. The attributes for each record are analyzed in predetermined combinations of two or more attributes, and the address for each stored record is stored in one or more buckets in the memory file according to the combination(s) of attributes in each record. After the records are stored, the file is interrogated by applying input queries which specify certain combinations of attributes. From each input query, the machine circuitry is controlled to locate the bucket in which the addresses of all records which satisfy the query are stored. These addresses are then read out and used to retrieve the records themselves from the record file. In order to minimize the redundancy of storage of the addresses of the records, the addresses are grouped in buckets in the memory file in predetermined unique combinations of $k+1$ (e.g. 4) attributes, where $k$ (e.g. 3) is the number of attributes in the queries for which the system is principally designed. In each such bucket the record addresses are arranged in $k+2$ (e.g. 5) subbuckets. The addresses for all records including all of the $k+1$ (e.g. 4) attributes are stored in one subbucket and the remaining addresses in that bucket are stored in the remaining $k+1$ (e.g. 4) subbuckets according to which of the combinations of $k$ (e.g. 3) only of the $k+1$ (e.g. 4) attributes are present in the record identified by this particular address.

INVENTORS
CHACKO T. ABRAHAM
SAKTI P. GHOSH
DWIJENDRA K. RAY-CHAUDHURI

BY John E. Dougherty Jr.
ATTORNEY

STORE CLOCK

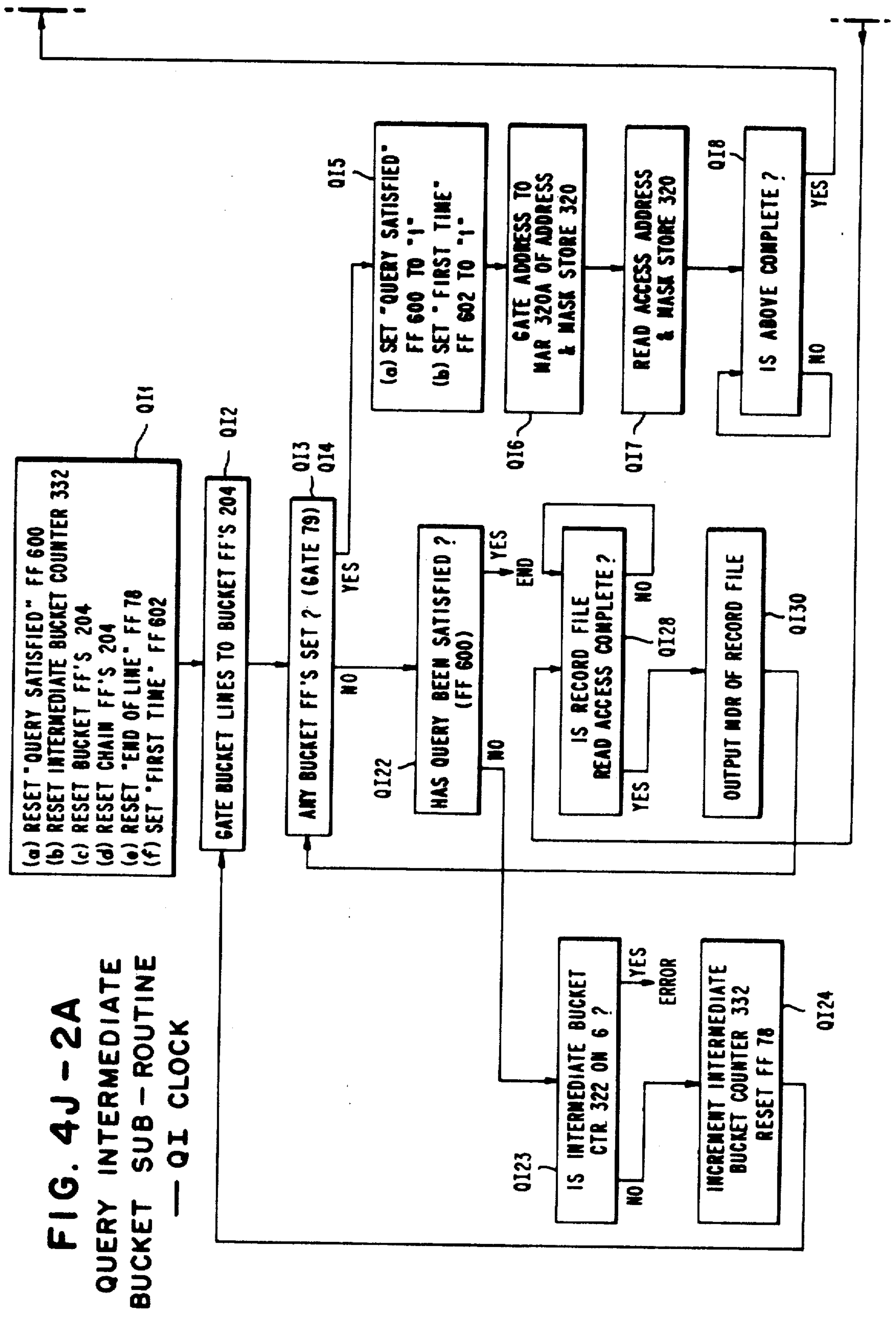
FIG. 4J-2A QUERY INTERMEDIATE BUCKET SUB-ROUTINE — QI CLOCK

MONITOR STORE ROUTINE-M CLOCK

PLANE STORE ROUTINE–P CLOCK

PLANE REDUCTION ROUTINE-PR CLOCK

BUCKET ROUTINE —I CLOCK

LINE ROUTINE — L CLOCK

LINE REDUCTION ROUTINE - LR CLOCK

LINE STORE ROUTINE – LS CLOCK

METHOD OF STORING AND RETRIEVING RECORDS

BACKGROUND OF THE INVENTION

This invention relates to the broad field of information retrieval, and more specifically to a method of operating an information retrieval system using apparatus of the type generally known as data processing machines. Very large numbers of records are stored in such machines, with each record including certain predetermined information relating to a particular person, or thing. Such records include, in many applications, a number of attributes and each record may have a particular value for each attribute. It is often necessary to query the vast memory file of such machines to retrieve records having different combinations of attributes. In accordance with the principles of the subject invention, the records in such a system are stored in the memory file in such a way that records which satisfy input queries specifying certain combinations of attributes may be quickly and efficiently retrieved.

PRIOR ART

A number of different methods have been employed in electronic data processing applications which require rapid retrieval from the memory file of records which possess a specified set of values to the attributes for the records. In many such methods, the records themselves are formatted in the memory file, and queries are applied directly to this file. The records are sometimes arranged in the file in accordance with important attributes and linear search techniques are employed to query the file. Other methods such as batching, key transformation, binary searching, and the use of multiple tables and table hierarchy have been developed and used. It has also been known that search time can be reduced by using a prior probability distribution of the queries in addition to some information on important attributes. Operational systems have also been designed using inverted file techniques. In these systems the records are stored separately and an index of the attributes is also provided. The addresses of the stored records are stored in this attribute index with each address being stored once for each attribute included in the record represented by the address. Chaining between important attributes is sometimes provided in such systems to facilitate searching on these attributes. All of these systems have the disadvantage that they either require too much redundancy in record and/or address storage. Where chaining is employed, the chaining itself can require so much storage space that the file becomes too large and cannot be efficiently and economically queried. Publications which are exemplary of the state of the art are listed below.

a. Gray, H. J., Landauer, W. I., Lefkowitz, D., Litwin, S., and Prywes, N.S., (1961), "The Multiple List System," University of Pennsylvania Report.

b. Baker, F. T., (1963) "Some Storage Organization for Use with Disc Files," IBM Federal Systems Division Report.

c. Buchholz, W., (1963) "File Organization and Addressing," IBM Systems Journal, Vol. 2 pp. 86—111.

d. Davis, D. R. and Lin, A.D., (1965) "Secondary Key Retrieval Using an IBM 7090–1301 System," Communications of the ACM, Vol. 8, No. 4, pp. 243—246.

SUMMARY OF THE INVENTION

The inventive method for organizing a formatted file of records and querying the file to retrieve records having designated combinations of attributes allows the querying operation to be completed, and those records which satisfy the query to be retrieved in a minimum of time. At the same time the method of formatting the records and attributes within the file is such that a minimum amount of redundant storage is required. In the preferred practice of the method, the records themselves are stored only once and the addresses for the records are stored at bucket locations in the file groups in accordance with combinations of attributes.

Since most present day data processing equipment, as well as the memory logic and arithmetic units available to build such equipment is binary, that is the storage is designed to store binary bits and the logic and arithmetic devices are designed to process binary values, the preferred embodiments of the invention disclosed herein are directed to records in which each attribute has only two possible values, one or zero. However, the method can be practiced with attributes, which have more than two values, either using a binary type processor and breaking each attribute down into a group of binary values, or using a processor designed to directly handle attributes having more than two possible values.

In the usual application, the number of storage locations required to store an address is much less than the number required to store a record, and, therefore, there is a considerable saving of storage space achieved by restricting any necessary redundancy of storage to the smaller addresses. As stated above, the addresses of the records are grouped in buckets in accordance with combinations of attributes. The saving in storage space is further enhanced by storing the record addresses in subbuckets within the buckets so that each address is stored only once in any one bucket. For example, consider a file of records each having seven attributes, which is designed principally for queries containing different combinations of two of the attributes. Each record in this example could include seven attribute positions and binary ones are recorded in each of these positions in each record which includes the attribute represented at that position. Each bucket in this system includes the addresses for all of the records which include at least two of a unique set of three of the seven attributes. In each bucket, there are four subbuckets. All of the addresses for records having all three attributes are arranged in one subbucket, and in each of the remaining three subbuckets there are stored those records having one of the three unique combinations of two of the attributes.

During a query operation on any combination of two attributes, the circuit is controlled to identify the particular bucket in which the addresses for records satisfying the query are stored. The one subbucket in that bucket which includes the addresses for all records having all three of the attributes for that bucket is read out, and, in addition, the one of the three remaining subbuckets which stores the addresses of the records which contain the two attributes of the query and not the third attribute of the unique set of three for the bucket.

In the example described above the number of unique combinations of two of the seven attributes is given by the general equation $l\ /(l-k)\ \ (k)$ where $l$ = the total number of attributes, and $k$ = the number of attributes for each query. By substituting $l$=7 and $k$=2, it can be determined that 21 is the total number of unique combinations of two of the seven attributes. These 21 different combinations are divided into unique groups of three with each group constituting one of the buckets described above.

In order to easily and efficiently format any filing problems of this type in proper groups of buckets and subbuckets, which uniquely store addresses for records having unique combinations of attributes, each of the attributes may be considered as a point in a particular finite geometry. By the term finite is meant that the equations used to represent points, lines, solids, etc. in the particular geometry are valid only for finite number of points, lines, solids, etc. in the geometry. The point assigned to each attributes in the particular geometry is identified by a number of coordinate points and where, as here, there are seven attributes, at least three binary orders are required to uniquely represent the seven attributes, and therefore, the seven points. From an examination of finite projective geometry, it is found that there is a mathematical system within the geometry in which a single general equation, $$a_0 x_0 + a_1 x_1 + a_2 x_2 = 0$$

represents seven lines in a single plane and each line includes three points. Each of these points can be identified by three binary coordinates. Each line can be represented by one of seven unique equations within the general equation above, and the particular equation can be determined from the coordinates of two of the points. Thus, this geometry is helpful in establishing the format of the file in which the three attributes corresponding to points on any one of the seven lines are grouped, by combinations, in each of the seven buckets. Further, even though the mathematics of the geometry need not be directly employed in storing and querying records from the file, advantage can be taken of the unique mathematical relationship both in designing special circuitry for the practices of the method, or in controlling more conventional circuitry of the type generally found in data processing equipment. The particular geometry and dimensions necessary within the geometry to allow all of the attributes to be grouped in such a way as to facilitate retrieval, depends on the number of attributes in each record in the file and the number of these attributes which are to be combined in a query.

Therefore, it is an object of the present invention to provide an improved method for storing records in an information retrieval system.

It is a further object of the present invention to provide an improved method of storing and retrieving records in an information retrieval system in which records having different combinations of attributes can be quickly and efficiently retrieved and, at the same time, the amount of redundancy of storage in the file is minimized.

A further object of the present invention is to provide an improved method of the above described type which can be practiced using conventional type data processor circuits.

The foregoing and other objects, features and advantages of the invention will be apparent from the following more particular description of preferred embodiments of the invention, as illustrated in the accompanying drawings.

In the drawings:

FIGS. 1A through 1G, taken together as shown in FIG. 1, show a first embodiment of a file organizational system which is controlled to carry out the invention method for a file retrieval application in which records, each of which include seven attributes, are retrieved in response to queries specifying two of the attributes.

FIGS. 2A through 2C, taken together as shown in FIG. 2, show a second embodiment of a file organizational system which is controlled to carry out the inventive method for the same file retrieval application illustrated in the first embodiment.

FIGS. 3A through 3E taken together as shown in FIG. 3 show a third embodiment of a file organizational system which is controlled to carry out the inventive method for a file retrieval application in which records, each of which include eight attributes, are retrieved in response to queries specifying three of the attributes.

FIGS. 4A through 4K-7 taken together as shown in FIG. 4 show a fourth embodiment of a file organizational system which is controlled to carry out the inventive method for a file retrieval application in which records, each of which include 15 attributes, are retrieved in response to queries specifying three of the attributes.

DESCRIPTION OF PREFERRED EMBODIMENTS

General Description

Figure 1:
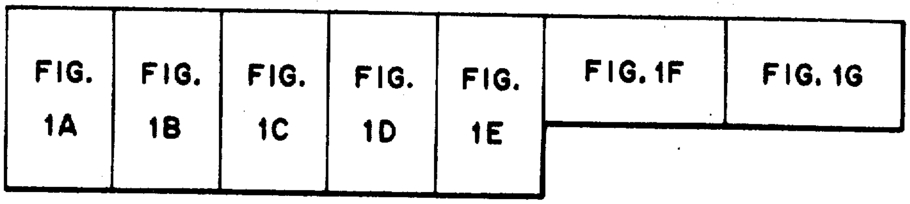

There are four embodiments of the invention disclosed herein by way of illustrating the manner in which the inventive method can be employed to advantage in a number of different record retrieval applications. The first two embodiments, shown in FIGS. 1A—1G and FIGS. 2A—2C, respectively, are both directed to the same record retrieval application, that is, a system in which the records include seven attributes ($l = 7$) and queries are made on combinations of two attributes ($k = 2$). In the first embodiment, a parallel mode of operation is disclosed. In the second embodiment a serial mode of operation is illustrated. The third embodiment, which is shown in FIGS. 3A—3E, discloses circuitry and the method of controlling this circuitry in a serial manner for a record retrieval application in which each record includes eight attributes ($l = 8$) and the queries are made on combination of three attributes ($k = 3$). In the final embodiment of FIG. 4A-4, the records for the application each include 15 attributes ($l = 15$) and queries are made on combinations of three attributes ($k = 3$).

The meaning of the various attributes is of little significance except in those cases in which certain pairs or groups of attributes are mutually exclusive, which of course, limits the number of real combinations of queries that may be applied to the system. In the present embodiments, the attributes are assumed to be independent so that all combinations are real. For example, for the application of the first two embodiments, each of the records may be considered to be a record on an employee and include recorded information such as employee number, salary history, etc., along with the seven attributes. These attributes, which are here designated $A_1$, $A_2$, $A_3$, $A_4$, $A_5$, $A_6$ and $A_7$, indicate the experience background of the individual employee and have the meanings indicated below:

- $A_1$ Accounting
- $A_2$ Administration
- $A_3$ Advertising
- $A_4$ Engineering
- $A_5$ Legal
- $A_6$ Personnel
- $A_7$ Sales If the particular individual has had experience in the particular field, a binary one is entered in the appropriate attribute field, and if not, a binary zero is entered. Thus, the seven attributes $A_1$ through $A_7$ of the record for a person who had accounting, administrative, advertising and legal experience would be recorded as 1 1 1 0 1 0 0 in the attribute field for this record. This record and all of the other records in the particular file are prepared in machine readable form and applied as inputs to the particular data processing machine being used for the application. The attribute field of each record is analyzed and the record itself is stored once in the memory file of the machine. The address of the record in the memory file is stored in one or more of the buckets in another portion of the memory file reserved for that purpose, the particular bucket or buckets in which the address is stored being determined by the attributes in the record. The term memory file, as used here, encompasses the various memory or storage facilities in the data processor or information retrieval system being used for the application. Present day machines usually include random access core memories, random access disc memories, and tape storage facilities. These facilities constitute the memory file of the machine. In the description to follow, that portion of this file in which the records themselves are filed is termed the record file; and that portion of the memory file in which the addresses for these records are stored in buckets, in accordance with various combination of attributes, is termed the attribute file for the machine.

Once all of the records have been stored in the record file and the addresses stored properly in the attribute file, the file may be queried to retrieve records including designated combinations of attributes. These queries are applied as inputs to the machine circuitry which is controlled in response to the query to identify the bucket and subbuckets in the attribute file which store the addresses of the records which match the query. These addresses are read out of the attribute file and used to retrieve the desired records from the record file.

The method for storing the records in the record file and the addresses in the buckets in the attribute file, and for querying this file, is illustrated in different hardware implementations in the four embodiments disclosed herein. These embodiments demonstrate the applicability of the method both to many different types of file retrieval problems and to many types of data processing equipment.

First Embodiments (FIGS. 1A through 1G)

This embodiment of the invention is shown in FIGS. 1A through 1G, assembled as shown in FIG. 1, and is directed to a file retrieval application in which records having seven attributes ($l = 7$) are stored in the file and retrieval operations are carried out on queries specifying two of the seven attributes ($k = 2$). The attributes are designated $A_1$, $A_2$, $A_3$, $A_4$, $A_5$, $A_6$, $A_7$, and consistent with what has been presented thus far, each record has a binary one entered in the appropriate attribute field if the corresponding attribute is included in the record. The two basic operations which must be carried out in this system are the store operation and the query operation. Essentially the same circuits are employed in the system of this embodiment, to both store the records and format the attribute file and thereafter to query the file. Of course, prior to any such operation the format of the file must be determined.

There are 21 $\left(\frac{(l)!!}{(l-k)!!(k)!!}\right)$ unique combinations of two of the seven attributes $A_1$ through $A_7$. The attribute file (designated 10 in FIG. 1D) is formatted into seven buckets to store the addresses of the records in the record file (designated 12 in FIG. 1E). Each of these buckets includes four subbuckets as indicated in the table below:

| | | |
|---|---|---|
| Bucket 1 | sub-bucket 1a | $A_1A_2A_3$ |
| | sub-bucket 1b | $A_1A_2$ |
| | sub-bucket 1c | $A_1A_3$ |
| | sub-bucket 1d | $A_2A_3$ |
| Bucket 2 | sub-bucket 2a | $A_1A_4A_5$ |
| | sub-bucket 2b | $A_1A_4$ |
| | sub-bucket 2c | $A_1A_5$ |
| | sub-bucket 2d | $A_4A_5$ |
| Bucket 3 | sub-bucket 3a | $A_2A_4A_6$ |
| | sub-bucket 3b | $A_2A_4$ |
| | sub-bucket 3c | $A_2A_6$ |
| | sub-bucket 3d | $A_4A_6$ |
| Bucket 4 | sub-bucket 4a | $A_1A_6A_7$ |
| | sub-bucket 4b | $A_1A_6$ |
| | sub-bucket 4c | $A_1A_7$ |
| | sub-bucket 4d | $A_6A_7$ |
| Bucket 5 | sub-bucket 5a | $A_2A_5A_7$ |
| | sub-bucket 5b | $A_2A_5$ |
| | sub-bucket 5c | $A_2A_7$ |
| | sub-bucket 5d | $A_5A_7$ |
| Bucket 6 | sub-bucket 6a | $A_3A_4A_7$ |
| | sub-bucket 6b | $A_3A_4$ |
| | sub-bucket 6c | $A_3A_7$ |
| | sub-bucket 6d | $A_4A_7$ |
| Bucket 7 | sub-bucket 7a | $A_3A_5A_6$ |
| | sub-bucket 7b | $A_3A_5$ |
| | sub-bucket 7c | $A_3A_6$ |
| | sub-bucket 7d | $A_5A_6$ |

Figure 1A:
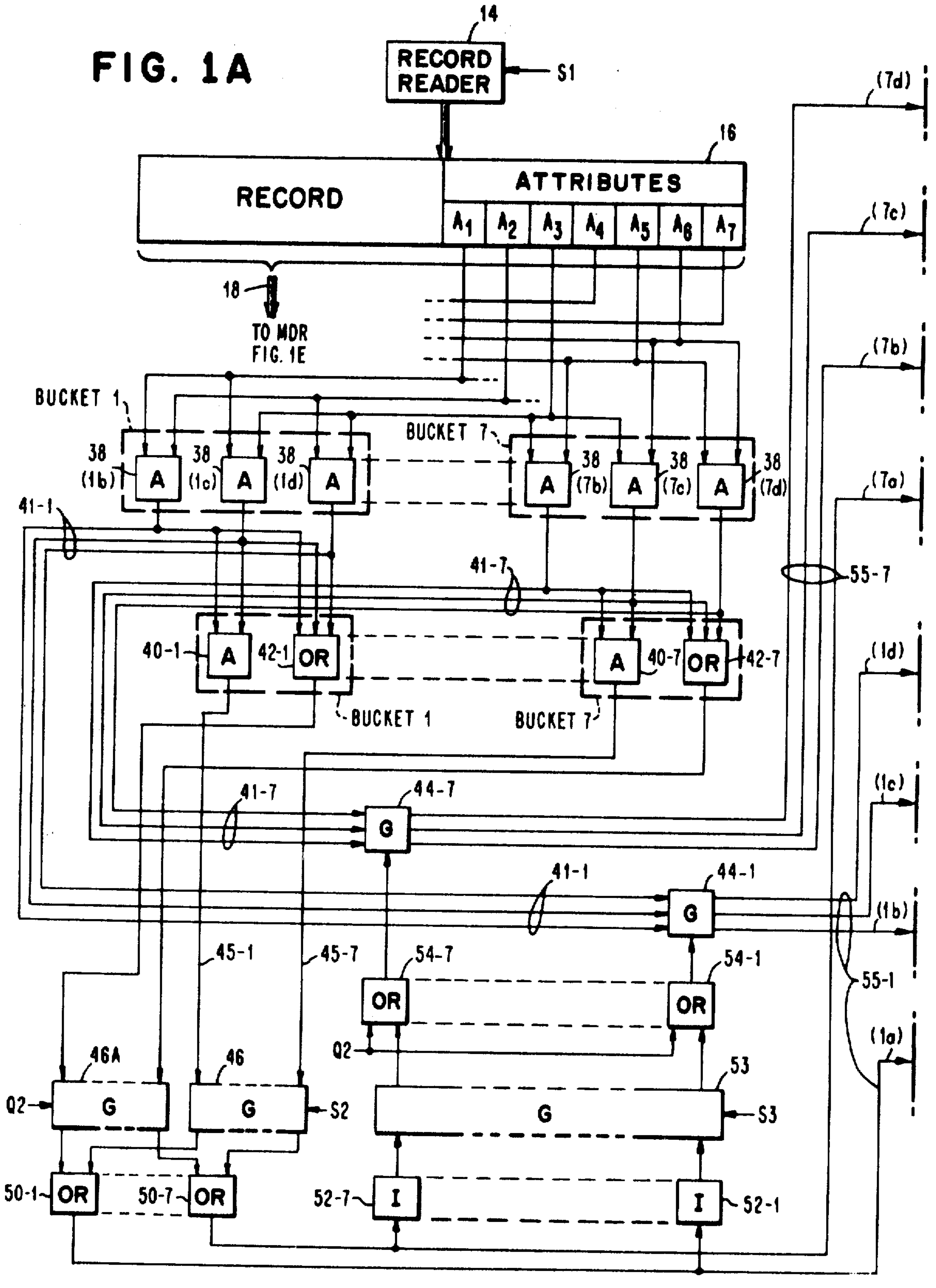
Figure 1B:
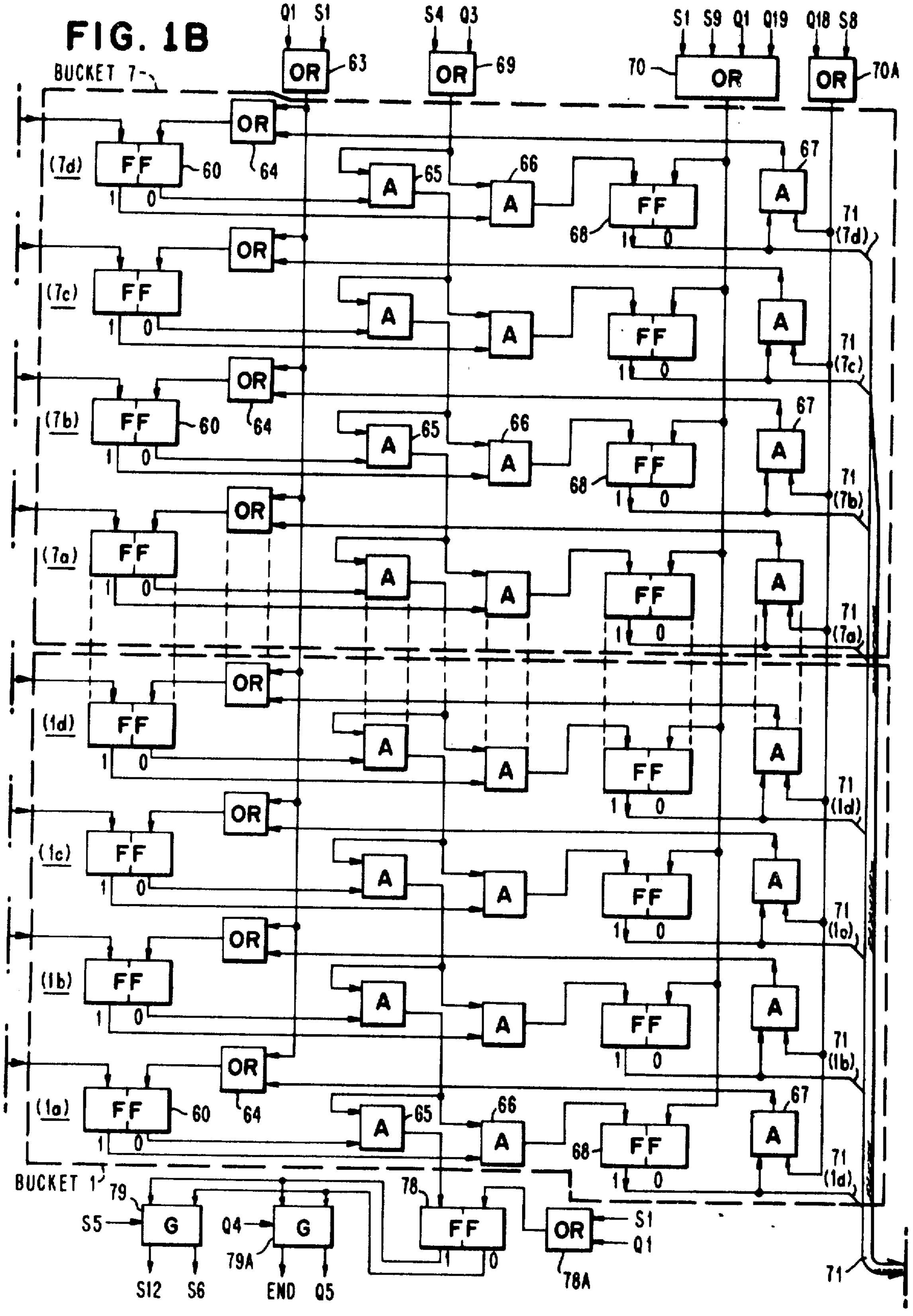
Figure 1C:
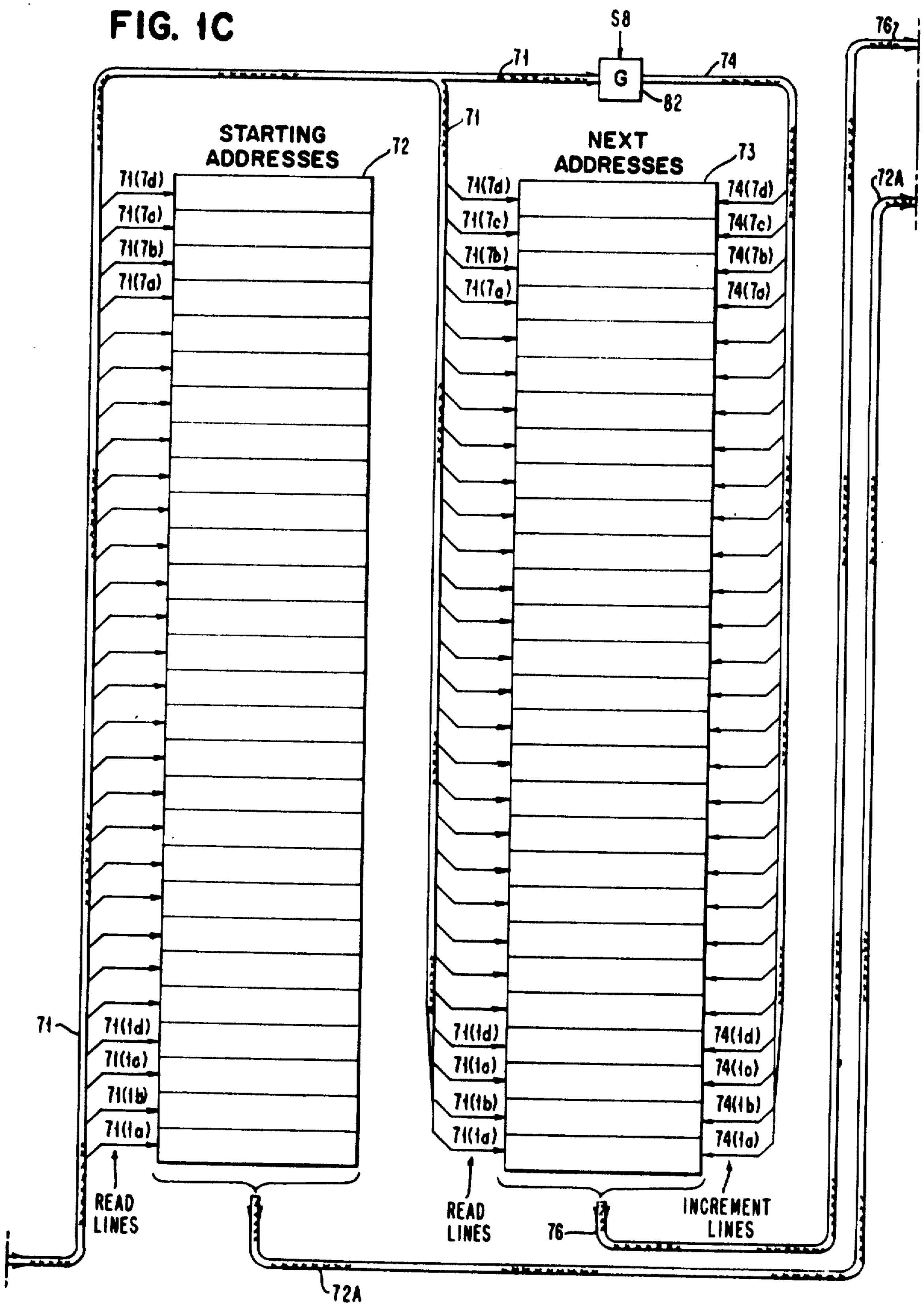
Figure 1D:
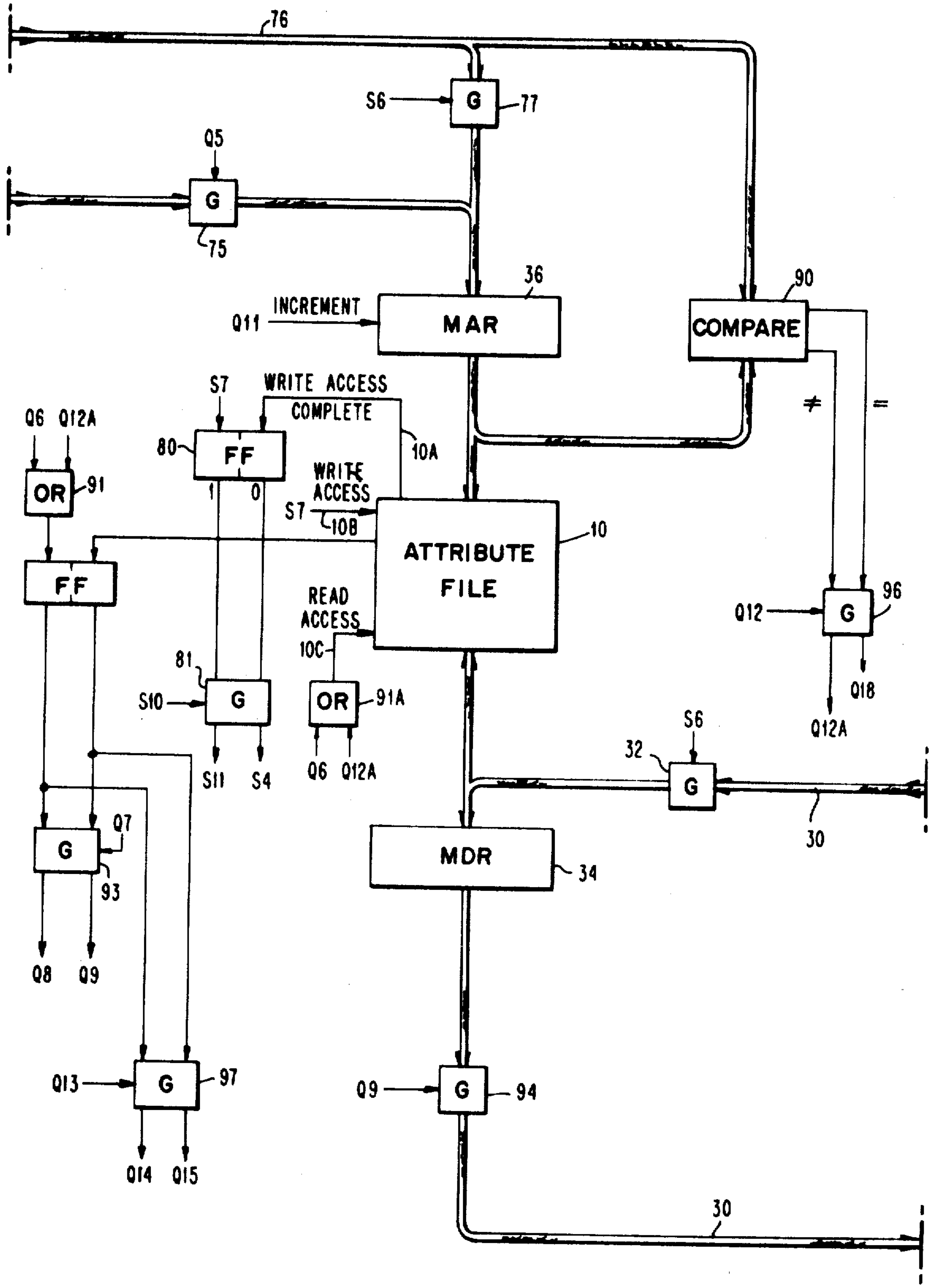
Figure 1E:
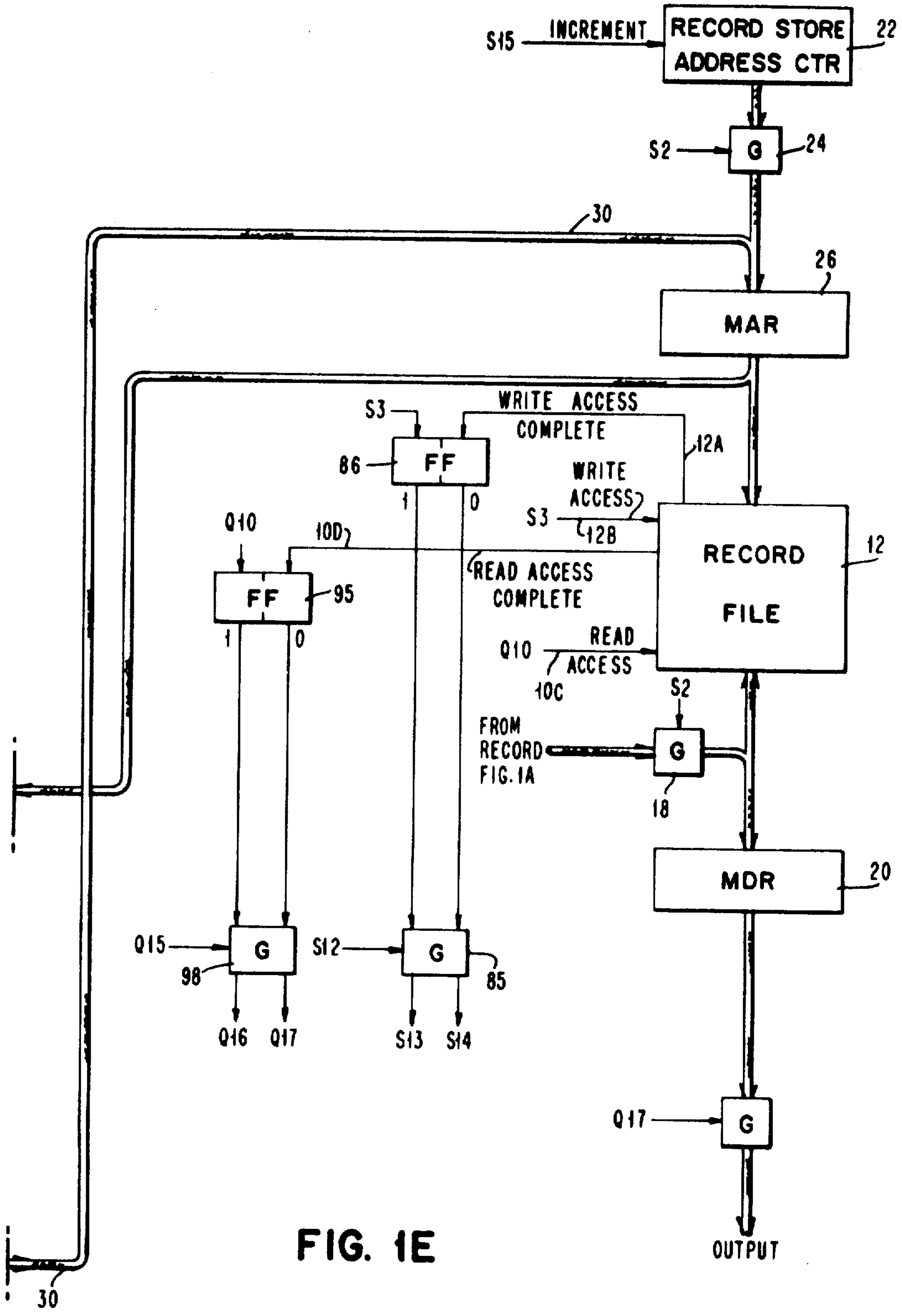

It should be emphasized that the above table illustrating the formatting of the attribute file (10 FIG. 1D) represents the manner in which the addresses for the records stored in the record file 12, FIG. 1E are arranged in the attribute file. As shown, the addresses are grouped in accordance with unique sets of three attributes for each bucket and no subset of two of the attributes is common to anyone of the seven buckets. Further, each bucket is broken down into four subbuckets with the first subbucket including the addresses of all records which contain all three of the attributes for that bucket. In each of the remaining subbuckets the addresses for records which contain a particular combination of two of the unique set of three attributes, but not all three attributes, are stored. With this arrangement, it can be seen that no address is stored more than once in any one bucket. For example, if a record included the attributes $A_1$, $A_2$ and $A_3$, it is stored in the *a* subbucket of bucket number 1 and is not redundantly stored in the remaining three subbuckets of this bucket.

During a store operation it is necessary, of course, to analyze each of the records for the attributes included in the record, to store the record in the record file 12 and to store the address for the record in the appropriate subbucket in the attribute file 10. During a query operation the query is analyzed by the circuitry to determine the bucket in which the appropriate record addresses are stored and from that bucket it is necessary to read out both the *a* subbucket as well as the one of the remaining (*b*, *c*, or *d*) subbuckets for which the particular query combination of attributes is matched. For example, for a query specifying attributes $A_1$ and $A_3$, the addresses stored in both the *a* and *c* subbuckets of bucket number 1 must be necessarily read out and these addresses used to retrieve the records from the record file 12.

Store Operation

Figure 1F:
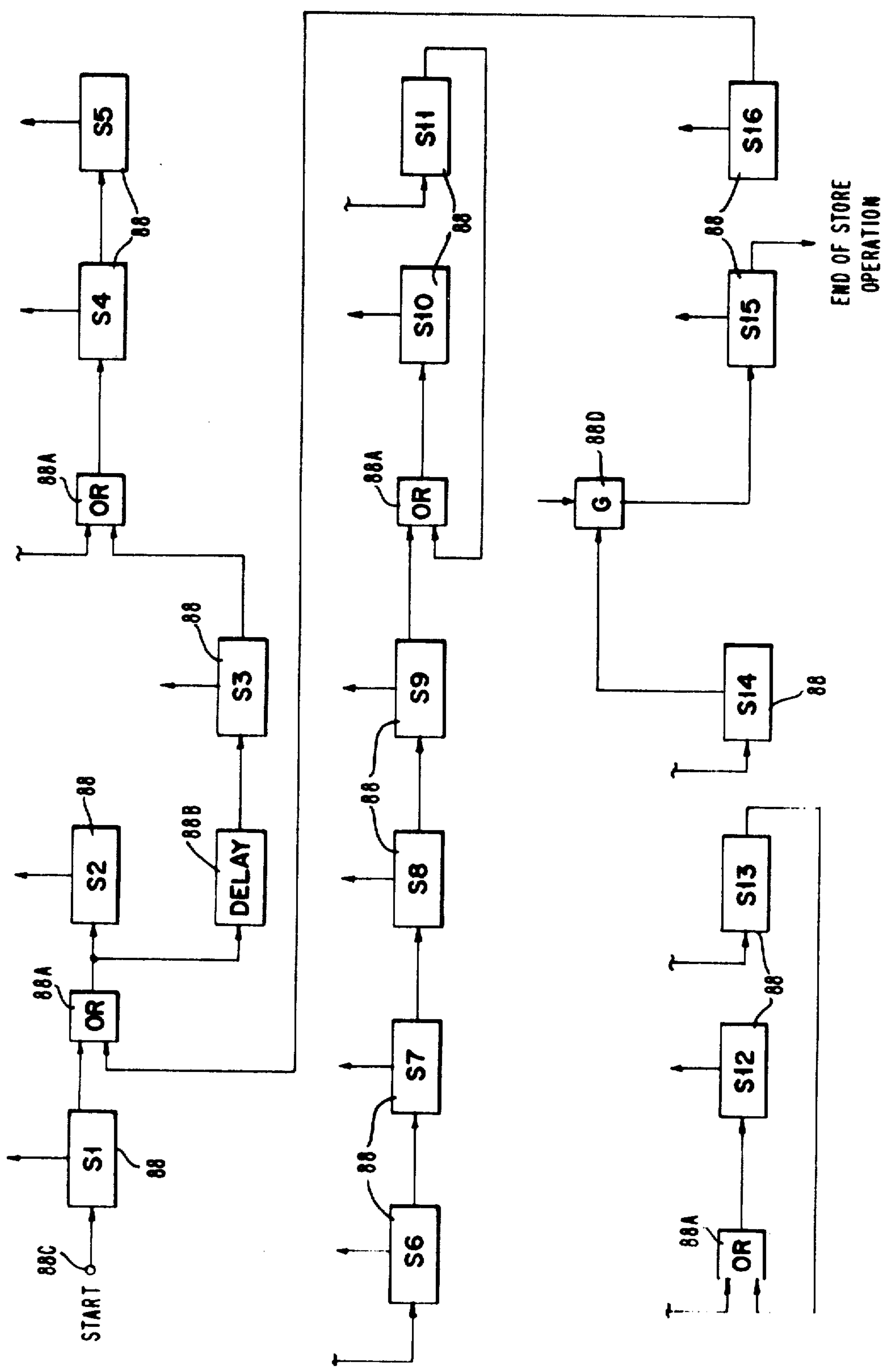

The circuitry of FIGS. 1A through 1G is controlled during a store operation by a series of store clock pulses supplied by a clock pulse circuit which is shown in FIG. 1F. The record to be stored is entered in a record reader 14 in FIG. 1A and under the control of the first or S1 store clock pulse is transferred to a register 16 in which the entire record including the 7-bit attributes field is stored. The record is transferred via cable 18 which extends from FIG. 1A to a gate 18 in FIG. 1E, which is controlled by the second or S2 store clock pulse to enter the record into a memory data register (MDR) 20 for the record file 12. During the same S2 clock pulse, the first available address in the record file is transferred from a record store address control, represented by block 22, through another gate 24 to a memory address register (MAR) 26 for record file 12. During the third or S3 clock pulse the record file is controlled via a line 12B to write the record stored in MDR 20 at the address in the MAR 26. Upon completion of the write operation the record file 12 resets flip-flop 95 to its zero position indicating the end of the write operation in the record file 12.

During the storage of the record itself in the record file the attribute position of the records, that is the field representing the attributes $A_1$ through $A_7$ is analyzed by the circuitry to determine the particular subbuckets in the attribute file in which the address of the record is to be stored. This address is transmitted via a cable 30 in FIG. 1E to a gate 32 in FIG. 1D which is controlled by the S6 store clock pulses at which time the address is entered into a memory data register (MDR) 34 for the attribute file 10. By this time the address of the particular subbucket in which the record address is to be stored will have been transferred to a memory address register (MAR) 36 for the attribute file 10 in a manner described immediately below.

The binary ones and zeros representing the seven attributes $A_1$ through $A_7$ are applied, in combinations of two, to 21 AND circuits 38. Only six of these AND circuits 38 are shown in FIG. 1A. The AND circuits shown are those necessary for the three combinations of the unique set of three attributes for the first bucket, that is attributes $A_1$ $A_2$ and $A_3$, and the three AND circuits necessary for the unique set of three attributes for the seventh bucket, that is $A_3$ $A_5$ and $A_6$. The other 15 AND circuits and their connections are omitted in the interests of avoiding over complicating the drawing with redundant showings of the same circuitry. If it is assumed for the present operation that the record being stored includes attributes $A_1$, $A_2$, $A_3$ and $A_5$, and the 7-bit record file is represented as follows: 1 1 1 0 1 0 0. From the table above of the formatting of the buckets, the address for this record must be stored in the *a* subbucket of bucket number 1, hereinafter termed subbucket 1*a*, and in subbuckets 2*c*, 5*b*, and 7*b*. Each of the 21 AND circuits 38 of FIG. 1A corresponds to a particular subbucket and to facilitate the explanation, the particular subbucket for each of the six AND circuits 38 actually shown in FIG. 1A is indicated in parenthesis in this FIG.

Since the record being considered includes attributes $A_1$, $A_2$ and $A_3$, signals are passed through each of the AND circuits 38 for subbuckets 1*b*, 1*c* and 1*d*. Since the record also include attributes $A_3$ and $A_5$ but not attribute $A_6$, a pulse is passed through the AND circuit 38 for subbucket 7*b*. Pulses are also passed through the AND circuits 38 for subbuckets 2*c* and 5*b* which are not shown in the FIG. The operation of these AND circuits and the other logical circuitry for buckets 2 and 5 is exactly the same as that for bucket 7, which is shown, since, in each of these buckets, two of the unique set of three attributes for the particular bucket are present in the record.

The first level of logic includes seven AND circuits 40 and seven OR circuits 42 with only the two AND and OR circuits for buckets 1 and 7 being shown in FIG. 1A. The OR circuits 42 are not necessary for the store operation but are used during the query operation which will be hereinafter described. The outputs of the three AND circuits 38 for bucket number 1 are fed directly via lines 41–1 to a gate 44–1 and the outputs of the three AND circuits 38 for bucket 7 are fed via lines 41–7 to a similar gate 44–7 for that bucket. At the same time the AND circuit 40–1, for bucket 1, has both of its inputs energized by outputs from AND circuits 38 for subbuckets *1b* and *1c* since all three of the attributes $A_1$, $A_2$ and $A_3$ are present in the record. The output of this AND circuit 40–1 for bucket number 1 is fed to a gate 46 which is controlled by the second of the store clock pulses S2. No signal is passed at this time through the AND circuit 40–7 for bucket 7 since, with the input record containing only two of the three attributes for that bucket, only the AND circuits 38 for subbucket *7b* is energized. It is only this signal from this subbucket which is transmitted via lines 41–7 to gate 44–7. The same is true for the circuitry for subbuckets *2c* and *5b* which is not shown in detail.

As stated above a signal is passed through the circuit 40–1 for bucket 1 via line 45–1 to gate 46 and no signal is transmitted through AND circuit 40–7 via line 45–7 to this same gate. The outputs of this gate 46 are applied as inputs to seven OR circuits 50, one for each bucket, only two of which, 50–1 and 50–7, are shown in FIG. 1A. These OR circuits receive inputs during a store operation from gate 46 under control of the S2 clock pulse. In the example being considered, with a signal on line 45–1 and no signal on 45–7, a signal is transmitted through gate 46 to OR circuit 50–1. At the same time OR circuit 50–7 does not receive a signal. The outputs of OR circuits 50–1 and 50–7 are connected, as shown to corresponding inverter circuit 52–1 and 52–7. Again, only two of the necessary seven inverter circuits are shown. The output of these inverters is applied to a gate 53 which is controlled by the S3 store clock pulse which begins after and is terminated before the S2 clock pulse. Due to the inverting action, a signal is then passed through this gate 53 to an OR circuit 54–7 for bucket 7 and no signal is passed with the OR circuit 54–1 for bucket 1. The output of OR circuit 54–7 is applied to activate gate 44–7 so that the signal on line 41–7 can be transmitted through this gate. Lines 41–7 are connected to the AND circuits 38 for subbuckets *7b*, *7c* and *7d*. For the example being considered with attributes $A_3$ and $A_5$ present and attribute $A_6$ not present, only the AND circuit 38 for subbucket *7b* produces an output signal and this signal is then transmitted through gate 44–7.

The three output lines from gate 44–7 are combined with the output of OR circuit 50–7 to form a group of four output lines generally designated 55–7 which group of lines correspond to the four subbuckets of bucket 7. In the example being considered there is a signal present only on the one of these lines which is the line for subbucket *7b*. This is proper in accordance with the formatting scheme being employed, since with only two of the unique set of three attributes for this bucket being present, that is attributes $A_5$ and $A_6$, the address of the record should be entered only in subbucket *7b*. The operation is exactly the same for subbuckets *2c* and *5b*.

As noted above, due to the action of inverter circuit 52–1 receiving a pulse from OR circuit 50–1, no signal is passed through gate 53 to OR circuit 54–1. Therefore gate 44–1 is not activated to pass the signals on each of the three lines 44–1 through this gate. This gate is not opened at this time, since with the three attributes for bucket 1 present, the address of the record is stored only in the subbucket *1a* of the first bucket. The group of four lines representing the four subbuckets of the first bucket are generally designated 55–1. Three of these lines are outputs of gate 44–1 and the four line is the output of OR circuit 50–1, which is the only one of these lines which, at this time, is carrying a signal. This is in accordance with the formatting method, since this line, as is indicated on the drawing, is the line for subbucket *1a*.

Each of the eight lines in the two groups of four, 55–7 and 55–1, extend from FIG. 1A to FIG. 1B. Each line is applied to the binary one input of a corresponding one of eight flip-flops 60 which are shown in this FIG. The upper four flip-flops correspond to the four subbuckets *7d*, *7c*, *7b* and *7a* of the seventh bucket and the lower four flip-flops 60 correspond to the four subbuckets *1d*, *1c*, *1b* and *1a* of the first bucket. The other 20 flip-flops 60 for bucket two through six, are not shown in the FIG.

For the example under consideration, and the circuitry shown in detail, there are signals present only on the line for subbucket *7b* (third from the top), and the lowermost line for subbucket *1a*, and, therefore, only the two flip-flops 60 connected to these lines are set in the binary one condition. Prior to this time each of these flip-flops has been reset at the beginning of the store operation by the S1 store clock pulse which is applied through an OR circuit 63 to eight OR circuits 64, each of which has its output connected to the zero input of a corresponding one of the flip-flops 60.

As a result of the operation thus far described, four of the 28 flip-flops 60 (for subbuckets *1a*, *2c*, *5b*, *7b*) are set in their binary 1 condition prior to the application of the S4 store clock pulse to the circuit. Only the flip-flops 60 for subbuckets *1a* and *7b* are shown in the FIG. Each of the flip-flops 60 has associated with it, in a horizontal row across FIG. 1B, three AND circuits 65, 66 and 67 and another flip-flop 68. Each circuit is the same only the circuitry for the first and seventh buckets is shown, there being similar circuitry provided for each of the four subbuckets in each of the other five buckets in the attribute file of the present system.

The S4 store clock pulse is applied to an OR circuit 69 shown at the top of FIG. 1B and the output of this OR circuit is applied to the one input of the AND circuits 65 and 66 for the top row of circuitry in FIG. 1B, which is the circuitry for subbucket *7d*. At the same time the other input of AND circuit 65 for this row is connected to the zero output of flip-flop 60 and the other input of AND circuit 66 is connected to the one output of flip-flop 60. At this time, flip-flop 60 in the top row is storing a binary zero and, therefore, a signal is passed through AND circuit 66. This signal is propagated in the same manner through AND circuit 65 of the second row (subbucket *7c*) and thence through the AND circuit 66 of the third row (subbucket *7b*) where the corresponding flip-flop 60 is storing a binary one.

The S4 store pulse is thus transmitted at this time through this AND circuit 66 for row 3 to the binary one input of the corresponding flip-flop 68. This flip-flop has previously been reset to its binary zero condition along with the other flip-flops 68 by the S1 clock pulse applied through an OR circuit 70 at the beginning of the store operation. When flip-flop 68 is switched to its binary one condition, a signal is transmitted to the binary one output of this line, which is designated 71, and as indicated, is the line corresponding to subbucket *7b*.

This signal on line 71 for subbucket *7b* is transmitted on cable 71 to FIG. 1C on which FIG. there are shown first and second groups of 28 registers represented by blocks 72 and 73. The 28 registers 72 store the starting addresses in the attribute file for the 28 subbuckets in that that file; the 28 registers 73 store the next unused address in each subbucket. The line 71 for subbucket *7b* applies to readout input to both of these registers for this subbucket. The output of the starting address register 72 is used only on query operations (under control of gate 75 shown in FIG. 1D) and is not considered here. However, the line 71 for subbucket *7b*, which applies a readout signal to the corresponding next address register 73, causes the next empty address for subbucket *7b* to be read out and transmitted via a cable 76 to a gate 77 (FIG. 1D) which is controlled by the S6 store clock pulse.

The S6 clock pulse is not delivered automatically by the clock pulse source but is derived from a circuit shown at the bottom of FIG. 1B. This circuit is controlled by a flip-flop 78 which is initially set at zero by the S1 clock pulse through an OR circuit 78A. This flip-flop is not reset until the record address has been stored in all of the necessary subbuckets in the attribute register at which time it is set to its binary one condition in a manner to be described below. It suffices for the present that the binary zero output of flip-flop 78 is gated at S5 time through a gate 79 to initiate the S6 clock pulse.

This pulse, when applied through gate 77 in FIG. 1D, causes the next empty address for subbucket 7*b* to be gated to the MAR 36 for the attribute file 10. At the same time the S6 pulse is applied to gate 32 to enter the record address into the MDR 34 for the attribute file. The next S7 clock pulse is applied via a line 10B to initiate a write operation in attribute file 10 during which the record address in MDR 34 is stored in the attribute file at the subbucket address then present in the MAR 36.

The S7 pulse is also applied to a flip-flop 80 in FIG. 1D to set this flip-flop to its binary one condition. This flip-flop is reset to its zero condition by a signal received from the attribute file 10, on a line 10A, which indicates that the write access operation is completed. The binary one and zero outputs of flip-flop 80 are applied as inputs to a gate 81 which is activated at time S10. When flip-flop 80 is storing a one indicating the write operation is not complete, an S11 output is produced. The S11 output is merely a delay output that causes the S10 pulse to be repeatedly applied until flip-flop 80 has been reset to zero, thereby allowing a signal to be passed through gate 81 to initiate a new series of store pulse beginning with the store pulse S4.

Prior to the application of the S10 pulse, the S8 and S9 pulses are applied to OR circuits 70 and 70A in FIG. 1B and clock pulse S8 is also applied to a gate 82 in FIG. 1C. OR circuit 70A, in response to the S8 pulse applies a signal to the one input for each of the AND circuits 67. At this time the only one of the flip-flops 68 which is in the binary one condition is the one in the third row (subbucket 7*b*) and, therefore, the S8 pulse produces an output only at the AND circuit 67 in this row. This output is passed through OR circuit 64 to reset flip-flop 60 to the binary zero condition. This indicates that the record address has been stored in the proper location of subbucket 7*b* of the attribute file.

At the same time the S8 pulse is applied to gate 82 in FIG. 1C to allow the signal on the line 71 for subbucket 7*b* to be transmitted to a corresponding one of the lines 74 which apply increment inputs to the next address register. At this time only the register storing the next address for subbucket 7*b* is incremented since the address previously stored has been used in storing the present record in the attribute file.

The S9 pulse when applied to OR circuit 70 in FIG. 1B resets the flip-flop 68 in the third row to zero. Another store clock cycle is instituted beginning with the S4 pulse produced when the S10 clock pulse is applied to gate 81 in FIG. 1D. The S4 pulse is applied through OR circuit 69 in FIG. 1B. All of the flip-flops 60 and 68 in this FIG. are at binary zero with the exception of the three flip-flops 60 for subbuckets 2*c* and 5*b*, which are not shown, and the flip-flop for subbucket 1*a* which is shown in the bottom row of circuitry on this FIG.

Since the store operation is the same for each of the subbuckets, the operation for storing the record address in subbuckets 2*c* and 5*b* is not here described. Let it be assumed that the record address has been stored in each of these subbuckets and when the store clock pulse cycle is begun again at S4 time, the flip-flop 60 for the bottom row (subbucket 1*a*) is in the binary one state.

Each of the AND circuits 65 is connected to the zero output of the associative one of the flip-flops 60 and each of the AND circuits 66 to the one output of the associated flip-flops 60. The S4 pulse passes through all of the AND circuits 65 but the one in the bottom row (subbucket 1*a*) where the pulse is directed through AND circuits 66 to set flip-flop 68 in its binary one condition. With this flip-flop set in this condition, the succeeding clock pulse operate in the manner described above to control the circuitry to fetch the next address for subbucket 1*a* from address register 73 in FIG. 1C and thereafter to cause the record address to be written at this address in the attribute file 10 in FIG. 1D.

Upon completion of this operation of storing the record address in subbucket 1*a*, the S4 pulse is as before delivered through gate 81 in FIG. 1D. By this time the S8 pulse has already incremented the next address register in FIG. 1C and reset flip-flop 68 in the bottom row of FIG. 1B. The S9 pulse has reset flip-flop 60 in the bottom row so that all of the flip-flops 60 and 68 are at zero when the S4 pulse is applied. This pulse is thus directed through all of the AND circuits 65 to set flip-flop 78 at binary one. The S5 pulse, then applied to gate 79, produces a further clock pulse S12 which is applied to a gate 85 shown in FIG. 1E. This gate has its two inputs connected to the binary one and zero outputs of a flip-flop 86. This flip-flop is set at binary zero when the record write operation has been completed in record file 12. A pulse then passes through gate 85 to produce an S14 clock pulse. If the flip-flop 86 has not been set to one at S12 time, the S13 pulse which is produced merely causes the S12 pulse to be reapplied until the record store operation is complete. The S14 pulse here produces no effect except to step the clock to S15 which pulse is applied to the record store address counter 22 in FIG. 1E to increment this counter so that the next record will be stored at this address. At the same time the S15 pulse produces a signal indicating the completion of the store operation.

This is illustrated in FIG. 1F in which the circuitry for producing the store clock pulses is shown. This circuit is made up of a number of single shot circuits 88, OR circuits 88A and a delay circuitry 88B. The store operation is initiated by applying a start signal to a terminal 88C. In order to simplify the overall circuit description this same circuit is used not only in the first embodiment described here, but in the other embodiments later to be described. It is for this reason that the single shot circuits for clock pulses S14 and S16 are shown, though neither of these pulses are necessary to the operation of the first embodiment. A gate circuit 88D is shown connecting the output of the single shot 88 for S14 to the input of the single shot 88 for S15. This gate is activated by a signal maintained at its input only during the mode of operation for storing in the first embodiment which has been described above.

Query Operation

Query operations are performed in the embodiment of FIG. 1 on inputs which specify a particular combination of two of the seven attributes. These queries are entered into the attribute section of register 16 in FIG. 1A, by entering a binary one for each of the two attributes in the query and binary zeros in the other five attribute positions. The query may be entered in the attribute section of register 16 in much the same manner as a record is entered during a storage operation. The circuit is controlled during a query operation by Q pulses supplied by a query clock shown in FIG. 1G. For the present let it be assumed that the query specifies the combination of attributes $A_1$ and $A_2$. For such a query it is necessary to first retrieve from the attribute file all of the addresses in the *a* and *b* subbuckets of the first bucket in attribute file 10, and using these addresses to read out the corresponding records from record file 12.

The first or Q1 clock pulse is applied through OR circuits 63 and 70 to assure that all of the flip-flops 60 and 68 are reset to zero, and through OR circuit 78A to reset flip-flop 78 to its zero condition. At the same time the attribute inputs from register 16 in FIG. 1A are applied to the AND circuits 38. For the input query of $A_1$ and $A_2$ only the left most AND circuit for subbucket 1*b* of the first bucket receives two inputs and produces an output. This output is carried via an appropriate one of the lines 41–1 to the gate 44–1. The output of the AND circuit 38 for subbucket 1*b* is also applied as an input to OR circuit 42–1 and through this circuit to a gate 46A. The signal is passed through this gate under control of the Q2 clock pulse to and through OR circuit 50–1. This signal is transmitted on the lowermost one of the group of four lines 55–1, which extend from FIG. 1A to FIG. 1B, and apply signals to set the flip-flops 60 for the first bucket into their binary one states. With this lowermost one of these lines receiving a signal from OR circuit 50–1, the flip-flop 60 in the bottom row of FIG. 1B is set to its binary one state. Though, at this time, a signal is also applied through the line to inverter 52-1 and from this inverter to gate 53, no signal is passed through this gate during a query operation since the gate is activated only during store operations. However, the Q2 pulse also applies a signal to OR circuit 54-1 to activate gate 44-1 and, therefore, allow the signal on the one of the lines 41-1 corresponding to subbucket 1*b* to be transmitted via the appropriate one of the connecting lines 55-1 to the flip-flop 60 in the second from the bottom row of circuitry in FIG. 1B. This flip-flop is then also set in a binary one state.

The next Q3 clock pulse is applied through OR circuit 69 and down through each of the AND circuits 65 in succession until it reaches the circuitry for the next to the last row in FIG. 1B. The pulse is then directed, under control of the binary one output from flip-flop 60 in this row, through AND circuit 66 to set the associated flip-flop 68 to its binary one state.

The output from this flip-flop is carried via line 71 for subbucket 1*b* of the first bucket to cable 71 and is applied as an input to read out both the starting address in register 72 for subbucket 1*b* as well as the next address in register 73. The next address specified by register 73 during a query operation establishes the last address in the subbucket in the attribute file which must be interrogated. This address is transferred from register 73 via cable 76 and is applied as one input to a compare circuit 90 shown in FIG. 1B. At the same time the start address is read out of the appropriate register 72 in FIG. 1C and is carried via cable 72A to gate 75 in FIG. 1D. This gate is controlled by the Q5 clock pulse, which pulse is produced by circuitry shown at the bottom of FIG. 1B, and more specifically by a gate 79A which has its input connected to the binary zero and binary one outputs of flip-flop 78. The application of the Q4 clock pulse at this time, with flip-flop 78 reset to a binary zero condition, produces an output on the Q5 output line of gate 79A, causing a pulse to be applied to gate 75 in FIG. 1D which allows the starting address for subbucket 1*b* to be directed into the MAR 36 for the attribute store. The starting address is applied not only to the attribute file 10, but also to the other input of compare circuit 90 and an indication is provided when the address in MAR 36 has been incremented sufficiently so that it is the same as the next address previously read out of register 73 in FIG. 1C and initially stored in compare circuit 90. For the present operation it is assumed that there are a number of record addresses stored in subbucket 1*b* of the attribute file and, therefore, the comparison at this time is unequal.

The Q6 clock pulse is then applied to the read access line 10C for attribute file 10 to cause the word of information, which is here a record address, that is stored at the address then in the MAR 36, to be read out of file 10 into the MDR 34. The Q6 pulse is also applied to an OR circuit 91 in FIG. 1D which, through a flip-flop 92, tests to determine if the read access operation has been completed. When this operation has been completed, a signal is passed on a line 10D to set this flip-flop at zero. The Q7 pulse applied to a gate 93 then initiates a series of clock pulses beginning with the pulse Q9. If the Q7 pulse is received at gate 93 before the read access is complete, the Q8 output merely provides a delay causing the Q7 pulse to be repeatedly applied until the read access is completed.

The Q9 clock pulse is applied to a gate 94 to direct the record address in the MDR 34 through this gate and via a cable 30 to the MAR 26 for the record file 12. The Q10 clock pulse is then applied to a flip-flop 95 in FIG. 1E and, at the same time, to a read access line 10C for the record file 10. This pulse causes the record stored at the address which has been entered in MAR 26 to be read out of the record file into the MDR 20 for the record file. The Q10 pulse sets flip-flop 95 in its binary one state in which state it remains until a signal is received from record file 12 on line 10D indicating that the read access operation is complete.

The Q11 pulse is applied to the MAR 36 in FIG. 1D to increment this register to the next address to be read out of the attribute file. The Q12 clock pulse is applied to a gate 96 in FIG. 1D which receives its inputs from compare circuit 90, which in the present case indicates no comparison and, therefore, an output is produced on the Q12A output line of gate 96. The Q12A pulse is then produced and applied to OR circuit 91 in this same FIG. to set flip-flop 92 to its binary one condition. The outputs of this flip-flop are connected to a gate 97 which is activated by the next succeeding clock pulse Q13 to produce an output at its output line Q14. The Q14 pulse is merely a delay pulse causing the Q13 pulse to be repeatedly applied to gate 97 until flip-flop 92 is reset to its zero condition. The Q12A clock pulse is also applied through OR circuit 91A to the read access line 10C for attribute file 10. This pulse causes a read access operation to be performed at the incremented address then present in MAR 36. The appropriate record address is again read out into MDR 34 and from this register to gate 94 which is activated by Q9 pulses.

When the read access in the attribute file is completed, flip-flop 92 is reset to zero allowing the Q13 pulse to cause gate 97 to deliver a signal on its Q15 output. This Q15 pulse is applied to a gate 98 in FIG. 1E to test flip-flop 95 and determine whether the read access operation in record file 12 has been completed. If completed, flip-flop 95 is reset to zero and gate 98 produces a signal on its Q17 output. The Q17 output is effective through the clock circuitry shown in FIG. 1G to reinstitute a series of clock pulses beginning with the clock pulse Q9 which is applied to the gate 94 in FIG. 1D to allow the second record address to be transferred via cable 30 to the MAR 26 for the record file. The succeeding Q10 pulse initiates a read access operation in record file 12 at the address then in memory address register 26. The next succeeding clock pulse Q11 increments MAR 36. The Q12 pulse again tests gate 96 in FIG. 1D to determine if the address then in MAR 36 compares with the initial next address obtained from the next address register 73 during the initial part of the query operation. If not, the operation is again repeated to successively read addresses out of the attribute file 10 and the records at these addresses from the record file 12. Each record read out of file 12 into its MDR 20 is gated by the Q17 pulse in the particular series to the output for the machine.

When a point is reached at which a comparison is achieved in compare circuit 90, the Q12 pulse produces a signal on its Q18 output. This signal is applied through the OR circuit 70A of FIG. 1B to reset flip-flop 60 in the next to last horizontal row of the circuitry shown in that FIG. through the AND circuit 67 in that row. The Q18 pulse is followed by a Q19 pulse, which is applied to OR circuit 70 to reset the flip-flop 68 in the next to the last horizontal row of circuitry in FIG. 1B. The Q19 pulse is also effective to reinstitute a series of clock pulses beginning with the clock pulse Q3 which is applied to OR circuit 69 in FIG. 1B. Since at this time only the flip-flop 60 in the lowermost row (subbucket 1*a*) is in its binary one state, the Q3 pulse passes through OR circuit 69 and each of the AND circuits 65 with the exception of the AND circuit 65 in the bottom horizontal row. The pulse is then directed through AND circuit 66 to set the associated flip-flop 68 in its binary one state. With this flip-flop in its binary one state, a signal is directed to the line 71, corresponding to subbucket 1*a*, to read out from register 72 and 73 in FIG. 1C the starting and next empty addresses to define the locations at which record addresses are stored in attribute file 10 for this subbucket.

The operation is thereafter the same as that described above for reading out the addresses in subbucket 1*a* and continues until a comparison is produced in compare circuit 90. At this time a Q18 pulse is again produced which is sent through OR circuit 70A and the lowermost AND circuit 67 to reset the flip-flop 60 in this row to its binary one condition. At this time all of the flip-flops are at binary zero so that when the next succeeding Q19 pulse is applied through OR circuit 70, the last remaining flip-flop 68 which is in a binary one state is set to zero.

The next series of clock pulses beginning with the clock pulse Q3 applied to OR circuit 69 is then passed down through all of the AND circuits 65 in FIG. 1B to set flip-flop 78 to its binary one state. The next successive Q4 clock pulse applied to gate 79A then produces an output which indicates the end of the query operation.

Figure 1G:
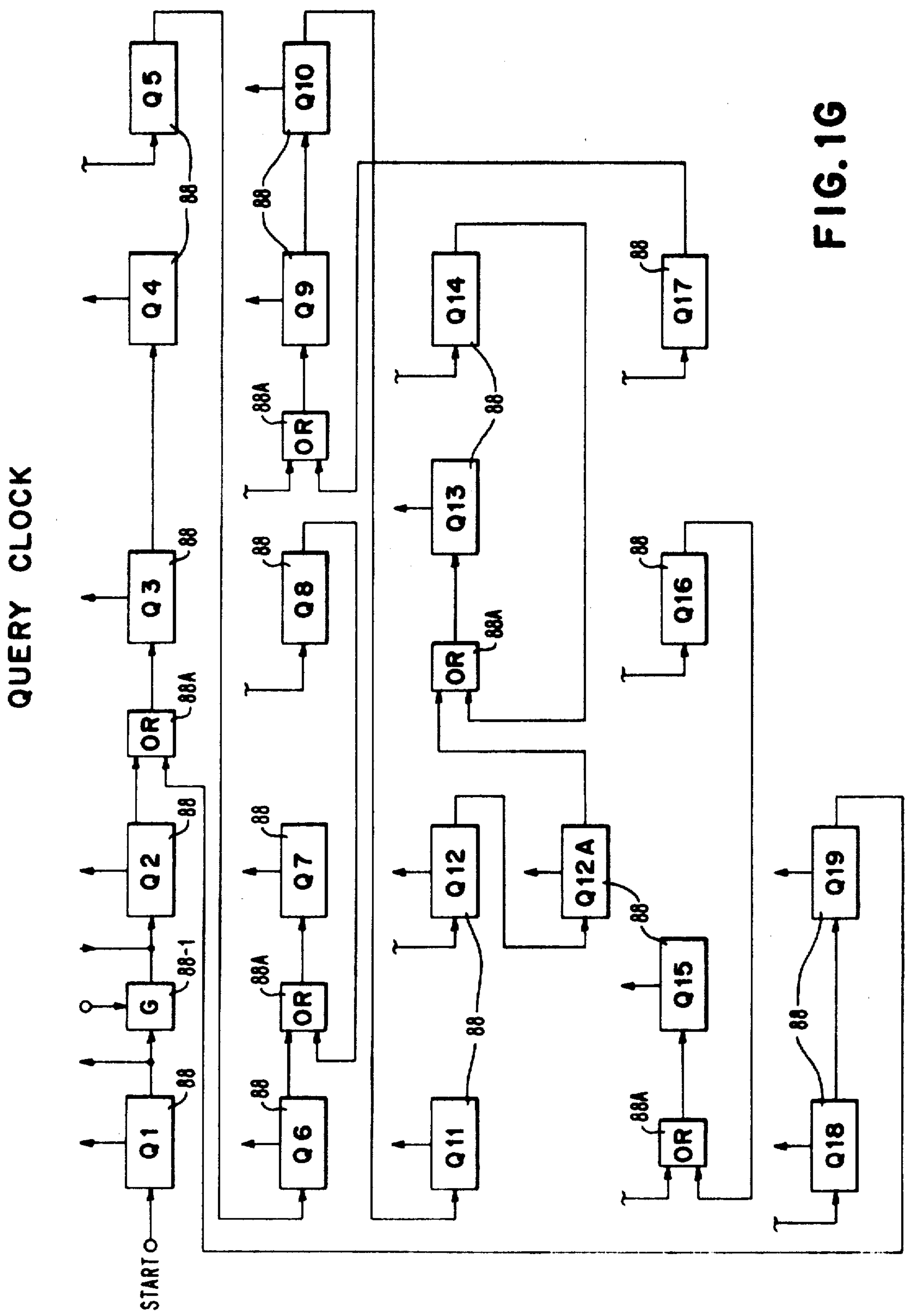

The clock pulses for the query operation are delivered by the circuit shown in FIG. 1G which includes a plurality of single-shot circuits 88, and OR circuits 88A. Since it is desired to use the same circuit for the other embodiments, a gate 88-1 shown in FIG. 1G has a pulse applied to its input during all query operations for the first embodiment described herein. In this condition this gate connects the output of single shot Q1 directly to the input of single shot Q2. This direct connection is not made in the succeeding embodiments which are described in detail below.

Figure 2:
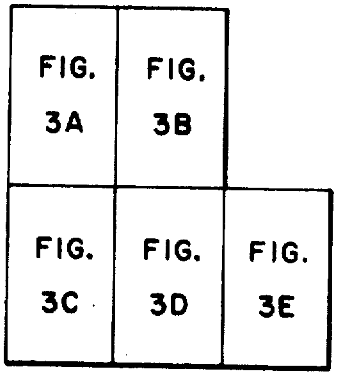
Figure 2A:
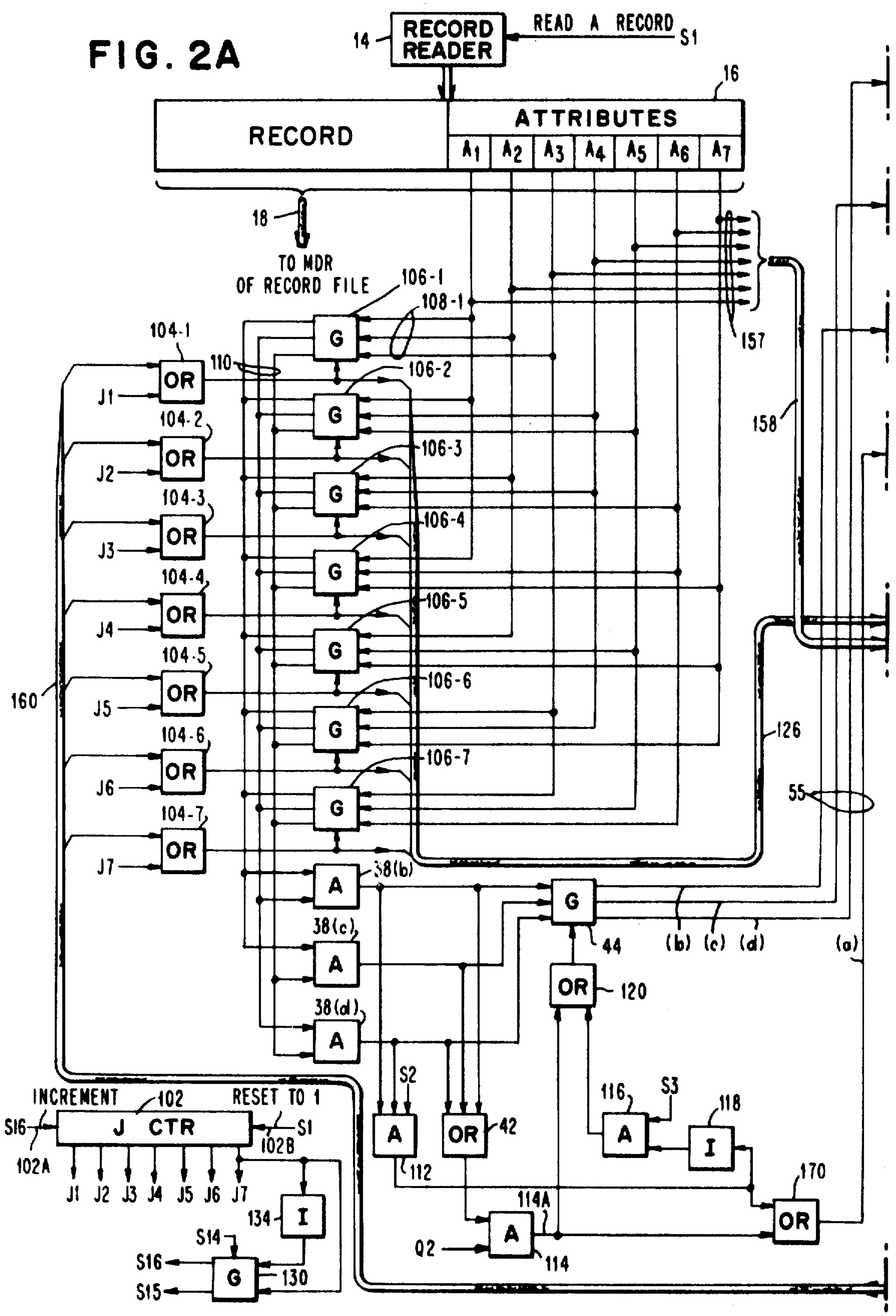
Figure 2B:
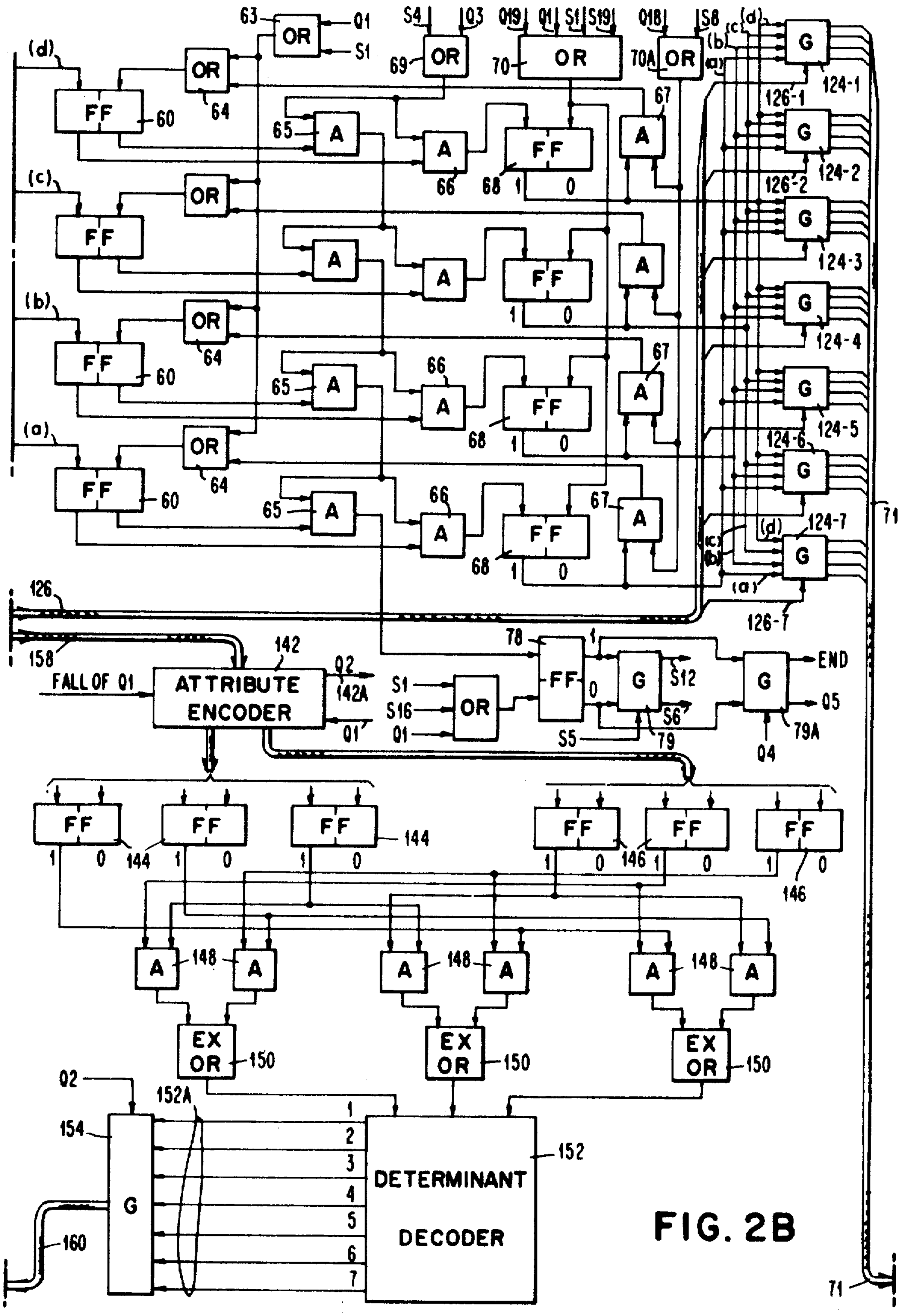
Figure 2C:
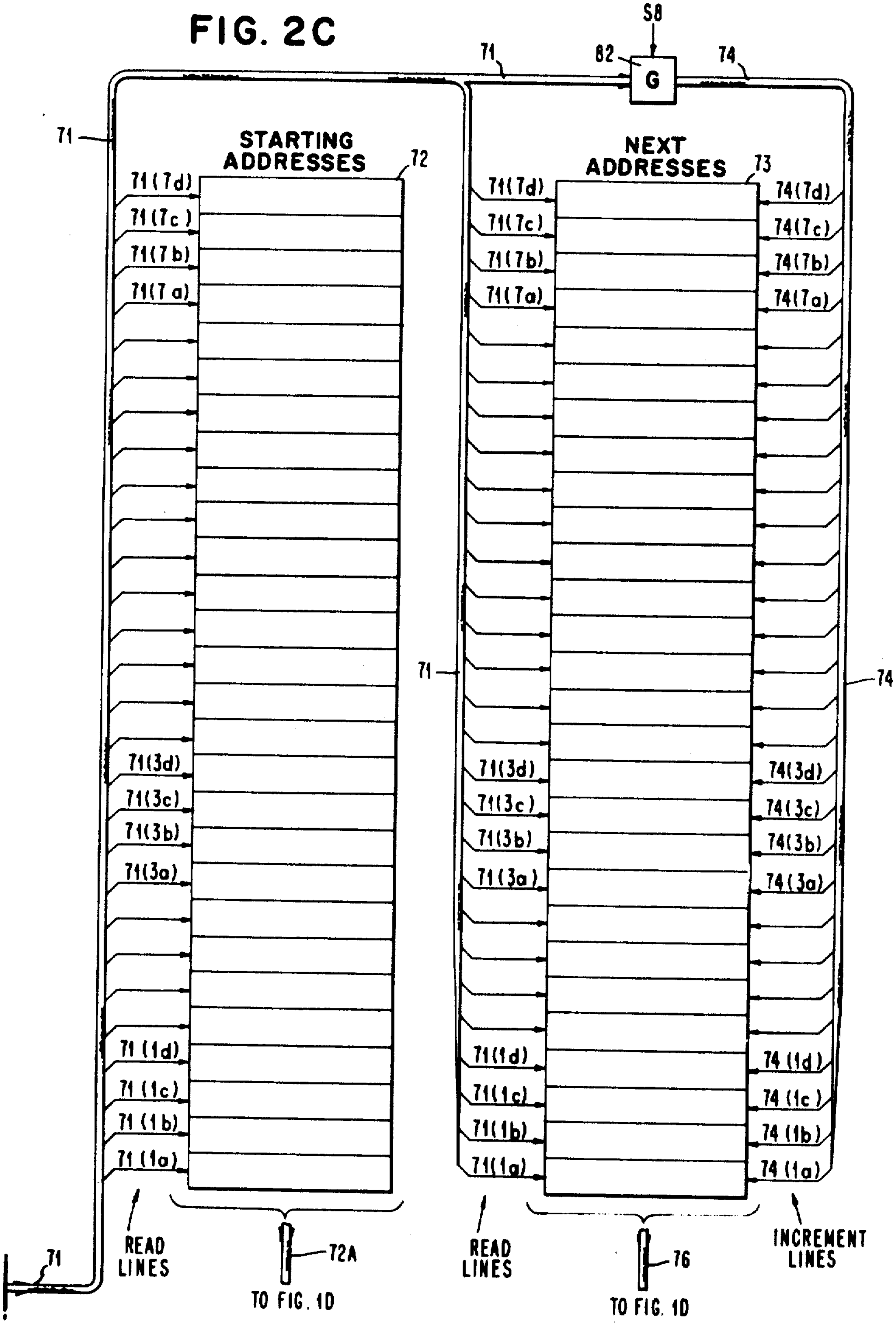

The Second Embodiment (FIGS. 2A—2C)

The second embodiment of the invention is illustrated in FIGS. 2A—2C. This embodiment is directed to the same application as the embodiment of FIG. 1. Each of the records includes seven attributes ($A_1$, $A_2$, $A_3$, $A_4$, $A_5$, $A_6$, $A_7$) and retrieval operations are carried out on queries which specify combinations of two of the seven attributes. The mode of operation in this embodiment differs first in that the store operation is serial in nature. Secondly, during the query operation, advantage is taken of the finite projective geometry equations which are valid for the seven points in the particular geometry which are assigned to the seven attributes.

In the embodiment of FIGS. 2A—2C, the showing of the starting and next address registers 72 and 73 in FIG. 2C corresponds exactly to that of FIG. 1C. For this reason, the same reference numerals are employed in this FIG. as were used in FIG. 1C. The circuitry for the attribute file, the record file, the store clock, and the query clock is the same as that shown in FIGS. 1D, 1E, 1F, and 1G for the first embodiment. For this reason, the circuitry is not repeated again for the second embodiment. The bucket arrangement in the attribute file is exactly the same as that for the embodiment for FIG. 1. There are seven buckets with four subbuckets in each bucket.

As one further point of introduction to the consideration of the embodiment of FIGS. 2A—2C, it is noted that in FIGS. 2A and 2B certain of the circuit components are exactly the same as shown in FIGS. 1A and 1B for the first embodiment. The circuitry differs in that the second embodiment, which is operated in a serial rather than a parallel mode, requires only the circuit components for one bucket rather than for all seven buckets as in the case in the first embodiment. To facilitate comparison of the embodiments, where the circuit components are identical, the same reference numerals are employed in FIGS. 2A and 2B as are used in FIGS. 1A and 1B. Each of these reference numerals repeated in the showing of the second embodiment is identifiable by the fact that the reference numeral is between one and 100.

The Store Operation

The first step in the store operation is to read a record from the record reader 14 in FIG. 2A into the register 16 under the control of the first or S1 store clock pulse. This S1 clock pulse is also applied to a J counter 102 to reset this counter to one. Counter 102 is a seven position counter which may be incremented from one position to the other by the application of signals to a input line for the counter which is designated 102A. This line receives the S16 clock pulse in a manner to be described below. The reset or S1 pulse is applied to a reset line 102B. The counter is provided with seven output lines and a signal is present on one of these lines according to the state of the counter. When reset to one by the S1 pulse a signal is present on the first or J1 output for counter 102. The outputs J1 to J7 are applied to functional components within the embodiment to control the operation on each of the seven buckets in the attribute file.

The line J1 is connected as an input to the uppermost one of seven OR circuits designated 104–1 through 104–7 in FIG. 2A. The output of this OR circuit is applied to activate the uppermost one of seven gate circuits 106–1 through 106–7. Gate circuit 106–1 has three input lines 108–1 which are connected to the outputs for the three positions in the record register 16 in which the values for the A1, A2, and A3 attributes are stored. If the record present in the register includes attributes A1 and A2, but not A3, signals on the uppermost two of the lines 108–1 pass through gate 106–1. The outputs of gate 106–1 are connected to three vertical extending lines 110 which apply inputs in combinations of two to three AND circuit designated 38.

The three attributes applied through gate circuit 106–1 under the control of the J1 counter pulse are the unique set for bucket number 1 and the three AND circuits 38 correspond to the *b*, *c*, and *d* subbuckets for the bucket. For the example being considered, with attributes A1 and A2 present and attribute A3 absent, only the uppermost or *b* AND circuit 38 passes an output. This output is applied as an input to gate circuit 44, OR circuit 42, and a three input AND circuit 112. OR circuit 42 has its output connected to an AND circuit 114 which is controlled only during query operations and does not affect the store operation being described here. The outputs of the other two AND circuits 38 are also applied to gate 44 but at this time neither of these outputs is carrying a signal.

The outputs of two of the AND circuits 38 (for the *b* and *d* subbuckets) are connected to AND circuit 112. This circuit is a three input AND circuit and receives a pulse at S2 time to provide an output when there are signals on the two of its inputs connected to the two AND circuits 38. This occurs only when all three of the attributes for the particular bucket under consideration are present in the record. In this case, the record, as has been described above, is stored only in the *a* subbucket for that bucket. With only the A1 and A2 attributes present and the A3 attribute absent, no pulse is passed through AND circuit 112.

The S3 store clock pulse is applied to an AND circuit 116. The other input of AND circuit 116 is connected to the output of an inverter 118 which is in turn controlled by AND circuit 112. Since no signal is passed through AND circuit 112 at S2 time, inverter 118 delivers a pulse to AND circuit 116. This pulse, during the application of the S3 clock pulse causes a signal to be transmitted through an OR circuit 120 to activate gate 44. In order to allow for the proper operation of the inverter circuit 118, the S3 clock pulse is overlapped by the S2 clock pulse, that is, it is begun after the S2 clock is initiated and is terminated before the S2 clock pulse is terminated. When gate 44 is activated, the signal on the uppermost one of the three input lines to this gate (the line for the *b* subbucket) is passed through this gate to the corresponding one of the group of four lines designated 55, each of which correspond to one of the four subbuckets in each bucket of the attribute file. In the case under consideration, the signal present on the *b* line is applied to the binary one input of the flip-flop 60 in the third row of logical circuitry shown in FIG. 2B.

There are four such rows of logical circuitry which are exactly similar to the rows shown in FIG. 1B of the first embodiment. Each row includes a flip-flop 60, an OR circuit 64, an AND circuit 65, an AND circuit 66, a flip-flop 68, and an AND circuit 67. These circuits are operated in the same manner that was described for a store operation in the embodiment of FIG. 1 under control of the S1, S4, S8, and S9 store clock pulses applied to OR circuits 63, 69, 70 and 70A. The S4 clock pulse causes an output to be produced at the binary one output of the flip-flop 68 for the row corresponding to the subbucket in which the record address is to be stored in the attribute file. The binary one outputs of each of the four flip-flops 68 are connected as inputs to each of a plurality of seven gates 124–1 through 124–7. These gates are activated through inputs 126–1 through 126–7 which are carried via a cable 126 from the outputs of corresponding ones of the OR circuits 104–1 through 104–7 shown in FIG. 2A. At the present time with counter J delivering a J1 pulse, OR circuit 104–1 delivers an input to the input line 126–1 of gate 124–1 in FIG. 2B. Each of the four inputs to this gate corresponds to one of the four subbuckets *a*, *b*, *c*, and *d*. In the present case, a signal is present only on the *b* line, and this signal is passed through the gate 124–1 to a cable 71 by which it is carried to the starting address register 72 (FIG. 2C) and the next address register 73.

The operation is then essentially the same as that described above with reference to FIGS. 1D and 1E of the embodiment of FIG. 1. Prior to the application of the signal to next address register 73 to read out the proper next address for the store operation (the starting address is not used during a store operation), the record itself has been transferred via the cable 18 shown in FIG. 2A to the record file and stored at the next appropriate address in the record file. It is this address which is written in the attribute file at the address retrieved from next address register 73 for the *b* bucket of the first of the seven buckets in this file.

The operation of the store clock of FIG. 1F differs for the second embodiment in that gate 88D is not activated. Therefore, upon completion of this store operation, in which the record address is stored at the appropriate location in subbucket 1*b* and the record itself has been appropriately stored in the record file, the S14 store clock pulse is applied to a gate 130 shown in FIG. 2A. This gate has two inputs, one of which is connected directly to the J7 output of the J counter 102 and the other of which is connected through an inverter 134 to this same line. With the J counter standing at 1, the application of the S14 pulse to gate 130 causes an output signal to be produced on the S16 output line. The S16 store clock pulse is applied to the increment input 102A of J counter 102 and increments the counter to 2 so that a signal is now delivered at the J2 output of this counter.

The S16 output also initiates a new series of store clock pulses beginning with an S2 pulse. With the J counter 102 producing a signal at its J2 output, OR circuit 104–2 activates gate 106–2 in FIG. 2A and gate 124–2 in FIG. 2B. Attributes A1, A4, and A5 are then analyzed by the circuitry. If two or more of these attributes are present in the records stored in register 16, the record address for the record is stored in the appropriate one of the four subbuckets in the second bucket of the attribute file. If at least two of the three attributes A1, A4, and A5 are not present, and therefore the record address is not to be stored in the second bucket, none of the flip-flops 60 in FIG. 2B is set to its binary one state. As a result, when the S4 clock pulse is applied through OR circuit 69, this pulse passes through each of the AND circuit 65 to set flip-flop 78 to its binary one state. The next applied S5 clock pulse activates gate 79 so that an output is then produced at the S12 output. The intervening store clock pulses are skipped, since it is not necessary to store the record address in bucket 2 of the attribute file.

The operation above described is repeated with each S16 clock pulse advancing the J counter 102 in FIG. 2A until the unique combination of three attributes for each of the seven buckets has been examined and the record address stored in all of the necessary subbuckets in the attribute file. Upon completion of the last of these operations, the J counter has a signal on its J7 output. When the last S14 clock pulse is applied to gate 130, a signal is produced at the S15 output which indicates the end of the store operation for the record in register 16.

During the above described operation, the address at which the record itself is stored in the record file is maintained in the MAR 26 for the record file (see FIG. 1E). The S15 clock pulse resets the record store address counter 22 to prepare the circuitry for a storage operation on the next record.

The Query Operation

During a query operation, only two of the seven attributes are present in register 16 in FIG. 2A. Rather than step down serially through each of the seven gates 106–1 through 106–7 during a query operation, the particular gate corresponding to the unique bucket for the combination of two attributes in the input query is immediately determined. This is accomplished by circuitry shown in the lower half of FIG. 2B. Before describing this circuitry and the manner in which it is controlled, the mathematical relationships stemming from finite geometrical considerations, which have been alluded to above, will be described in greater detail. This description is considered appropriate here, since though this mathematics is advantageous in deciding how to format the attribute file in any retrieval application, the circuitry shown in FIG. 2B is the first described herein which takes direct advantage of these relationships in either a store or query operation. The basic approach is to assign to each of the attributes a particular point in a particular finite geometry. Each such finite geometry includes a number of equations which define planes, lines and points in the geometry and the geometry is termed finite since these equations are valid only for a certain finite number of planes, lines and points. The two particular finite geometries referred to in this specification are the Projective Finite Geometry and the Euclidean Finite Geometry. Background material of these geometries may be found in the following:

a. Carmichael, R. D., (1937) "Introductions to the Theory of Groups of Finite Order," Ginn and Co., Boston, Mass.; and
b. Bose, R. C. (1939) "On the Construction of Balanced Incomplete Block Designs," Annals of Eugenics, Vol. 9, pp. 353—399.

In the application under consideration, that is for retrieval of records including seven attributes in response to queries specifying two of the seven attributes, each of the seven attributes is assigned a point in a particular projective geometry. The particular geometry chosen is derived from the following equation:

Equation 1:

$$\phi(N, t, s) = \frac{(s^{N+1}-1)(s^N-1)\ldots(s^{N-t+1}-1)}{(s^{t+1}-1)(s^t-1)\ldots(s-1)}$$

where: $N$ = the number of dimensions required;
$s$ = an integer which is a power of a prime number; in the embodiments considered herein, $s = 2$;
$t$ = the number of what are termed flats, with $t = 0$ denoting a point, $t = 1$ denoting a line, and $t = 2$ denoting a plane; and
= the number of points, lines or planes as the case may be for the values of $N$, $s$ and $t$ in the particular geometry.

The general equations of a $t$-flat in a projective geometry are given by $(N - t)$ independent equations of the following form:

Equation 2:

$$a_{i0} x_0 + a_{i1} x_1 + \ldots a_{iN} x_n = 0,$$

where: $i$ varies from 1 to $(N - t)$.

The number of terms in the equation is determined by the dimensions ($N$) of the geometry chosen; and this depends on the number of points required (corresponding to the number of attributes in a record), and thus the number of binary orders $(N + 1)$ required to uniquely represent each attribute. If the number of attributes is equal to $l$, then the number of binary orders $(N + 1)$ necessary to represent each attribute uniquely is given by $(N + 1) \geq \log_2 (l + 1)$. For the seven at-

| | tribute systems under consideration, $N = 2$, which allows for eight different three-order binary values. However, in projective geometry, the 000 point is not regarded as an allowable point for which the equations of the geometry are valid. Thus, the seven attributes $A_1$, $A_2$, $A_3$, $A_4$, $A_5$, $A_6$ and $A_7$ are assigned the values, 001, 010, 011, 100, 101, 110 and 111, respectively.

In the projective geometry, the number of binary values necessary to define a point in the geometry depends upon the dimensions ($N$) of the particular geometry chosen and is equal to $(N + 1)$. Since the minimum number of orders necessary to represent the seven attributes is three, the ideal solution for the present geometry would require $N = 2$. Therefore, Equation 1 above is solved for the value of , for $N = 2$, and $s = 2$, and $t = 0$ to first determine the number of available points or 0-flats. The Equation is then solved for $t = 1$ to determine the number of lines (1-flats), and for $t = 2$ to determine the number of planes (2-flats). From these solutions it is determined that there are seven points, seven lines, and one plane in the finite projective geometry represented by the equation when $N = 2$ and $s = 2$. This, of course exactly matches the problem under consideration in which each of the seven attributes are represented by a point in a projective geometry which can be identified by a three order binary number.

The general equation for the seven lines of this particular finite geometry is:
Equation 2*a*:

$$a_0 x_0 + a_1 x_1 + a_2 x_2 = 0.$$

The three orders in the binary number for each attribute are the $x_0$, $x_1$ and $x_2$ coordinates in the geometry for the point which represents that attribute. As noted above, there are seven lines in the projective geometry ($N = 2$, $s = 2$), and it follows from the geometry that each of these lines include three points, and each of the seven points is on three of the seven lines. It is this relationship that is used to construct the seven buckets in the attribute file. More specifically, each bucket is constructed so as to include combinations of a particular unique set of three of the attributes, the points for which, in the geometry, are on the same line. In the table below the seven unique combinations of these attributes are given along with the equation in the geometry for the line which includes the three points, and a binary bucket identification number for each bucket:

| | Attributes | Bucket identification number | Line equation |
|---|---|---|---|
| Bucket: | | | |
| 1 | $A_1A_2A_3$ | 100 | $x_0=0$ |
| 2 | $A_1A_4A_5$ | 010 | $x_1=0$ |
| 3 | $A_2A_4A_6$ | 001 | $x_2=0$ |
| 4 | $A_1A_6A_7$ | 110 | $x_0+x_1=0$ |
| 5 | $A_2A_5A_7$ | 101 | $x_0+x_2=0$ |
| 6 | $A_3A_4A_7$ | 110 | $x_1+x_2=0$ |
| 7 | $A_3A_5A_6$ | 111 | $x_0+x_1+x_2=0$ |

Since only two points are necessary to determine a line in this geometry, the combination of two attributes in each query can be encoded into the two binary numbers for these points, and these binary numbers substituted in the general equation (Equation 2*a*) to determine which line the two points are on. The equation can be solved for the particular pair of binary numbers representing the query using a determinant approach and it is this approach which provides the basis for the logical circuitry shown in the lower half of FIG. 2B. This circuitry includes an attribute encoder 142, a first group of three flip-flops 144, a second group of flip-flops 146, a group of six AND circuits 148, three EXCLUSIVE OR circuits 150, a determinant encoder 152 and a gate 154.

During a query operation, the query specifying the combination of two attributes for the query is entered into register 16 (FIG. 2A). The binary one and zero values for the seven bits in the attribute field of this register are transmitted via seven lines 157 to a cable 158 which extends to the input of the attribute encoder 142 in FIG. 2B. The first or Q1 query clock pulse resets the encoder and, as indicated in the drawing, the encoding operation is initiated by the termination of this pulse. The attribute encoder then tests the seven bits from left to right ($A_1$ to $A_7$) and causes binary number for the first of the two attributes in the query to be entered in flip-flops 144 and for the second attribute to be entered into flip-flops 146. Thus, for example, if the query specifies attribute $A_2$ and $A_4$, the binary number 010 ($A_2$) is entered in flip-flops 144 and the binary number 100 ($A_4$) is entered in flip-flops 146.

Upon completion of this encoding operation, a pulse is delivered to an output line 142A of the encoder to initiate a series of clock pulses beginning with clock pulse Q2. The Query Clocks of FIG. 1G include a gate 88–1 between the Q1 and Q2 flip-flops which is activated during the operation of the first embodiment to cause the Q2 pulse to immediately follow the Q1 pulse. Here the Q2 pulse is not initiated until the encoding operation is complete and a signal is produced by the encoder 142 on line 142A.

The encoded outputs, as described above, set flip-flops 144 to 010 ($A_2$) and flip-flops 146 to 100 ($A_4$). The outputs of these flip-flops are applied to EXCLUSIVE logical circuit formed by AND circuits 148 and EXCLUSIVE OR circuits 130 to develop a 3-bit binary number. This number identifies the equation for the line on which these two points are and corresponds to the bucket identification number given in the table above. Here for a query of $A_2$ and $A_4$, the proper equation is $x_2 = 0$, and the bucket identification number applied by EXCLUSIVE OR circuits 150 to the determinant decoder 152 is 001. This binary number causes the decoder to produce an output of the one of its seven input lines 152A which corresponds to the third bucket in the system.

The signal is passed through gate 154 under the control of the Q2 clock pulse. The output of this gate, which is shown in the form of a cable 160, extends to the inputs of the seven OR circuits 104–1 through 104–7 in FIG. 1A. Here with the query having been analyzed by the circuitry and it having been determined that the addresses of the records matching the query are in the third bucket, the signal from gate 154 is passed through the OR circuit 104–3 for the bucket. The output of this OR circuit activates gate 106–3 in FIG. 2A and gate 124–3 in FIG. 2A so that the query operation is performed on the third bucket.

With gate 106–3 activated, the binary values for attributes A2, A4 and A6 are applied to this gate and through this gate to the lines 110. With attributes A2 and A4 being present and attribute A6 absent, lines 110 apply inputs to the three AND circuits 38 to produce an output on the uppermost one of these AND circuits for the subbucket *b*. The outputs of the three AND circuits are applied to a gate 44 which is in turn controlled by OR circuit 120. The outputs of the three AND circuits 38 are also applied as inputs to OR circuit 42 to produce an output from this OR circuit which is applied as one input to AND circuit 114. The Q2 clock pulse is applied to this AND circuit which produces an output on line 114A for the AND circuit, which output is transmitted both to OR circuit 120 and a further OR circuit 170. The input to OR circuit 120 activates gate 144 to allow a signal to be transmitted via the line 55 for the *b* subbucket to the corresponding flip-flop 60 in the third row in FIG. 2B. At the same time the output of OR circuit 170 is transmitted to the line 55 for the *a* subbucket which is transmitted to the appropriate flip-flop 60 in the fourth row of logical circuitry in FIG. 2A. Thereafter, the query operation is much the same as described before. The binary 1 in flip-flop 60 of the third row causes a query operation to be carried out for the *b* subbucket. A signal is transmitted through gate 124–3 and the cable 71 to starting address register 72 and next address register 73 (FIG. 2C). These registers are controlled to read out the beginning and end addresses in the attribute file for subbucket **3*b*. Upon completion of this operation the circuitry in the third row in FIG. 2B is reset. The query operation is then repeated under control of the flip-flop 60 in the fourth row to read out from the starting address register 72 and next address register 73 the beginning and end addresses for subbucket 3*a***.

The attribute file and the record file are controlled during this operation in the same manner as has been described above with reference to the first embodiment so that all of the record addresses in subbucket **3*b* of the attribute file are read out. Using these addresses the records stored at the designated locations and the record file are retrieved. Similarly, all of the addresses in subbucket 3*a* are then read from the attribute file and these addresses used to retrieve the desired records from the record file. The end of the query operation is signified when the records identified by the addresses in both of the subbuckets have been read out and flip-flop 78 in FIG. 2B is set to its binary 1 condition by a Q3 clock pulse. The next following Q4 pulse produces an output from gate 79A** indicating the end of the query operation.

From the description above, it is apparent that by using the mathematical relationships of the geometry chosen for the particular file retrieval application, the particular bucket containing those records which match the query is immediately identified by the logical circuitry shown in the lowermost section of FIG. 2B. This circuitry is used to activate the appropriate one of the gates 106–1 through 106–7 and 124–1 through 124–7, so that the query operation is immediately carried out in the proper bucket. This method improves the speed of operation considerably. However, it will be apparent to those skilled in the art that a serial type operation similar to that described above for storage can be employed with the gates 106–1 through 106–7 serially activated under the control of counter pulses applied to OR circuits 104–1 through 104–7. This method of operation is slower but has the advantage that the circuitry shown in the lower half of FIG. 2B is not necessary. The particular circuitry employed and the method of controlling that circuitry to carry out the inventive method is determined in many cases by economic considerations as well as the availability of such circuitry in the data processing equipment being used or specially designed to carry out the method.

The Third Embodiment (FIGS. 3A—3E)

The circuitry for the third embodiment illustrating the practice of the inventive method is shown in FIGS. 3A—3E. The application to which this embodiment is directed is one in which each of the records include eight attributes ($A_1$, $A_2$, $A_3$, $A_4$, $A_5$, $A_6$, $A_7$, $A_8$) and queries are made on combinations of three attributes. A minimum of three binary orders is required to uniquely represent the eight different attributes. In this case, equations based on a Euclidean Finite Geometry are employed, and the 000 number can be used. Therefore, the eight attributes can be assigned binary values as follows: $A_1$ = 100, $A_2$ = 001, $A_3$ = 010, $A_4$ = 011, $A_5$ = 100, $A_6$ = 101, $A_7$ = 110 and $A_8$ = 111. The number of possible combinations of three attributes is given by the equation $\frac{l!!}{(l-k)!!(k)!!}$, and here with $k = 3$ and $l = 8$, is 56. The general equations of a $t$-flat in a Euclidean geometry are given by ($N-t$) independent equations of the following form:

Equation 3:

$$a_{i0}x_0 + a_{i1}x_1 \cdots a_{i(N-1)}x_{(N-1)} = C_i,$$

where $i$ varies from 1 to $(N-t)$.

The relationship used to determine the number of $t$ flats, that is, the number of points, lines, planes, etc., in the geometry is:

Equation 4: No. of $t$ flats $(t>0)$ =

$$\frac{(s^{N-t})(s^N-1)(s^{N-1}-1)\cdots(s^{N-t+1}-1)}{(s^t-1)(s^{t-1}-1)\cdots(s-1)}$$

No of $t$ flats $(t=0) = s^N$.

In the application under consideration three binary valued numbers are necessary to uniquely represent the eight attributes. In the Euclidean geometry, the number of coordinates necessary to represent a point is equal to the number of dimensions $N$. Therefore, the ideal situation using the minimum bits necessary to represent each attribute, would require $N$ to equal 3. Substituting this value into Equation 4, and, as before, making $s = 2$, the number of points ($t = 0$) is found to be 8; the number of lines ($t = 1$) is found to be 28; and the number of planes ($t = 2$) is found to be 14. From the geometry it is known that each of the 14 planes contains a unique combination of four ($s^2$) of the eight points. Based upon this analysis the buckets and subbuckets are arranged and identified in a table set forth below.

Sub-Buckets

| Bucket | "a" | "b" | "c" | "d" | "e" | I.D. No. |
|---|---|---|---|---|---|---|
| 1 | $A_1A_2A_3A_4$ | $A_1A_2A_3$ | $A_1A_2A_4$ | $A_1A_3A_4$ | $A_2A_3A_4$ | 1000 |
| 2 | $A_5A_6A_7A_8$ | $A_5A_6A_7$ | $A_5A_6A_8$ | $A_5A_7A_8$ | $A_6A_7A_8$ | 1001 |
| 3 | $A_1A_2A_5A_6$ | $A_1A_2A_5$ | $A_1A_2A_6$ | $A_1A_5A_6$ | $A_2A_5A_6$ | 0100 |
| 4 | $A_3A_4A_7A_8$ | $A_3A_4A_7$ | $A_3A_4A_8$ | $A_3A_7A_8$ | $A_4A_7A_8$ | 0101 |
| 5 | $A_1A_3A_5A_7$ | $A_1A_3A_5$ | $A_1A_3A_7$ | $A_1A_5A_7$ | $A_3A_5A_7$ | 0010 |
| 6 | $A_2A_4A_6A_8$ | $A_2A_4A_6$ | $A_2A_4A_8$ | $A_2A_6A_8$ | $A_4A_6A_8$ | 0011 |
| 7 | $A_1A_2A_7A_8$ | $A_1A_2A_7$ | $A_1A_2A_8$ | $A_1A_7A_8$ | $A_2A_7A_8$ | 1100 |
| 8 | $A_3A_4A_5A_6$ | $A_3A_4A_5$ | $A_3A_4A_6$ | $A_3A_5A_6$ | $A_4A_5A_6$ | 1101 |
| 9 | $A_1A_3A_6A_8$ | $A_1A_3A_6$ | $A_1A_3A_8$ | $A_1A_6A_8$ | $A_3A_6A_8$ | 1010 |
| 10 | $A_2A_4A_5A_7$ | $A_2A_4A_5$ | $A_2A_4A_7$ | $A_2A_5A_7$ | $A_4A_5A_7$ | 1011 |
| 11 | $A_1A_4A_5A_8$ | $A_1A_4A_5$ | $A_1A_4A_8$ | $A_1A_5A_8$ | $A_4A_5A_8$ | 0110 |
| 12 | $A_2A_3A_6A_7$ | $A_2A_3A_6$ | $A_2A_3A_7$ | $A_2A_6A_7$ | $A_3A_6A_7$ | 0111 |
| 13 | $A_1A_4A_6A_7$ | $A_1A_4A_6$ | $A_1A_4A_7$ | $A_1A_6A_7$ | $A_4A_6A_7$ | 1110 |
| 14 | $A_2A_3A_5A_8$ | $A_2A_3A_5$ | $A_2A_3A_8$ | $A_2A_5A_8$ | $A_3A_5A_8$ | 1111 |

The general equation for the 14 planes corresponding to the 14 buckets is:

Equation 3$a$:

$$a_0x_0 + a_1x_1 + a_2x_2 = C.$$

The 14 equations for the 14 planes are $x_0 = 1$; $x_0 = 0$; $x_1 = 0$; $x_1 = 1$; $x_2 = 0$; $x_2 = 1$; $x_0 = x_1 + 1$; $x_0 = x_1$; $x_0 = x_1$; $x_0 = x_2 + 1$; $x_0 = x_2$; $x_1 = x_2 + 1$; $x_1 = x_2$; $x_0 = x_1 + x_2 + 1$; and $x_0 = x_1 + x_2$.

It is clear from the above table that each of the 14 buckets corresponds to a plane identified by one of these equations and each plane includes a unique set of four points corresponding to four of the attributes. Each bucket is, therefore, based upon one of these unique combinations of four points or attributes and stores the addresses for all records which include all four of the attributes in the $a$ subbucket. Records including one of the four combinations of three of the four attributes are stored in corresponding ones of the remaining subbuckets ($b$, $c$, $d$, and $e$) in each bucket. There are, therefore, 14 buckets in the attribute file for the system, and 5 subbuckets within each bucket, for a total of 70 subbuckets.

In the embodiment of the circuit shown in FIGS. 3A through 3E, only those portions of the circuit which are different from that of the first two embodiments are illustrated. Thus, the record file, the attribute file, the store clock, the query clock, the starting address register, and the next address register are not shown since the operation of these components is the same as that shown and described in the previous embodiments. The third embodiment of FIGS. 3A through 3E is operated in much the same way as the second embodiment of FIGS. 2A through 2C. During a store operation the attribute field of the record is analyzed serially on the combinations of four attributes for each bucket. Since there are 14 buckets there are 14 such operations. During a query operation the query combination of three attributes is encoded into the proper combination of three binary numbers, each including three bits, and signals representing these numbers are applied to logical circuitry which identifies the plane and bucket identification number for the query. Since there are 14 buckets, each including five subbuckets, in the attribute file in this embodiment, the starting address register and the next address register, which are not shown, but which correspond to registers 72 and 73 of FIGS. 1C and 2C, each include 70 addresses, one of each of the 70 subbuckets in the attribute file.

As has been the case up to this point, where the components operate essentially in the same manner as components in the first and second embodiments, the reference numbers are identical to those used in the first embodiment (between 1 and 100) and the second embodiment (between 100 and 200). In this embodiment, a larger number of certain of these components is required since the system deals with records including eight attributes, queries are made on combinations of three attributes, and 14 buckets each including five subbuckets are required in the attribute file. Thus, four of the AND circuits 38, one for each of the *b*, *c*, *d* and *e* subbuckets are required whereas only three are needed in the first two embodiments. Similarly, 14 of the gates 106–1 to 106–14 (FIGS. 3A and 3B) and 14 of the gates 124–1 through 124–14 are required whereas only seven gates are needed in the second embodiment of FIG. 2.

Figure 3:
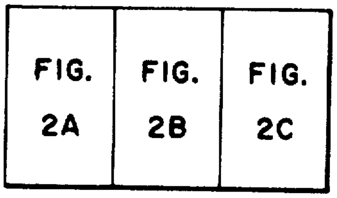
Figure 3A:
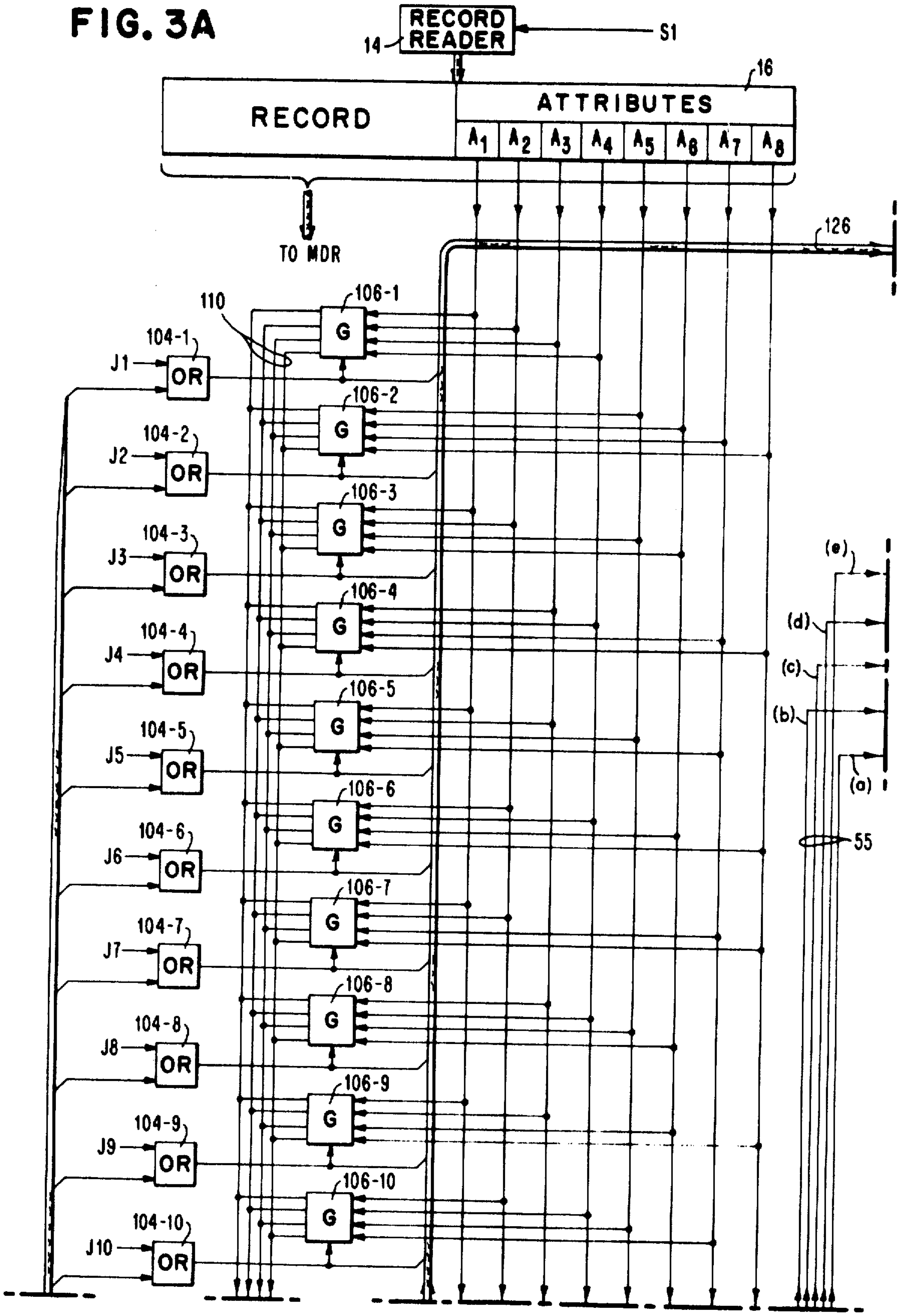
Figure 3B:
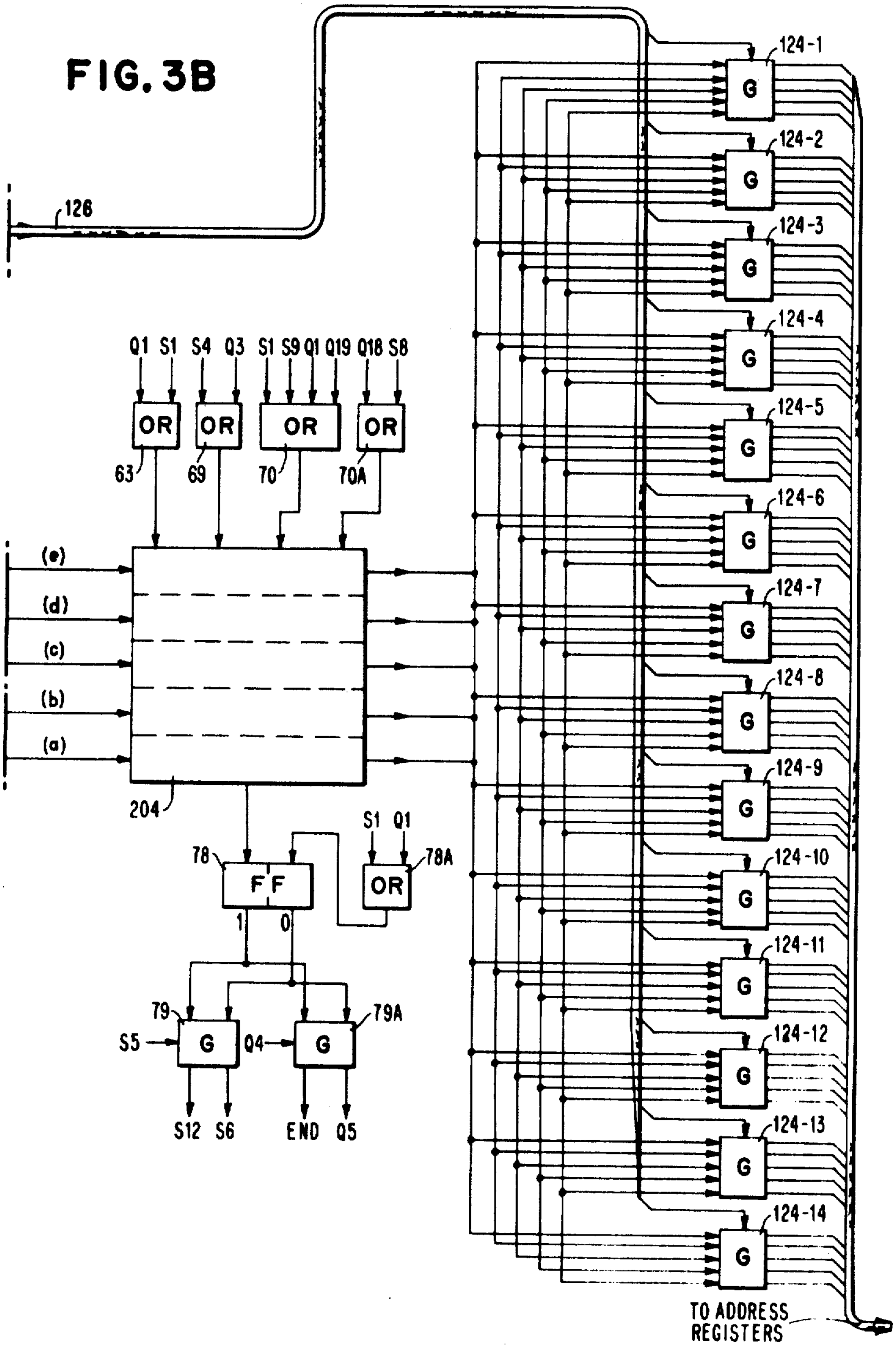
Figure 3C:
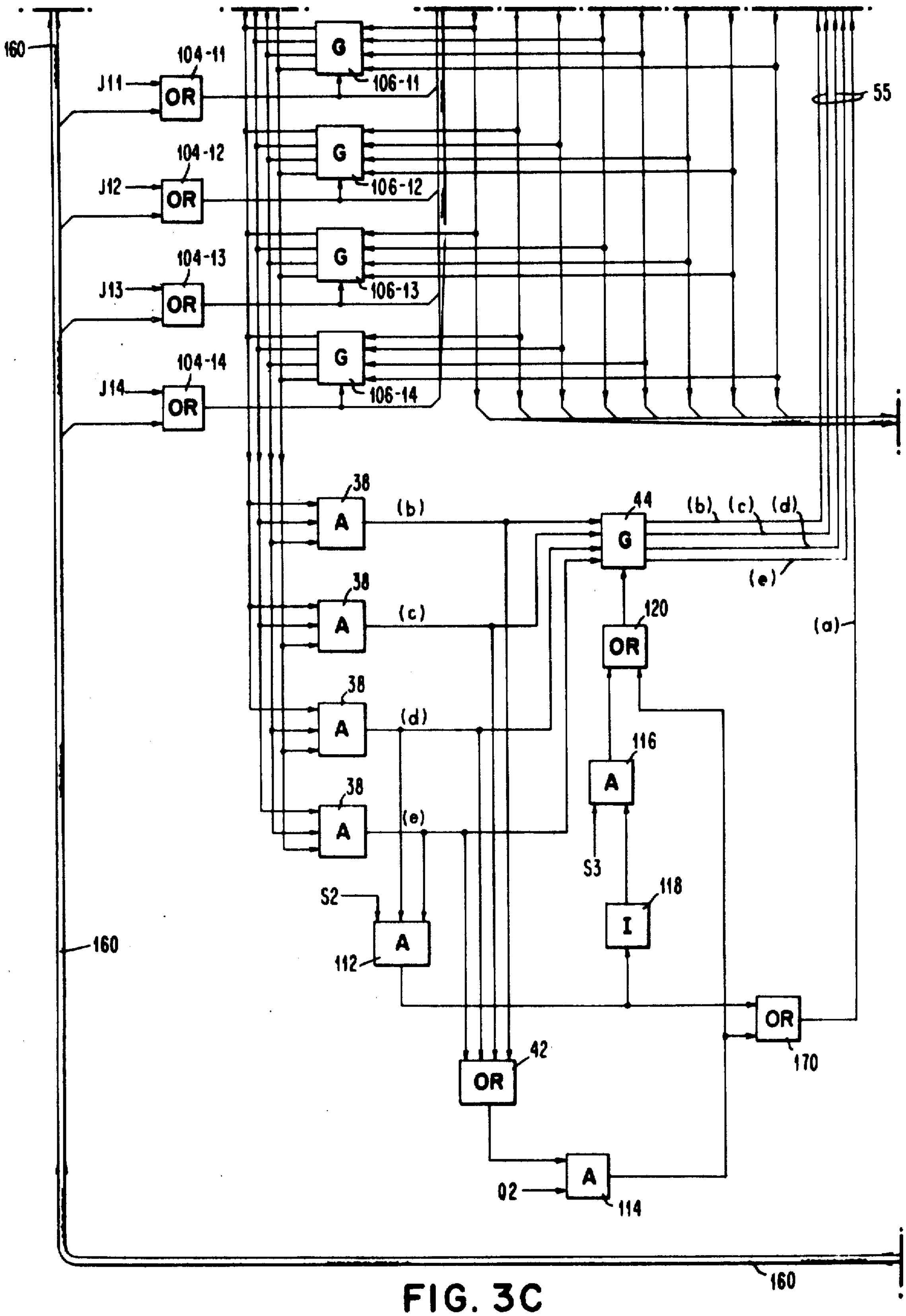
Figure 3D:
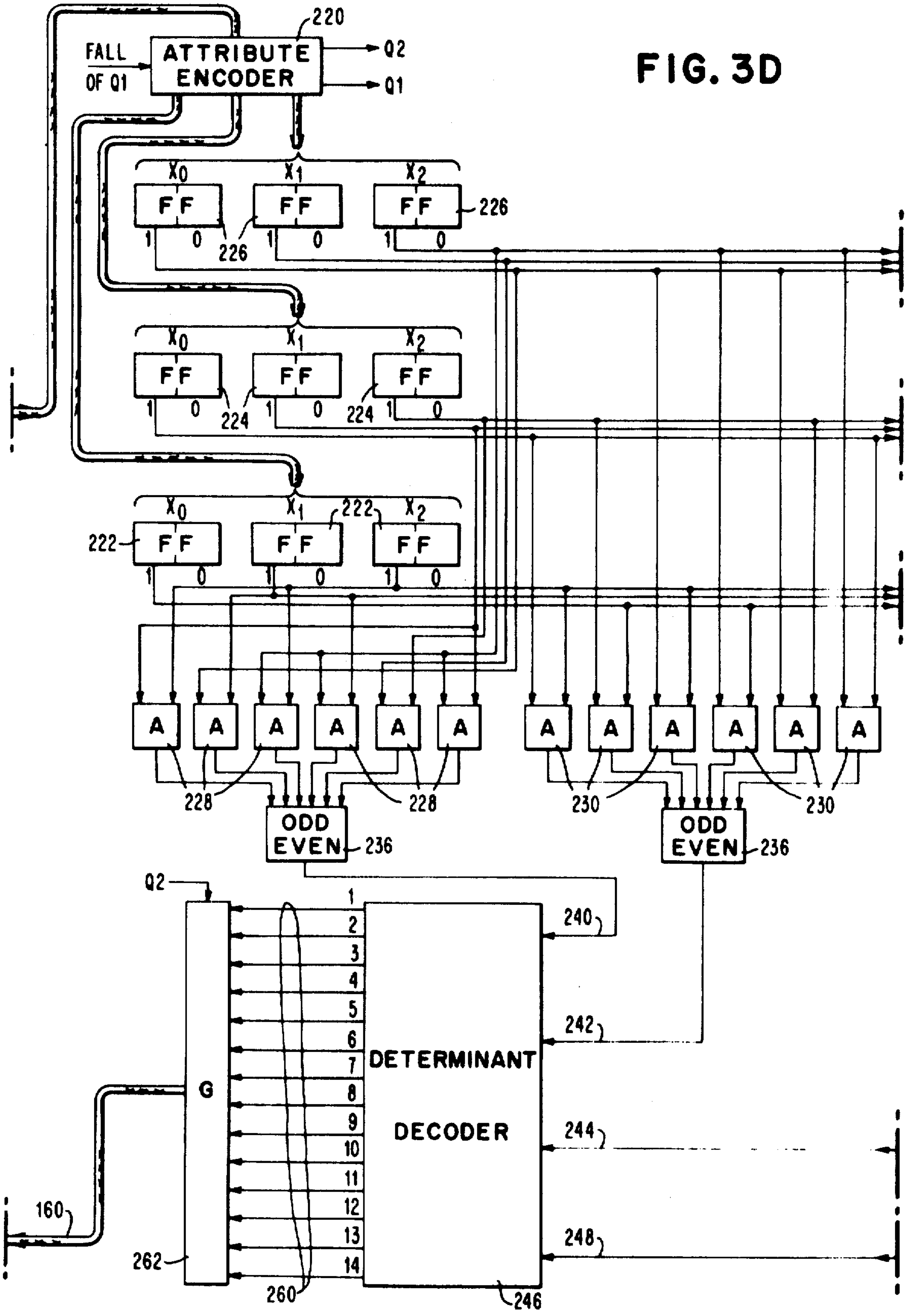
Figure 3E:
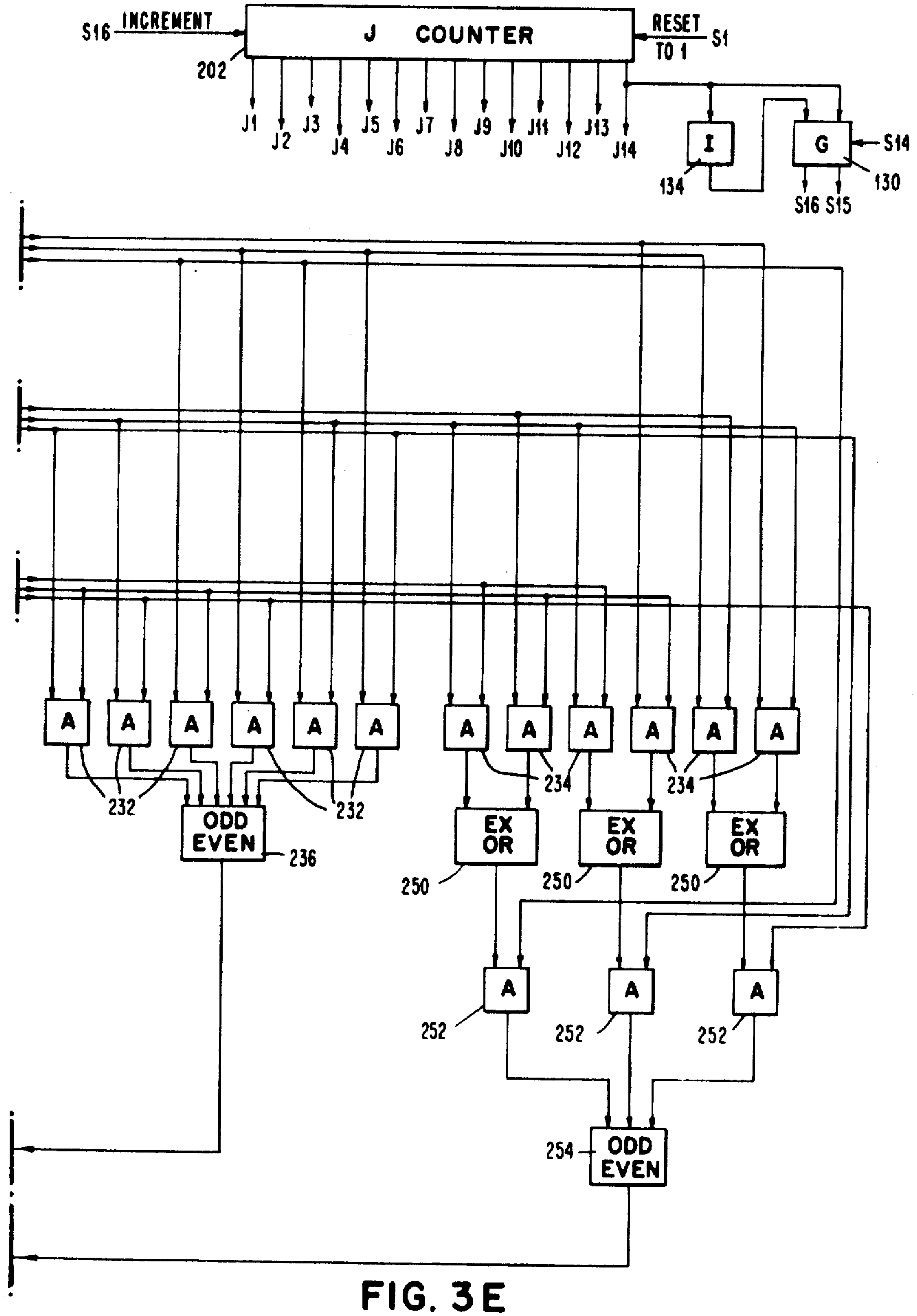

The circuit of this third embodiment includes a J counter 202 shown in FIG. 3E which is a 14 position counter. This J counter functions in the same way as the seven position J counter 102 of FIG. 2A. Pulses are applied by J counter 202 to OR circuits 104–1 through 104–14 to control gates 106–1 through 106–14 and 124–1 through 124–14 during serial store operations. Since in this embodiment the records are analyzed for combinations of three of a unique set of four attributes, there are four input lines to each of the gate circuits 106–1 through 106–14. There are four output lines in the group of lines 110 (FIGS. 3A and 3C). These lines are connected in combinations of three to the inputs of the four AND circuits 38 (FIG. 3C) which in this embodiment are three input AND circuits.

Since each of the 14 buckets in this embodiment includes five subbuckets, there are four lines in the group of lines 55 (FIGS. 3C, 3A, 3B) and pulses are applied by these lines to five rows of logical circuitry represented in FIG. 3B by a block 204. Each row of logic is the same as that shown in FIGS. 2A and includes a flip-flop 60, OR circuit 64, AND circuit 65, AND circuit 66, flip-flop 68 and AND circuit 67. There are five rows of logic here since there are five subbuckets in each bucket. These logical circuits are controlled by the clock pulses delivered through OR circuits 63, 69, 70 and 70A in the same manner as described above for embodiment 2A. The outputs of the logical circuits within block 204 are applied in parallel to gate 124–1 through 124–14. These gates are activated in series during a store operation under control of pulses supplied by J counter 202 and during a query operation one gate is selected under the control of logical circuitry shown in FIGS. 3D and 3E.

The logical circuitry, shown in FIGS. 3D and 3E, is effective to produce outputs indicating the plane which contains the three points corresponding to the three attributes of a query. This output identifies the particular bucket corresponding to this plane and causes a signal to be applied through cable 160 to the appropriate one of the OR circuits 104–1 through 104–14. The output from this OR circuit activates the corresponding one of the gates circuits in each of the groups 106–1 through 106–14 (FIGS. 3A, 3C) and 124–1 through 124–14 (FIG. 3B) so that the query operation is carried out in the proper bucket.

During a query operation, the 8-bit word representing the query, which is stored in register 16 of FIG. 3A, is fed via the eight output lines from register 16 to a cable (FIG. 3C) and via the cable 158 to the input of an attribute encoder 220 in FIG. 3D. Each query includes three binary ones in the 8-bit word. Encoder 220, which is controlled by the query clock pulses, tests the bits of the word from left to right (from $A_1$ to $A_8$). The proper 3-bit binary number for the first attribute is entered in three flip-flops 222, for the second attribute in three flip-flops 224, and for the third attribute in three flip-flops 226. The outputs of these flip-flops are applied in combination of two to four groups of AND circuits 228, 230, 232, 234 (FIGS. 3D, 3E). There are six AND circuits in each group. The outputs of three of these groups of AND circuits 228, 230, 232 are applied to a corresponding one of a group of three Odd-Even circuits 236. Each of these circuits, represented by blocks 236, is formed of a plurality of EXCLUSIVE OR circuits and each circuit provides an output when an odd number of the six inputs are binary ones. If the 6-bit input includes an even number of binary ones, no output is provided. The outputs of the three Odd-Even circuits 236 are designated 240, 242 and 244, and these outputs apply inputs to a determinant decoder represented by a block 246 (FIG. 3D). The fourth input to this decoder is applied via a line 248 which is controlled by the logical circuitry including the fourth group of six AND circuits 234. The outputs of these AND circuits are applied as shown to three EXCLUSIVE OR circuits 250, the outputs of which are applied to three AND circuits 252. The other three inputs to these AND circuits are received from one of the flip-flops 222, one of the flip-flops 224, and one of the flip-flops 226. Finally, the outputs of these AND circuits 252 are applied to a three input Odd-Even circuit 254, the output of which on line 248 is applied as the fourth input to determinant decoder 246.

The circuitry described above analyzes the three attributes in each query and provides on lines 240, 242, 244, 248 signals representing the 4-bit identification number for the bucket in the attribute file in which the addresses of records matching the query are stored. Determinant decoder 246 has 14 output lines 262, one for each bucket, and the signal produced on the proper one of these lines during each query operation is gated through a gate 262 by the Q2 clock pulse. This pulse is transmitted via cable 160 to the appropriate one of the OR circuits 104–1 through 104–14 for the bucket including the addresses of the records matching the query. Thereafter, the operation is the same as has been described above. The circuitry is controlled by the clock pulses so that the *a* subbucket and one of the four other subbuckets (*b*, *c*, *d* or *e*) in the selected bucket in the attribute file are read out to obtain the addresses in the record file of the records which include the queried combination of attributes. These records are read out of the record file using the addresses obtained from the attribute file.

Figure 4:
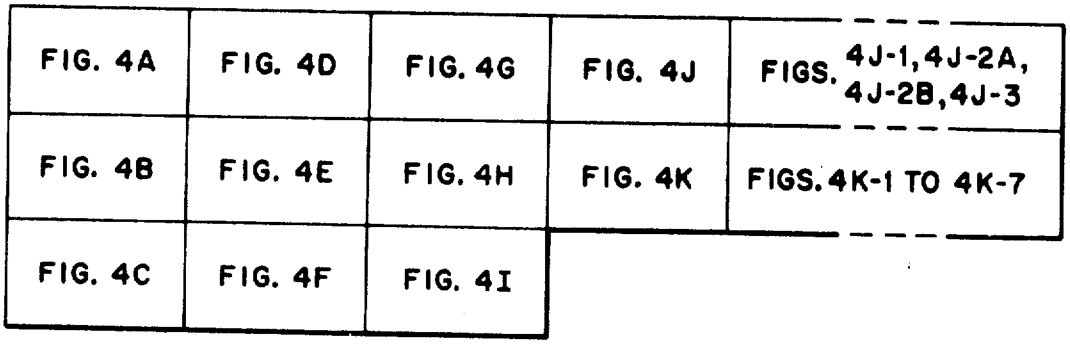
Figure 4A:
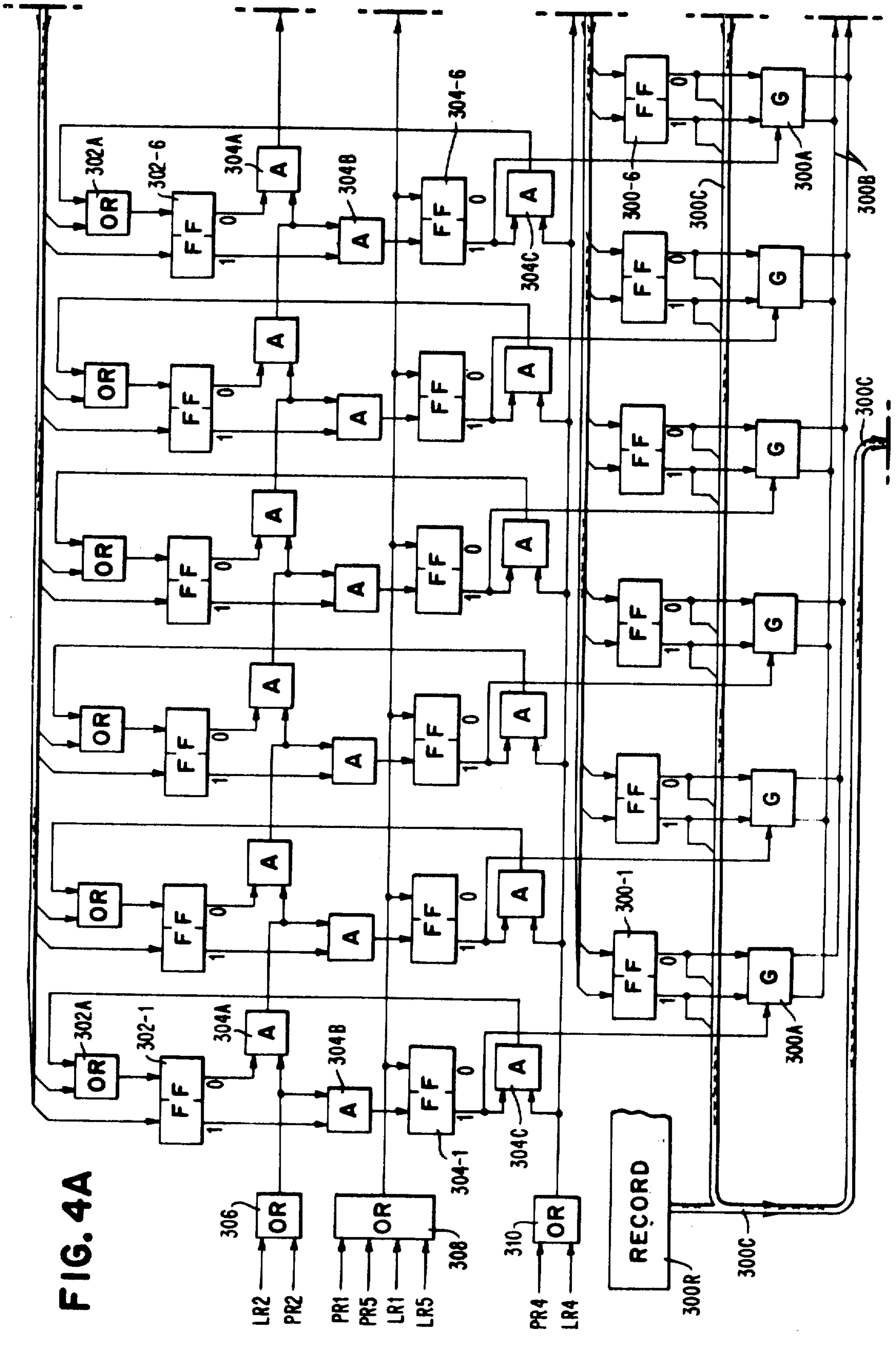

The Fourth Embodiment (FIGS. 4A—

The fourth embodiment of the invention is directed to an application in which each of the records includes 15 attributes ($l = 15$) and queries are made on combinations of three attributes at a time. Since there are 15 attributes to be considered, four binary orders are required to uniquely represent these attributes. Since, in the present case, a projective geometry is employed, and, therefore, the 0000 point cannot be used, the binary values are assigned to the attributes as follows: $A_1 = 0001$; $A_2 = 0010$; $A_3 = 0011$; $A_4 = 0100$; $A_5 = 0101$; $A_6 = 0110$; $A_7 = 0111$; $A_8 = 1000$; $A_9 = 1001$; $A_{10} = 1010$; $A_{11} = 1011$; $A_{12} = 1100$; $A_{13} = 1101$; $A_{14} = 1110$; $A_{15} = 1111$.

From the relationship $l \quad /(l-k) \quad \times k$ , it is determined that there are 455 different combinations of three of the 15 attributes. Since a projective geometry is employed here, the mathematical equations are the same general equations (Equations 1 and 2) which were set forth above and discussed with relationship to the embodiment of FIG. 2. As pointed out there, the number of coordinates necessary to represent a point in this geometry is equal to $N + 1$. Since there are four binary orders necessary to uniquely represent the 15 attributes, the ideal solution for this application would require $N$ to be equal to 3. Each equation number is solved for $N = 3$, and $s = 2$, to determine the number of points ($t = 0$), the number of lines ($t = 1$), and the number of planes ($t = 2$), and it is determined that there are 15 planes, 35 lines, and 15 points for which the equations of the geometry are valid. The following relationships are also known for this geometry;

a. there are seven points on each plane;
b. there are three points on each line;
c. each point is on seven planes;
d. each of the 35 lines is common to a different combination of three planes.

From the above it is determined that two approaches may be taken in applying the principles of the invention to the present application. The file may be broken up into 15 major buckets, each of which corresponds to one of the 15 planes in the geometry. Each such major bucket would include the addresses for all records that include combinations of at least three of the seven attributes corresponding to the geometrical points included in the plane for the major bucket. The file may be further divided within each major bucket to break down the 35 possible combinations of three attributes in each major bucket into appropriate buckets and subbuckets so that the record addresses corresponding to these combinations may be uniquely retrieved. In such a file organization, however, since each plane includes seven lines and each of these seven lines is common to two other planes, the addresses for records having combinations of three attributes on each of these lines would be redundantly stored in the attribute file unless some means is provided to avoid storing these record addresses in all but one of the major buckets for a plane.

The general approach described above using only 15 major buckets broken down into subbuckets also does not take advantage of the uniqueness of the 35 combinations of three attributes, the points for which are on the 35 lines in the geometry. Therefore, a different approach is taken in organizing the file though there may be many applications in which the first approach described above may be satisfactory. In the second approach, the attribute file is divided into two sections, Section I and Section II. Section II of the attribute file includes 35 buckets and each of these buckets corresponds to one of the 35 combinations of three attributes, the geometrical points for which are on one of the 35 lines in the geometry. These buckets in Section II of the attribute file do not include any subbuckets.

Section I of the attribute file is broken down into 15 major buckets, one for each of the planes in the geometry. Each of these major buckets is formatted on seven of the attributes and includes subbuckets for each of 28 different combinations of three of the seven attributes. There are, of course, 35 different possible combinations of three of seven attributes, but seven of these combinations are those whose three geometric points are on one of the 35 lines and are, therefore, stored in the buckets in Section II of the attribute file. The 28 combinations in each major bucket corresponding to a plane in the geometry are divided among seven buckets. Each of the seven buckets includes five subbuckets and each bucket is based upon a unique set of four of the seven attributes for the particular plane. Each bucket, therefore, includes in its *a* subbucket, the addresses for all records having all four of the attributes for the bucket, and in the other four subbuckets (*b*, *c*, *d* and *e*), there are stored the addresses for the records which have a combination of three of the four attributes for that bucket.

In summary, therefore, the attribute file is divided into two sections. The first section, Section I, includes 15 major buckets; each major bucket includes seven buckets; and each bucket includes five subbuckets. There are, therefore, a total of 525 subbuckets in Section I of the attribute file. Section II of the attribute file includes the 35 line buckets each of which stores the addresses for the records matching one unique combination of three attributes. There are, therefore, a total of 560 unique locations in the attribute file. That is, the 525 subbuckets in Section I of the memory and the 35 individual buckets in Section II of the file.

The general equation for the 15 planes in this geometry is:
Equation 5

$$a_0x_0+a_1x_1+a_2x_2+a_3x_3=0.$$

Logic based upon a determinant solution of this equation is employed in the circuitry of the fourth embodiment, on query operations to determine which of the planes and, more precisely, which of the major buckets includes the addresses for records which match the query. There are other mathematical relationships between the binary numbers representing the points assigned to the 15 attributes which are taken advantage of in controlling the circuitry to carry out the store and query operations.

One of these relationships is that if the three binary numbers for a query of any three attributes are analyzed on a column by column basis, and the total number of binary ones in each of the columns is even (either 0 or 2) then those three attributes are on a line in the geometry. The addresses for records matching those attributes are stored in one of the 35 subbuckets in Section II of the memory. Thus, for example, attributes $A_1$, $A_2$ and $A_3$ are assigned the binary values 0001, 0010 and 0011. These three binary numbers are the coordinates for three points which lie on one of the 35 lines in this geometry. When columnar addition is carried out on these three binary numbers, without carry between the columns, it can be seen that the sum for each column is 0:

```
0001
0010
0011
----
0000
```

The same is true for each of the other 34 combinations which are stored in Section II of the attribute file.

A second important relationship is that the seven different combinations of three of the seven attributes for each major bucket, which correspond to combinations stored in Section II of the memory, are in the same sequential order in the group of seven attributes for each major bucket. It is these combinations, of course, which are not stored in the major buckets to avoid redundancy of storage. This relationship allows masking techniques to be employed so that the same circuitry may be controlled in the same way during both store and query operations carried out on each of the major buckets.

As stated above, there are 15 different planes in the geometry which is used as the basis for formatting the attribute file in this application, and there are 15 equations within the general Equation 5 set forth above, one for each of these planes. In the tables which are set forth below showing the organization of the attribute file by combinations of attributes, the equations for these 15 planes corresponding to the 15 major buckets are indicated. Since each of the 35 lines in the geometry is common to three planes, each line may be identified by the equations for any two of these planes, and two equations which uniquely identify each such line are also set forth in the tables below. The first of these tables shows the organization of the 15 major buckets in Section I of the attribute file. This table identifies the seven attributes corresponding to the seven points included in the plane for each major bucket. The second table shows the manner in which the first two major buckets (1B and 2B) are broken down into buckets and subbuckets. The format is the same for the other 13 major buckets and is not shown. The third table shows the organization of the attributes in the 35 individual buckets in Section II of the attribute file.

SECTION I OF ATTRIBUTE FILE, MAJOR BUCKET FORMAT

| | Equation | Attributes |
|---|---|---|
| Major bucket: | | |
| B-1 | $x_0=0$ | $A_1, A_2, A_3, A_4, A_5, A_6, A_7$ |
| B-2 | $x_1=0$ | $A_1, A_2, A_3, A_8, A_9, A_{10}, A_{11}$ |
| B-3 | $x_2=0$ | $A_1, A_4, A_5, A_8, A_9, A_{12}, A_{13}$ |
| B-4 | $x_3=0$ | $A_2, A_4, A_6, A_8, A_{10}, A_{12}, A_{14}$ |
| B-5 | $x_0+x_1=0$ | $A_1, A_2, A_3, A_{12}, A_{13}, A_{14}, A_{15}$ |
| B-6 | $x_0+x_2=0$ | $A_1, A_4, A_5, A_{10}, A_{11}, A_{14}, A_{15}$ |
| B-7 | $x_0+x_3=0$ | $A_2, A_4, A_6, A_9, A_{11}, A_{13}, A_{15}$ |
| B-8 | $x_1+x_2=0$ | $A_1, A_6, A_7, A_8, A_9, A_{14}, A_{15}$ |
| B-9 | $x_1+x_3=0$ | $A_2, A_5, A_7, A_8, A_{10}, A_{13}, A_{15}$ |
| B-10 | $x_2+x_3=0$ | $A_3, A_4, A_7, A_8, A_{11}, A_{12}, A_{15}$ |
| B-11 | $x_0+x_1+x_2=0$ | $A_1, A_6, A_7, A_{10}, A_{11}, A_{12}, A_{13}$ |
| B-12 | $x_0+x_1+x_3=0$ | $A_2, A_5, A_7, A_9, A_{11}, A_{12}, A_{14}$ |
| B-13 | $x_0+x_2+x_3=0$ | $A$ , $A_4, A_7, A_9, A_{10}, A_{13}, A_{14}$ |
| B-14 | $x_1+x_2+x_3=0$ | $A_3, A_5, A_6, A_8, A_{11}, A_{13}, A_{14}$ |
| B-15 | $x_0+x_1+x_2+x_3=0$ | $A_3, A_5, A_6, A_9, A_{10}, A_{12}, A_{15}$ |

SECTION I OF ATTRIBUTE FILE, BUCKET AND SUB-BUCKET FORMAT

| | | Sub-Buckets | | | | |
|---|---|---|---|---|---|---|
| | Buckets | "a" | "b" | "c" | "d" | "e" |
| Major Bucket 1B—$x_0=0$; $A_1A_2A_3A_4A_5A_6A_7$ | 1B-1 | $A_1A_2A_4A_7$ | $A_1A_2A_4$ | $A_1A_2A_7$ | $A_1A_4A_7$ | $A_2A_4A_7$ |
| | 1B-2 | $A_1A_2A_5A_6$ | $A_1A_2A_5$ | $A_1A_2A_6$ | $A_1A_5A_6$ | $A_2A_5A_6$ |
| | 1B-3 | $A_1A_3A_4A_6$ | $A_1A_3A_4$ | $A_1A_3A_6$ | $A_1A_4A_6$ | $A_3A_4A_6$ |
| | 1B-4 | $A_1A_3A_5A_7$ | $A_1A_3A_5$ | $A_1A_3A_7$ | $A_1A_5A_7$ | $A_3A_5A_7$ |
| | 1B-5 | $A_2A_3A_4A_5$ | $A_2A_3A_4$ | $A_2A_3A_5$ | $A_2A_4A_5$ | $A_3A_4A_5$ |
| | 1B-6 | $A_2A_3A_6A_7$ | $A_2A_3A_6$ | $A_2A_3A_7$ | $A_2A_6A_7$ | $A_3A_6A_7$ |
| | 1B-7 | $A_4A_5A_6A_7$ | $A_4A_5A_6$ | $A_4A_5A_7$ | $A_4A_6A_7$ | $A_5A_6A_7$ |
| Major Bucket 2B—$x_1=0$; $A_1A_2A_3A_8A_9A_{10}A_{11}$ | 2B-1 | $A_1A_2A_8A_{11}$ | $A_1A_2A_8$ | $A_1A_2A_{11}$ | $A_1A_8A_{11}$ | $A_2A_8A_{11}$ |
| | 2B-2 | $A_1A_2A_9A_{10}$ | $A_1A_2A_9$ | $A_1A_2A_{10}$ | $A_1A_9A_{10}$ | $A_2A_9A_{10}$ |
| | 2B-3 | $A_1A_3A_8A_{10}$ | $A_1A_3A_8$ | $A_1A_3A_{10}$ | $A_1A_8A_{10}$ | $A_3A_8A_{10}$ |
| | 2B-4 | $A_1A_3A_9A_{11}$ | $A_1A_3A_9$ | $A_1A_3A_{11}$ | $A_1A_9A_{11}$ | $A_3A_9A_{11}$ |
| | 2B-5 | $A_2A_3A_8A_9$ | $A_2A_3A_8$ | $A_2A_3A_9$ | $A_2A_8A_9$ | $A_3A_8A_9$ |
| | 2B-6 | $A_2A_3A_{10}A_{11}$ | $A_2A_3A_{10}$ | $A_2A_3A_{11}$ | $A_2A_{10}A_{11}$ | $A_3A_{10}A_{11}$ |
| | 2B-7 | $A_8A_9A_{10}A_{11}$ | $A_8A_9A_{10}$ | $A_8A_9A_{11}$ | $A_8A_{10}A_{11}$ | $A_9A_{10}A_{11}$ |

SECTION II OF ATTRIBUTE FILE, INDIVIDUAL BUCKET FORMAT

| | Equation | Attributes |
|---|---|---|
| Bucket: | | |
| B-1 | $x_0=0, x_1=0$ | $A_1, A_2, A_3$ |
| B-2 | $x_0=0, x_2=0$ | $A_1, A_4, A_5$ |
| B-3 | $x_0=0, x_3=0$ | $A_2, A_4, A_6$ |
| B-4 | $x_0=0, x_1+x_2=0$ | $A_1, A_6, A_7$ |
| B-5 | $x_0=0, x_1+x_3=0$ | $A_2, A_5, A_7$ |
| B-6 | $x_0=0, x_2+x_3=0$ | $A_3, A_4, A_7$ |
| B-7 | $x_0=0, x_1+x_2+x_3=0$ | $A_3, A_5, A_6$ |
| B-8 | $x_1=0, x_2=0$ | $A_1, A_8, A_9$ |
| B-9 | $x_1=0, x_3=0$ | $A_2, A_8, A_{10}$ |
| B-10 | $x_1=0, x_0+x_2=0$ | $A_1, A_{10}, A_{11}$ |
| B-11 | $x_1=0, x_0+x_3=0$ | $A_2, A_9, A_{11}$ |
| B-12 | $x_1=0, x_2+x_3=0$ | $A_3, A_8, A_{11}$ |
| B-13 | $x_1=0, x_0+x_2+x_3=0$ | $A_3, A_9, A_{10}$ |
| B-14 | $x_2=0, x_3=0$ | $A_4, A_8, A_{12}$ |
| B-15 | $x_2=0, x_0+x_1=0$ | $A_1, A_{12}, A_{13}$ |
| B-16 | $x_2=0, x_0+x_3=0$ | $A_4, A_9, A_{13}$ |
| B-17 | $x_2=0, x_0+x_1+x_3=0$ | $A_5, A_9, A_{12}$ |
| B-18 | $x_2=0, x_1+x_3=0$ | $A_5, A_8, A_{13}$ |
| B-19 | $x_3=0, x_0+x_1=0$ | $A_2, A_{12}, A_{14}$ |
| B-20 | $x_3=0, x_0+x_2=0$ | $A_4, A_{10}, A_{14}$ |
| B-21 | $x_3=0, x_1+x_2=0$ | $A_6, A_8, A_{14}$ |
| B-22 | $x_3=0, x_0+x_1+x_2=0$ | $A_6, A_{10}, A_{12}$ |
| B-23 | $x_0+x_1=0, x_0+x_2=0$ | $A_1, A_{14}, A_{15}$ |
| B-24 | $x_0+x_1=0, x_0+x_3=0$ | $A_2, A_{13}, A_{15}$ |
| B-25 | $x_0+x_1=0, x_2+x_3=0$ | $A_3, A_{12}, A_{15}$ |
| B-26 | $x_0+x_1=0, x_0+x_2+x_3=0$ | $A_3, A_{13}, A_{14}$ |
| B-27 | $x_0+x_2=0, x_0+x_3=0$ | $A_4, A_{11}, A_{15}$ |
| B-28 | $x_0+x_2=0, x_0+x_1+x_3=0$ | $A_5, A_{11}, A_{14}$ |
| B-29 | $x_0+x_2=0, x_1+x_3=0$ | $A_5, A_{10}, A_{15}$ |
| B-30 | $x_0+x_3=0, x_1+x_2=0$ | $A_6, A_9, A_{15}$ |
| B-31 | $x_0+x_3=0, x_0+x_1+x_2=0$ | $A_6, A_{11}, A_{13}$ |
| B-32 | $x_1+x_2=0, x_1+x_3=0$ | $A_7, A_8, A_{15}$ |
| B-33 | $x_1+x_2=0, x_0+x_1+x_3=0$ | $A_7, A_9, A_{14}$ |
| B-34 | $x_1+x_3=0, x_0+x_1+x_2=0$ | $A_7, A_{10}, A_{13}$ |
| B-35 | $x_2+x_3=0, x_0+x_1+x_2=0$ | $A_7, A_{11}, A_{12}$ |

Before describing in detail the operation of the circuitry in carrying out store and query operations a functional description of the steps necessary to each operation is given here. The first step in each store operation is feed the 15-bit word representing the 15 attributes into a register along with the other data for that word. As before, the record itself is stored at the next designated address in the record file and the record address is stored in the proper buckets in the attribute file. In order to determine the proper storage locations in the attribute file, a series of masking operations are performed on the 15-bit attribute field. First, this field is masked to form a 7-bit word which includes only those bits which include the set of seven bits for the first major bucket. This 7-bit word is analyzed in much the same manner as was described above with reference to the 8-bit attribute field of the third embodiment. More specifically, the seven bits are analyzed in seven groups of four (one for each bucket within the major bucket), and the record is stored in the appropriate buckets and subbuckets of the first major bucket.

The 15-bit attribute field is thereafter masked to form a 7-bit word out of the seven bits for the second major bucket and the same operation is repeated to store the record address in each of the appropriate subbuckets within this major bucket. This operation is continued using in all, 15 such masks, one for each of the 15 major buckets in Section I of the memory. Thereafter, the circuitry is controlled using 35 masks which are based on the combinations of attributes for the 35 buckets in Section II of the memory. Using each mask, a 3-bit word is formed, and if all three bits are binary ones, then the record address is stored in the corresponding bucket of Section II of the memory file.

During a query operation, the 15 bits entered into the attribute field of the register includes only three binary ones which define the combination of three attributes on which the query is to be made. These three attributes are first encoded into the three 4-bit binary numbers for the attributes. The circuit is then controlled to combine these three binary numbers column by column to determine if the sum of all columns is zero. If this is the case, the query is known to call for records, the addresses for which are stored in one of the 35 buckets of Section II of the attribute file. In such a case, the first two binary numbers are concatenated to form an 8-digit number and the 8-digit number is compared with each of 35 8-digit concatenated numbers which identify the 35 buckets in Section II of the attribute file. Where a comparison is achieved, the output is used to determine the location in the attribute file of the bucket storing the addresses of the records matching the query.

If the columnar addition as described above does not produce zeros in all four columns, then it is known that the addresses for the records matching the query are stored in one of the subbuckets in Section I of the attribute file. The three binary numbers which have been encoded are employed to derive signals which are applied to a determinant circuit which provides an output indicating the particular plane in which the points represented by the three binary numbers are included. This plane, of course, corresponds to one of the 15 major buckets. The output of the determinant circuit is used to obtain from the memory the proper mask for that major bucket. Using that mask in combination with the 15-bit attribute field, a 7-bit word representing the values for the seven points in the plane for the selected major bucket is derived. This 7-bit word includes the three binary ones in the query arranged in proper sequential order for query operations on the selected major bucket. The circuit is then controlled to serially analyze the seven unique sets of four of the seven bits to determine the one of the seven buckets that includes the addresses for the records matching the query. The *a* subbucket for that bucket and one other of the *b*, *c*, *d* and *e* subbuckets are then read out to obtain the addresses of the records in the record file. Using these addresses the matching records are obtained from the record file.

Store Operation

Figure 4B:
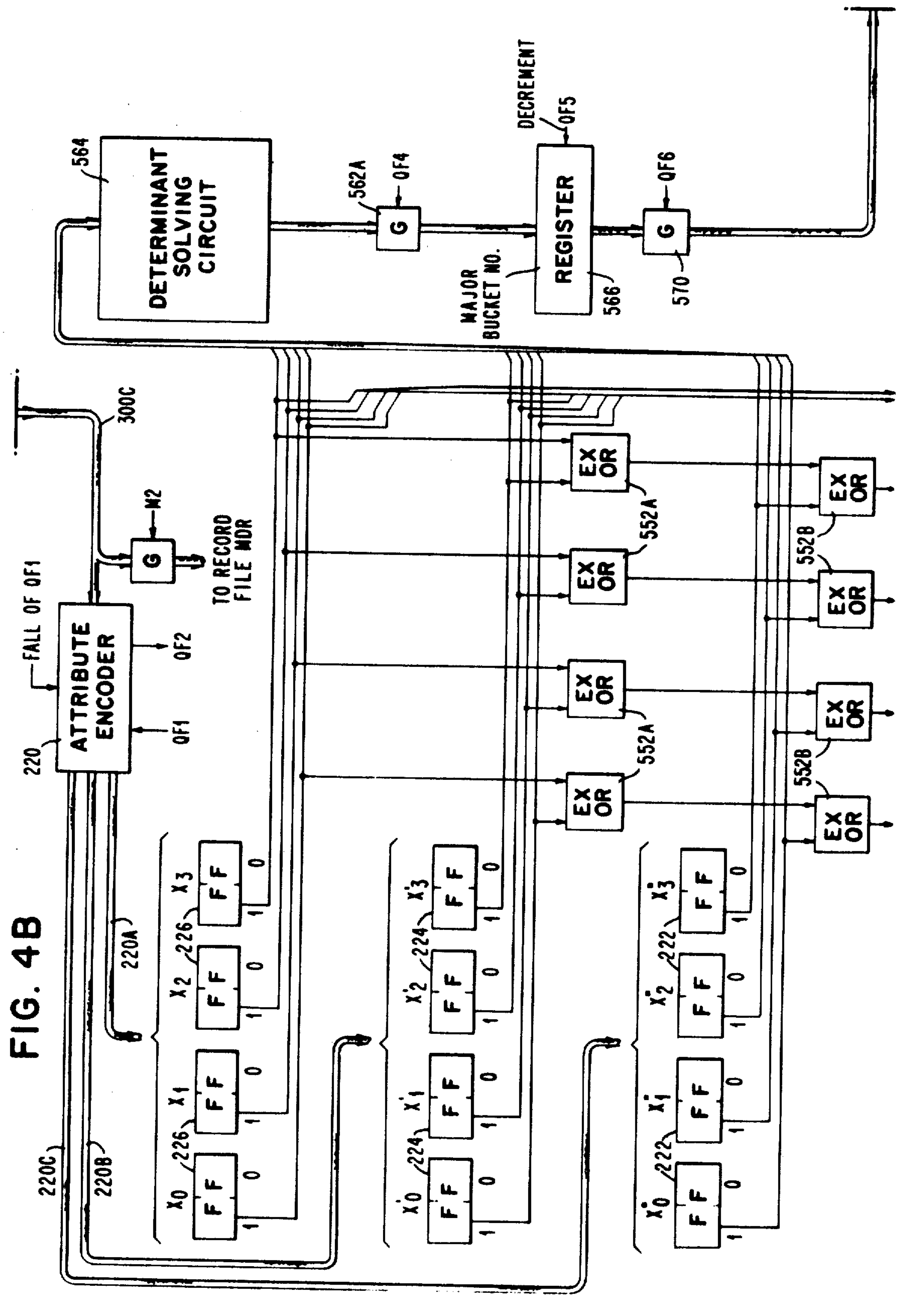
Figure 4C:
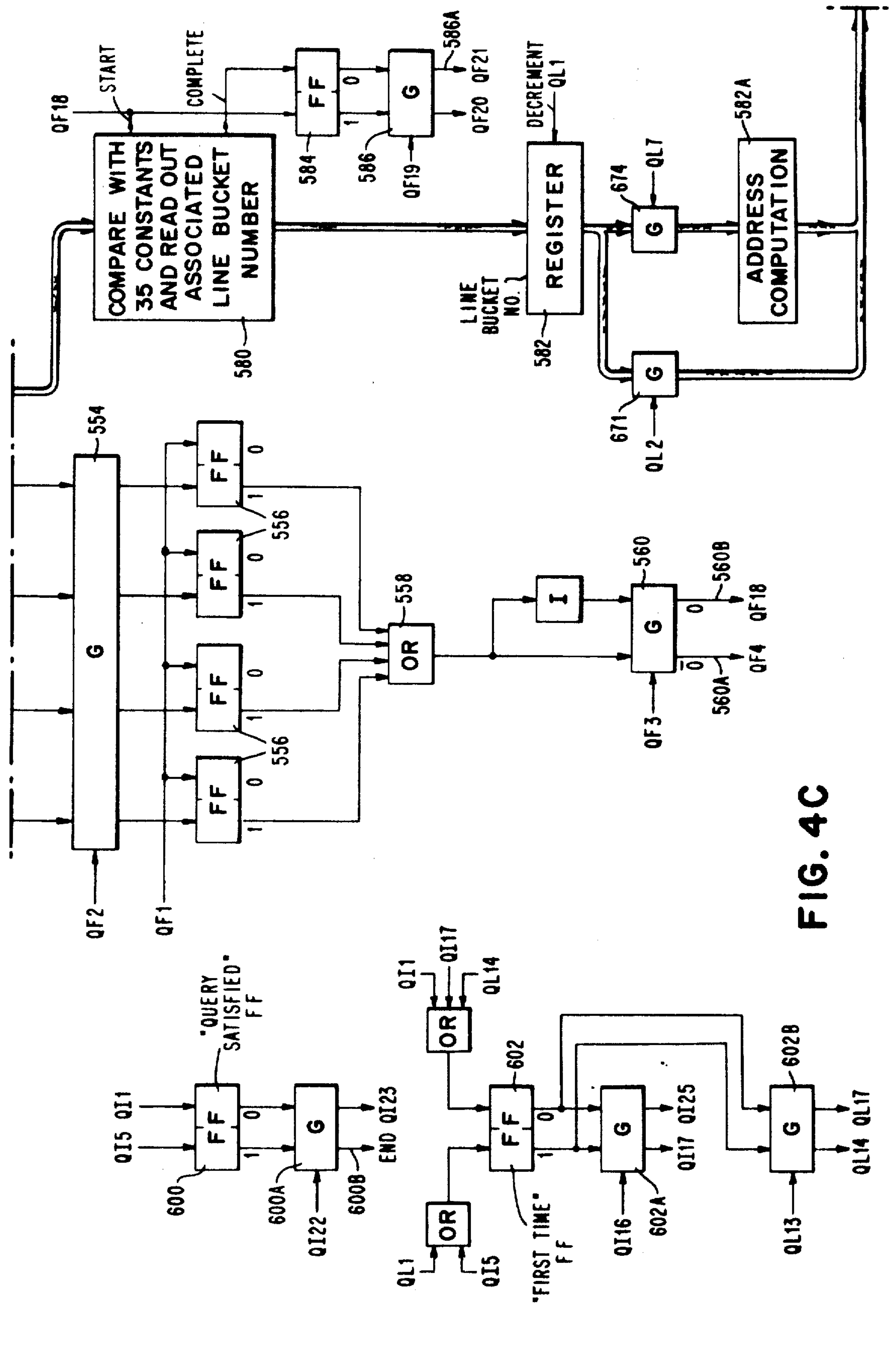
Figure 4D:
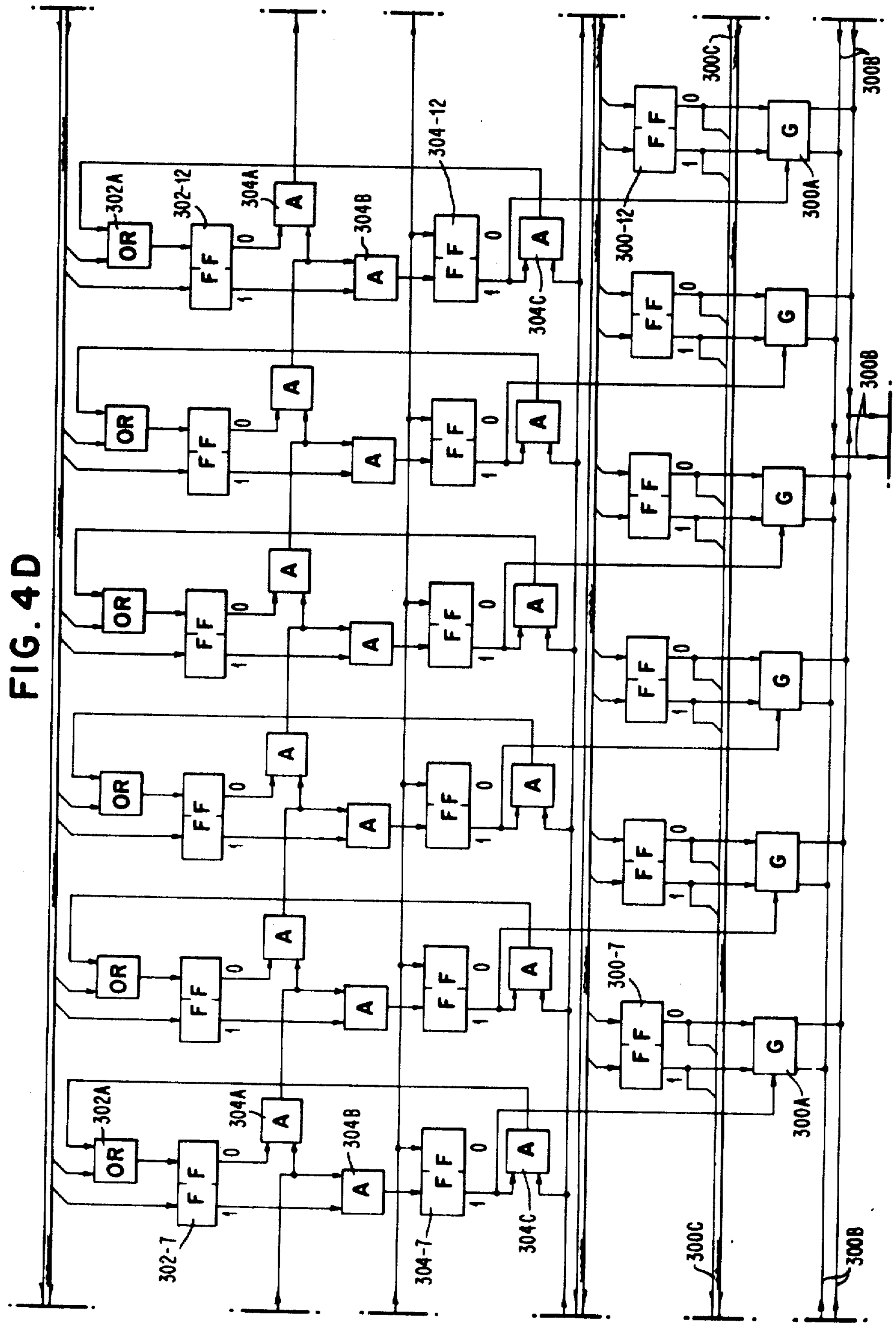
Figure 4E:
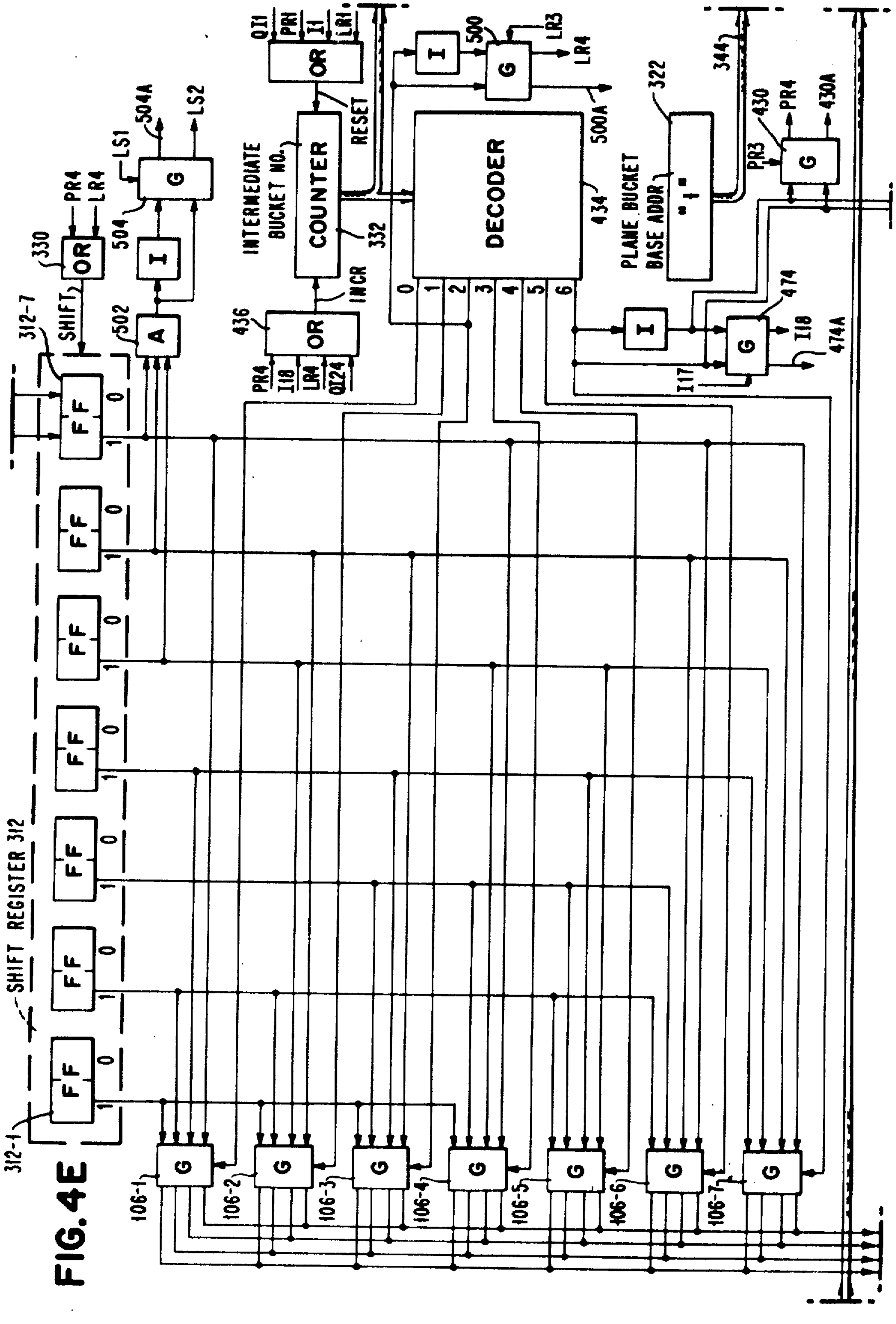
Figure 4F:
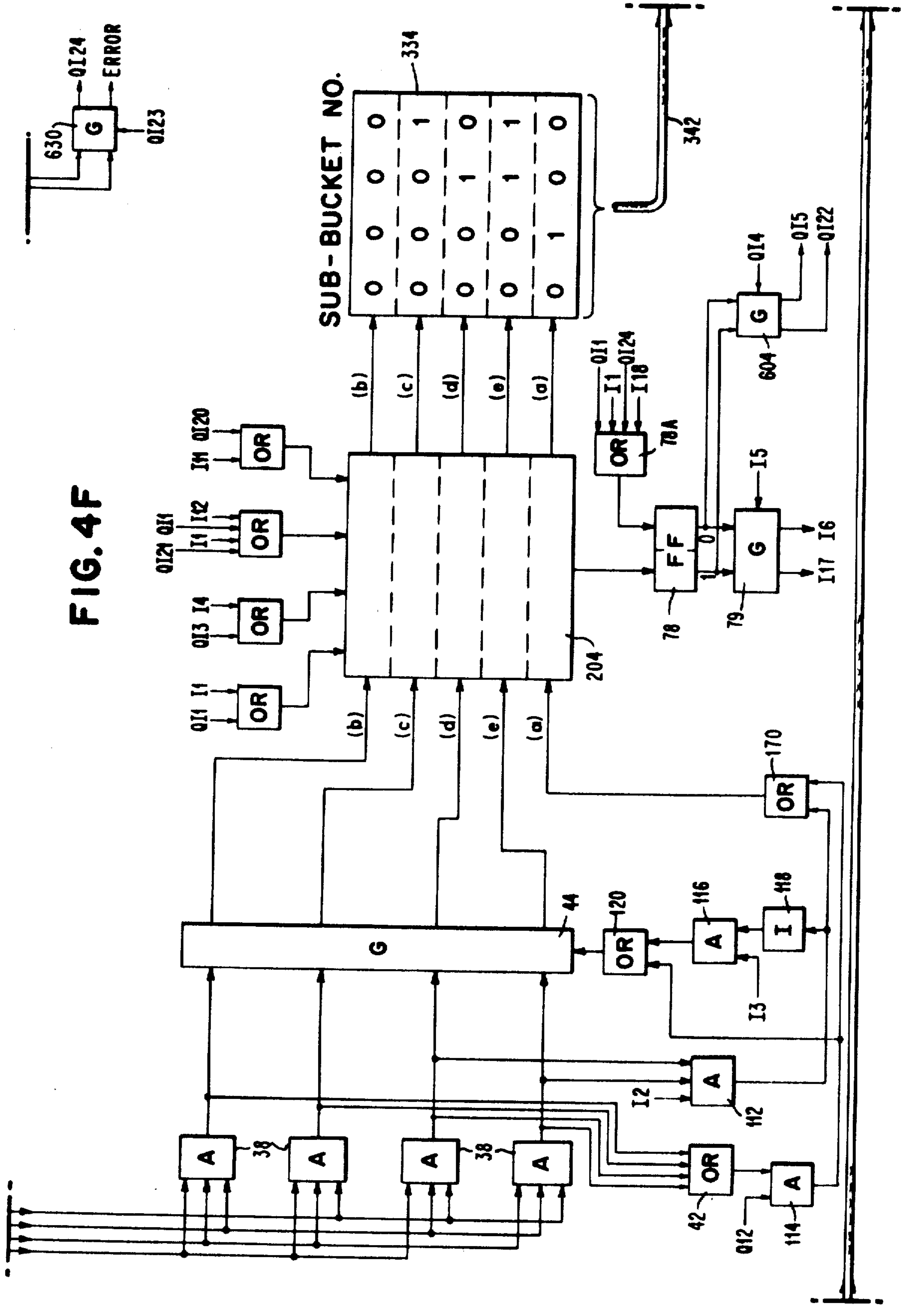
Figure 4G:
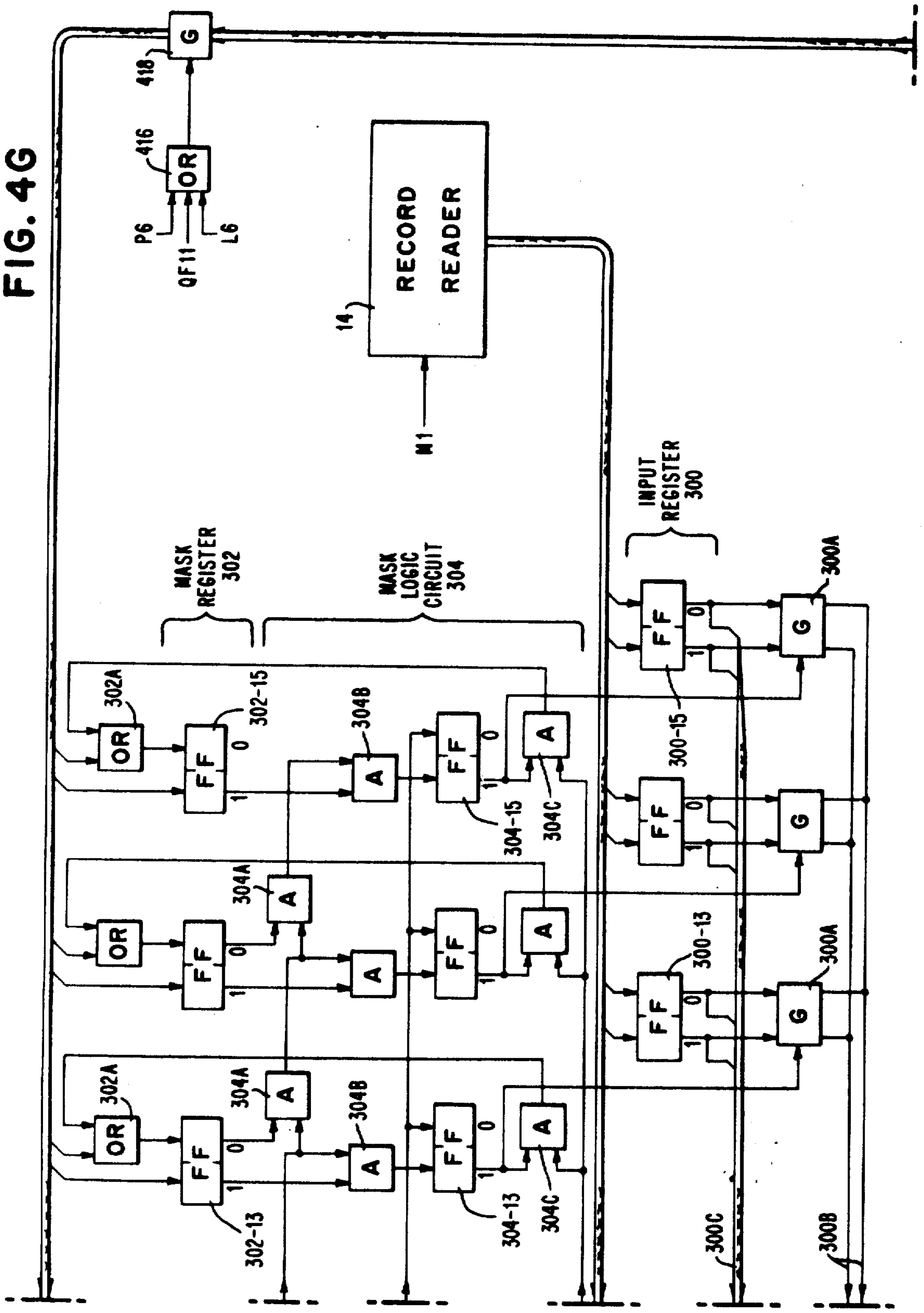

A store operation is used in this fourth embodiment by entering a record into a record reader 14 in FIG. 4G. Since the 15-bit attribute field of each record must be masked into groups of seven bits and three bits during the store operation, the record including the attribute field is not entered directly into the register connected to the analyzing circuitry as was the case in the previous embodiments. Rather the record is entered into a 15-bit input register 300 (FIGS. 4A, 4D, 4G) which includes in the attribute section 15 flip-flops 300–1 through 300–15. This register also includes a record section 300R shown in block form in FIG. 4A. The masks for changing the 15-bit attribute field into the required 7-and 3-bit words are entered in a mask register 302 which includes 15 flip-flops 302–1 through 302–15. The mask register 302 and input register 300 are connected by a mask logic circuit 304 which includes 15 flip-flops 304–1 through 304–15, and three groups of 15 AND circuits designated 304A, 304B and 304C. During a store operation the mask register 302, through the mask logic circuit 304, causes a 7- or a 3-bit word to be read from the input register 300 into a shift register designated 312 in FIG. 4E. This shift register includes seven flip-flops 312–1 through 312–7 and it is in these flip-flops that the particular 7-bit or 3-bit word which is to be analyzed during a store operation is stored.

Before discussing the store operation in detail some general remarks about the circuit diagram of this fourth embodiment and particularly about the addressing method employed are considered to be appropriate. First, as before, where the functional components perform the same operations as in previous embodiments, the same reference numerals are employed. Thus the seven gate circuits in FIG. 4E are designated 106–1 through 106–7 and the four AND circuits in FIG. 4F are designated 38. Similarly, the gating and other logical circuitry in FIG. 4F employs the same reference numerals as are employed in the second embodiment. The block 204 in FIG. 4F is exactly the same as the block shown in FIG. 3B of the third embodiment and includes the five rows of logical circuitry used to identify the *a*, *b*, *c*, *d* and *e* subbuckets during store and query operations. The output register 303 is fed via a cable 300C (FIG. 3A) to an attribute encoder 220, the output of which is applied to three groups of flip-flops 222, 224 and 226. These flip-flops are employed during a query operation to represent the four binary orders of the three attributes on which the query is made.

As pointed out in the general description given above, in this fourth embodiment the attribute file includes a first section (Section I) which is broken down into 15 major buckets, each corresponding to one of the planes in the geometry. Each of these major buckets is broken down into seven buckets, herein termed intermediate buckets, and each of these buckets is broken down into five subbuckets. There are, therefore, 525 subbuckets in Section I of the memory. Rather than storing the starting address location and next empty location in registers as in the previous embodiments, the appropriate addresses are either computed or stored in an address and mask store designated 320 and shown in FIG. 4H. In order to demonstrate the operation of the inventive method it is here assumed that each of the 525 subbuckets for Section I of the attribute file is assigned 100 locations. Each subbucket can, therefore, store the address of 100 records in the record file which match the attributes for that subbucket. There are, therefore, 52,500 locations required in the attribute file for the storage of these record addresses. There are 525 locations in the address and mask store which store address information corresponding to the buckets and subbuckets within the attribute file. More precisely, each of these 525 locations in the address and mask store 320 stores the next empty address location in the attribute file for the corresponding subbucket in Section I of the memory.

Address and mask store 320 also stores, in 35 further locations, the addresses of the next empty locations for each of the line buckets in Section II of the attribute file. Store 320 also stores the 15 masks for the major buckets or planes and the 35 masks for the 35 lines. These masks are used during store and query operations to change the 15-bit attribute field into 7- or 3-bit words upon which the attribute analyses are made.

Conventional address arithmetic is employed to arrive at the address which is placed in the MAR 320A for the address and mask store 320. Using this address the proper addresses in the attribute file is obtained. This arithmetic is based upon the formatting of the mask and address and store 320 in accordance with which the addresses for the 525 subbuckets of Section I are stored at locations 1–125 in store 320. The addresses of the 35 line buckets are stored in locations 526 through 560. The 15 plane or major bucket masks are stored at locations 561 through 575, and the 35 line masks are stored at locations 576 through 610.

Figure 4H:
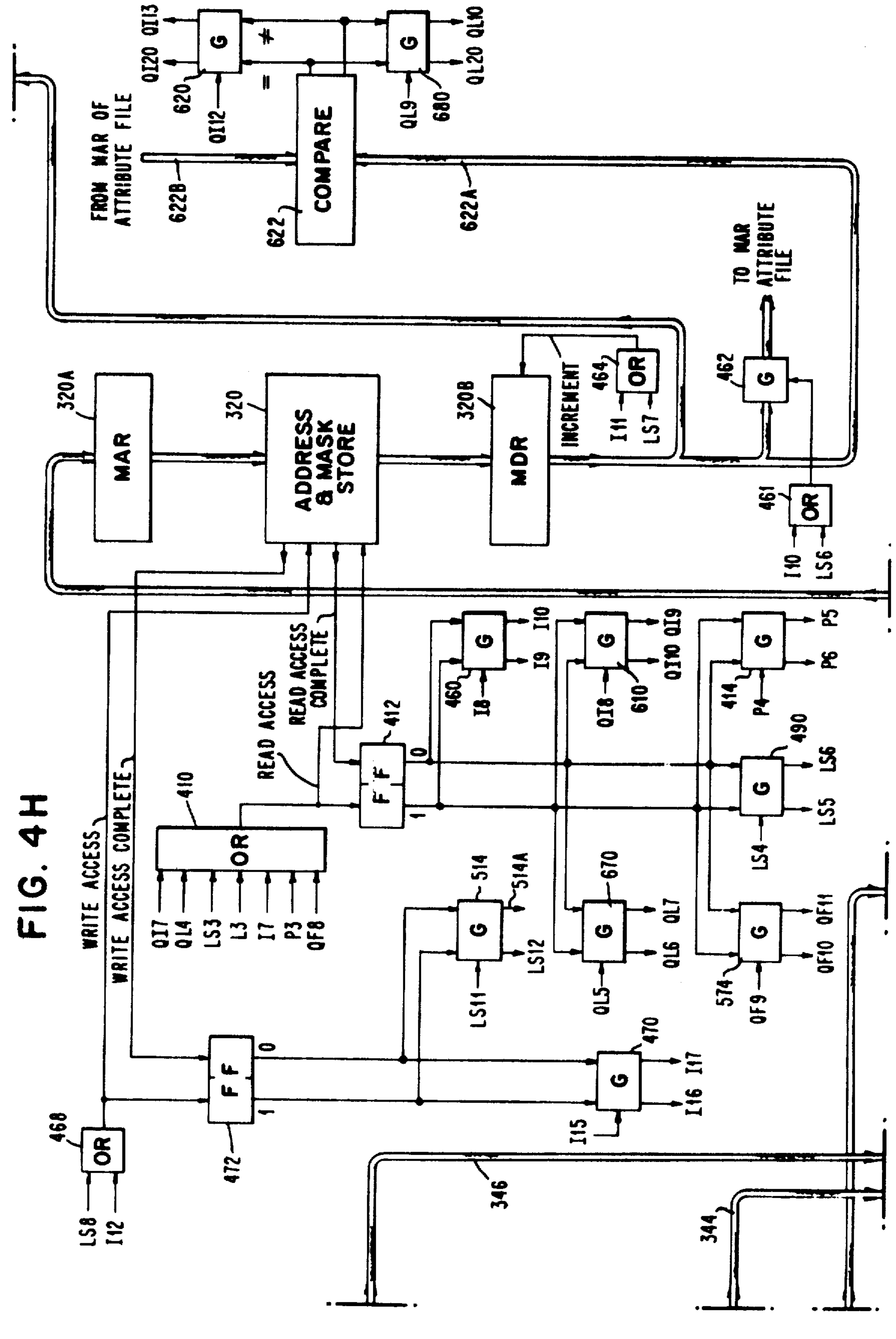
Figure 4I:
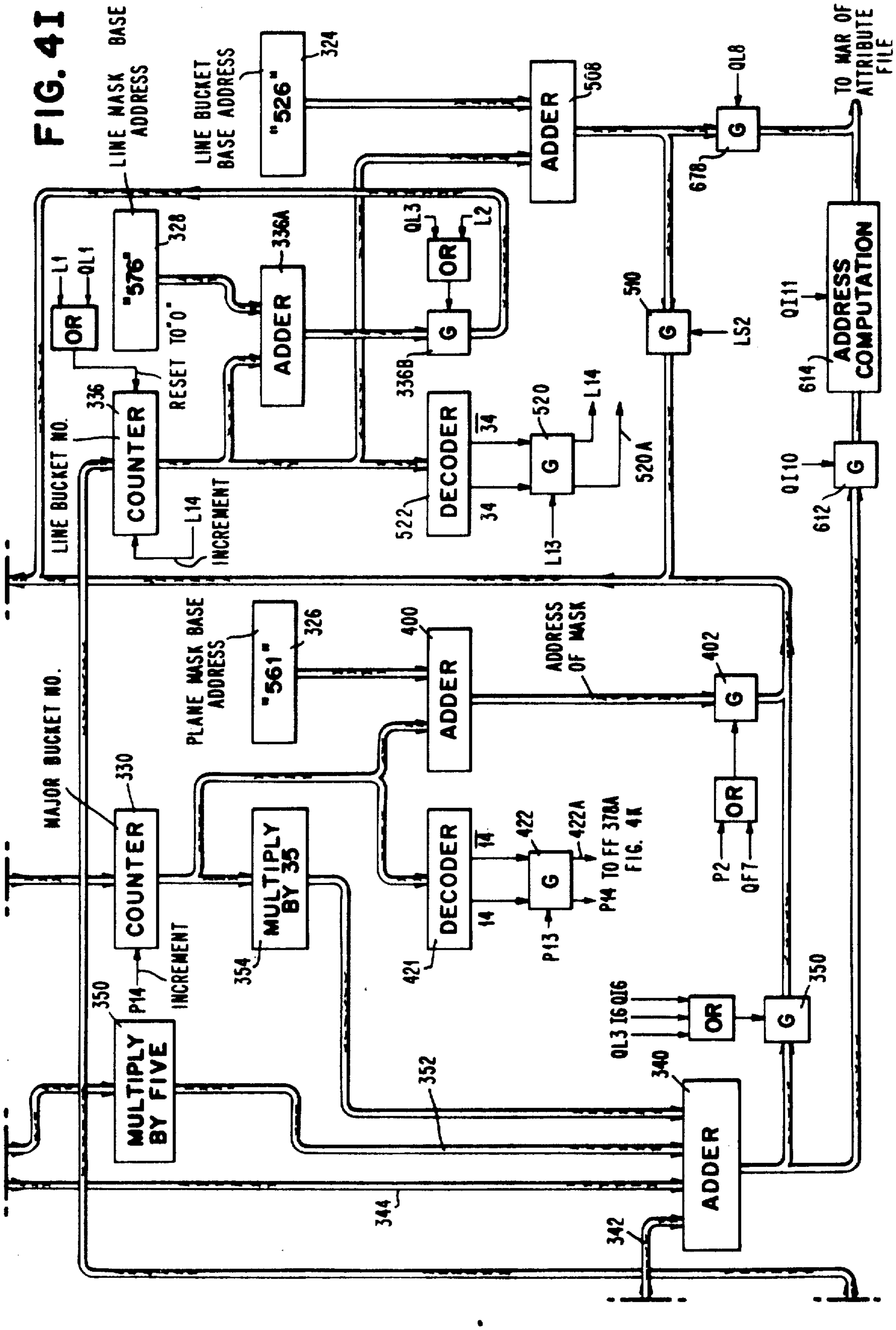

There are, therefore, four sections in address and mask store 320 and the base addresses for each of these sections is stored in an appropriate one of four registers designated 322 (FIG. 4E), 324, 326 and 328 (FIG. 4I). Register 322 is set at 1 since the 525 subbucket locations begin at the first location in the store 320. Register 324 is set at 526 since this is the beginning of the line bucket section of the store 320. Similarly register 326 for the plane mask is set at 561 and register 328 for the line masks is set at 576. In this way the base addresses for these four sections of store 320 are registered in the system. During operation of the system these base addresses are used in combination with values stored in a major bucket counter 330 (FIG. 4I), an intermediate bucket counter 332 (FIG. 4E) a subbucket number register 334 (FIG. 4F), and a line bucket counter 336 (FIG. 4I), to derive the proper address to transfer to the MAR 320A of store 320. Thus for example, during a store operation, an adder 340 (FIG. 4I) receives four inputs from which this adder determines the proper address to be entered into MAR 320A. The first input is applied via a cable 342 which is the output for the subbucket number register 334 and applies a binary value between 0 and 4 for the particular subbucket to be addressed. A second cable 344 transfers the base address directly from register 322 to adder 340. A third cable 346 transfers the value in intermediate bucket counter 332 (FIG. 4E) to a multiplier 350 which multiplies this value by five and transfers the product via a cable 352 as a third input to adder 340. The fourth input is derived from major bucket counter 330. The value in this counter is multiplied by 35 in a multiplier 354 and the product applied as an input to adder 340.

The value stored in counter 330 during each operation depends on which of the major buckets has been identified for the operation and this counter is set at one of 15 values between 0 and 14 according to which of the 15 major buckets is being operated upon. The multiplier 35 is, of course, derived from the fact that there are 35 subbucket within each major bucket. Intermediate bucket counter 332 is set at a value between 0 and 6 according to which of the seven buckets within a major bucket is identified for the particular operation. The multiplier 5 is derived from the fact that there are five subbuckets within each bucket of Section I of the attribute file. In this fourth embodiment the structure of the attribute file and its associated circuitry and that of the record file and its associated circuitry is not shown since the operation of this circuitry, once the proper addresses have been identified, is the same as that described above for the other embodiments.

The sequence of operations for storing is divided up among seven subroutines or clocks. The manner in which these subroutines are initiated and terminated is indicated by the block diagrams in FIG. 4K and the details of the subroutines are shown in seven flow charts, FIGS. 4K–1 through 4K–7. The main or monitor (M) clock is shown in FIG. 4K–1. The store operation is initiated by this clock and the first operation is to read a record under the control of the M1 pulse from record reader 14 (FIG. 4G) into input register 300. Clock pulse M2 loads the memory address register and the memory data register of the record store (not shown) and starts the clock called the plane P routine. This clock which is abbreviated P, is shown in FIG. 4K–2. The operation indicated within blocks 370 and 372 in FIG. 4K–1 occur in parallel and they are both initiated by the clock pulse M2. Clock pulse M3 initiates the write access of the record store (not shown). Clock pulse M4 tests to see if the plane routine shown in FIG. 4K–2 is completed. This operation is shown by the block labeled 374 on FIG. 4K–1.

The microprogram included in FIG. 4K–2 is shown diagrammatically by the block labeled 378 in FIG. 4K. The clock pulse M2 starts the program and also sets a flip-flop 378A to its 1 state. When the program is complete, it sets flip-flop 378A to its 0 state and an M6 output is then provided by a gate 378B in response to the M4 clock pulse. The same arrangement is used in the blocks labeled 380, 382, 384, 386 and 388. When flip-flop 378A is set to its 0 state, the M program is allowed to proceed to clock step M6. Clock step M6 starts the line routine L program shown in FIG. 4K-5. This program is represented in FIG. 4K-1 by block 392. Flip-flop 384A (FIG. 4K) is set to its 1 state by the M6 pulse at the same time that the program in FIG. 4K-5 is started. When the program in FIG. 4K-5 is completed, flip-flop 384A is set back to 0 and the M clock can advance to M9. M9 increments the record store address counter (not shown). The clock next advances to step M10 which tests to see if the record store operation is complete in the same manner as described above with reference to the first embodiment. At the end of the record store operation, the M clock shown in FIG. 4K-1 reverts back to its beginning and the new record is read.

The purpose of the "plane routine" shown in FIG. 4K-2 is to store the address for the record in the major bucket if it includes any combination of three of the seven attributes for the plane corresponding to the major bucket. This routine also uses subroutines which are shown on FIG. 4K-3 and FIG. 4K-4. The plane routine retrieves each of the 15 plane or major bucket masks in order. The plane reduction subroutine reduces the 15-bit attribute field for the record to a 7-bit configuration. The intermediate bucket routine I of FIG. 4K-4 is carried out on each of these 7-bit configurations.

The P1 pulse of the plane routine (FIG. 4K-2) resets the major bucket number counter 330 (FIG. 4I) to zero. The value in counter 330 is combined in an adder 400 with the base address of the plane mask stored in register 326. The sum address is gated by the P2 pulse applied to a gate 402 through a cable 404 to the MAR 302A (FIG. 4H) of store 330. The P3 clock pulse is applied through an OR circuit 410 to initiate a read access of the address and mask store 320. The P4 tests a gate 414 to see if this access is complete. When it is complete, the clock proceeds to P6. This pulse is applied through and OR circuit 416 (FIG. 4G) to a gate 418 which then gates the MDR 320B of the address and mask store to the mask register 302.

The seventh P clock pulse, P7, is applied as shown in FIG. 4K to start the plane reduction routine shown in detail in FIG. 4K-3. P8 tests gate 380B to see if this routine is complete and when it is complete, the clock proceeds to P10. P10 starts the intermediate bucket routine I shown on FIG. 4K-4. P11 tests for the completion of this routine (gate 382B in FIG. 4K) and when it is complete, the clock advances to P13. P13 tests the setting of the major bucket number counter 330 (FIG. 4I). The output of this counter is fed through a decoder 421 to a gate 422 to which the P13 pulse is applied. If counter 330 is on 14, it is the end of the plane routine shown in FIG. 14K-2 and the output 422A of gate 422 sets flip-flop 378A in FIG. 4K to zero. If the major bucket number counter is not on 14, the clock advances to P14 which increments the major bucket number counter and the P clock reverts to P2 in order to take the next mask in succession. The location of this mask is derived from the adder 400 (FIG. 4I) and is transmitted through gate 402 to the MAR 320A (FIG. 4H) of the address and mask store 320.

FIG. 4K-3 is the plane reduction (PR) routine referred to in the previous description for FIG. 4K-2. The purposes of this program is to compress the 15 bits of the input register 300 into seven bits under control of the mask register 302. Clock pulse PR1 is applied through OR circuit 308 (FIG. 4A) to reset the chain of 15 flip-flops 304-1 through 304-15 in mask logic circuit 304. PR1 also resets the intermediate bucket number counter 332 in FIG. 4E to zero. The PR2 clock pulse is applied through OR circuit 306 to the fifteen AND circuits 304B. This clock pulse causes a signal representing the binary value of the position in the 15-bit attribute field (stored in input register 300), which is the first of the seven positions for the plane or major bucket corresponding to the mask stored in mask register 302, to be transferred through an appropriate one of the gates 300A to the corresponding one of the lines 300B. This signal sets the low order flip-flop 312-7 of shift register 312 to either binary one or binary zero according to value stored in the flip-flop in input register 300 which is then controlled by the mask to be read out.

There are seven of these transfer operations, each one followed by a shift of the shift register 312. The shift operation in the shift register is from right to left. Consequently, the entry into the shift register is always into flip-flop 312-7, which is the right hand stage of the shift register. The clock pulse PR2 is applied through OR circuit 306 to determine the first flip-flop starting from the left of the mask register 304 which is in its binary one state. To illustrate this, let it be assumed that flip-flop 302-1 is in its zero state, and flip-flop 302-2 is in its one state. The P2 pulse from OR circuit 306 now travels through first AND circuit 304A, which is connected to the binary zero output of flip-flop 302-1, and then through the second of the AND circuits 304B, which is connected to the binary one output of flip-flop 302-2. The output from this second AND circuit 304B sets flip-flop 304-2 to binary one and the output of this flip-flop then activates the second one of the 15 gates 300A. The binary value then stored in flip-flop 300-2 of the input register 300 is transmitted through the gate to the appropriate one of the lines 300B and entered in the low order flip-flop 312-7 of shift register 312 in FIG. 4E.

Before the PR4 clock pulse is applied to shift register 312, the PR3 clock pulse is applied to a gate 430 in this same FIG. to determine whether or not the intermediate counter 332 is then standing at six. If it is, the plane reduction routine is completed and an output is produced on a line 430A. If not, as will be assumed to be the case here, an output is produced to cause the plane reduction routine to continue with a PR4 clock pulse. This pulse increments counter 332, causes a shift operation to be performed in shift register 312, and resets the mask flip-flop 302-2 in mask register 302 to zero. The resetting of flip-flop 302-2 is accomplished by applying the PR4 pulse through OR circuit 310 (FIG. 4A) to each of the AND circuits 304-2. At this time, only the AND circuit in the second column, which is connected to the binary one output of flip-flop 304-2, produces an output. This output passes through OR circuit 302A for this second column to reset mask register flip-flop 302-2. The clock then advances to PR5 which is applied through OR circuit 308 to reset flip-flop 304-2 to its zero state. The PR clock then reverts back to PR2 which finds the next 1 in the mask register 302 and transfers the binary value in the corresponding input register flip-flop to the shift register 312. This operation continues until seven of these transfers have been accomplished.

As there are seven transfers and each is followed by a shift operation, the binary values in shift register 312 correspond with the contents of the input register flip-flops which are aligned with the mask register flip-flop then storing binary ones. Because each plane mask contains seven binary ones, seven bits which are the values in the corresponding positions of the input register 300 are transferred to the shift register 312. When the plane reduction routine is carried out under control of the first plane mask retrieved from address and mask store 320 (FIG. 4H), the selected positions of the input register are those for attributes $A_2$, $A_4$, $A_6$, $A_8$, $A_{10}$, $A_{12}$, $A_{14}$, which are the seven attributes for major bucket B4; the second plane mask selects the positions for attributes $A_1$, $A_4$, $A_5$, $A_8$, $A_9$, $A_{12}$, $A_{13}$, which are the seven attributes for major bucket B3. The sequence of the plane masks is determined by the binary numbers for the planes (Table in General Summary below).

As has been stated above, before the PR4 clock pulse is applied 1 shift register 312 during the plane reduction routine on any one of the plane masks, the PR3 clock pulse is applied to a gate 430 in this same FIG. to determine whether or not the intermediate bucket number counter 332 is then standing on six. The output of counter 332 is transmitted through a decoder 434 having seven output lines, one for each of the seven values which can be stored in the counter. When the counter has been incremented to six by the previously applied PR4 pulse transmitted through an OR circuit 436, this indicates that the last operation of the plane reduction routine read out the seventh position in the input register 300 for that mask. In such a case, the entire 7-bit word has already been transferred into shift register 312–7 and the circuitry is in a condition to analyze this word for the combination of attributes present. The plane routine is therefore terminated at this time under the control of the signal transmitted from 6 output line of decoder 434. This signal is gated by gate 430 under control of the PR3 clock pulse to line 430A.

The signal on line 430A resets flip-flop 380A in FIG. 4K to its binary zero state. During the above described operation, the plane clock pulse P7, which was applied to initiate the plane reduction routine, also sets this flip-flop in its binary one state. The next following P8 pulse for the plane routine is applied to gate 380B and produces a P9 output. The P9 output clock pulse merely produces a delay causing the P8 clock pulse to be continuously applied until flip-flop 380B has been set to binary zero indicating the end of the plane reduction routine. An output is then produced on the P10 output of gate 380B to initiate the intermediate bucket (I clock) subroutine which is represented in block form at 382 in FIG. 4K and in more detail in FIG. 4K–4. This subroutine is carried out after each plane reduction routine has caused the proper 7-bit word to be entered into shift register 312. There are 15 plane masks and the plane routine (P clock) causes each mask to retrieve in succession from the address and mask store 330. Once the mask is entered in the mask register, a plane reduction subroutine (PR clock) is initiated by the P7 clock pulse to form the proper 7-bit word in the shift register 312. Then the intermediate bucket subroutine described immediately below is initiated by clock pulse P10 which is produced after the plane reduction subroutine completion has been indicated by the setting of flip-flop 380A to its binary one state.

The intermediate bucket routine (I clock) is repeated seven times for each plane mask. The operation is much the same as that described above with reference to the third embodiment. During each intermediate bucket subroutine, one of the gates 106–1 through 106–7 is activated to allow signals to be applied to AND circuits 38. During each such operation four of the attributes in shift register 312 are analyzed. If all four are present, the record address is entered in the attribute file in the *a* subbucket for the particular bucket (one through seven) within the major bucket corresponding to the plane mask used to derive the 7-bit word in shift register 312. If three only of the four attributes are present, then the record address is entered in the appropriate one of the *b, c, d,* or *e* subbuckets.

The first or I1 clock pulse resets intermediate bucket number counter 332 to zero, resets the flip-flops in the logical circuit represented by block 204 in FIG. 4F to zero, and resets flip-flop 78 to zero. The clock then advances to I2 and also to I3 through a delay. The rise of I2 is before the rise of I3 and the fall of I2 is after the fall of I3. Clock pulse I2 is applied to AND circuit 112. If there is a quadruplet (all four attributes present), a signal is applied by the *a* subbucket input line to the lower row of logical circuitry represented by blocks 204. If only three of the attributes are present, a signal is passed through gate 44 to an appropriate one of the other four input lines (*b, c, d* and *e*) to the logical circuitry of block 204.

It should be understood at this point that in the four flip-flops of the shift register that are examined at any one time, there may be no triplet at all present. In this case, none of the five input lines to block 204 are activated. Flip-flop 78 is then reset to its binary one state when the I4 pulse is applied. An output is then produced on the I17 output of gate 79 when the I5 clock pulse is applied. This pulse, at this time, indicates that no store operation need be carried out in the attribute file for the particular combination of four attributes then being analyzed.

If a three or four of the attributes being analyzed are present in the record, and, therefore, binary ones are stored in the appropriate flip-flops of shift register 312, the I4 clock pulse causes a signal to be produced on the appropriate one of the five subbucket output lines for blocks 204. The signal on this line carries the one of the five binary numbers corresponding to the selected subbucket to be read out of the register 334 and transmitted via cable 342 as one output to adder 340 (FIG. 4I). This adder receives its other three inputs as described above from the plane bucket base address register 322, the intermediate bucket number counter 332 (multiplied by five at multiplier 350), and the major bucket number counter 330 (multiplied by 35 at multiplier 354). In response to these inputs, adder 340 produces the address of the location in the address and mask store 320, which contains the address of the next empty location in the subbucket of the attribute store in which the record address is to be stored. The address from adder 340 is transmitted to the MAR 320A of the address and mask store through a gate 350 under the control of the I6 clock pulse. This clock pulse is produced when the I5 clock pulse is applied to gate 79 in FIG. 4F with flip-flop 78 in its binary zero state. Thereafter the I clock pulses, beginning with the I7 pulse, carry a read access operation to be performed on store 320 (FIG. 4H). The proper attribute file address is then read into MDR 320B and upon completion of this operation, an I10 pulse is produced at the output of a gate 460. This pulse is applied through an OR circuit 461 (FIG. 4H) to a gate 462 to gate the attribute file address in MDR 320B to the MAR of the attribute file (not shown). At the same time, the address of the record in the MAR of the record store (not shown) is gated to the MDR of the attribute file and the following I clock pulses cause a write operation in the attribute file to be performed in the manner described above with reference to the first embodiment.

The I11 clock pulse is applied through an OR circuit 404 to increment the address in the MDR 320B. This incremented address specifying the new next empty address location in the attribute file, is written in the address and mask store 320. The write operation is initiated by the I12 clock pulse which is applied through an OR circuit 68. The I13 and I14 clock pulses are not shown in the FIG., but these pulses are necessary to test for the completion of the write access operation in the attribute store. When this operation is completed to write the record address at the proper location in the designated subbucket of the attribute store, the I15 clock pulse is produced. This pulse is applied to a gate 470 which is controlled by a flip-flop 472 to produce an I17 output pulse when the write access operation has been completed in address and mask store 320.

The I17 pulse produced in this way signifies the end of the store operation in store 320 and in the attribute file. This pulse is applied to a gate 474 (FIG. 4E) to test to see if the intermediate bucket number counter 332 is on six. If not, the output from decoder 434 applied to gate 474 causes an I18 output to be produced by this gate. The I18 clock pulse is applied through OR circuit 78A in FIG. 4F to reset flip-flop 78 to its zero state in preparation for the analysis for another set of four attributes. The I18 pulse also increments intermediate bucket number counter 332 in FIG. 4E and the output of the incremented counter is applied through decoder 434 to a proper one to the seven output lines for the decoder to activate the appropriate one of the gates 106–1 through 106–7 for the next intermediate bucket routine operation.

There are seven such operations performed on each 7-bit number entered into shift register 312. Each operation is controlled by the I clock pulses as described above. Upon completion of the last operation, an I17 clock pulse is produced either by gate 79 in FIG. 4F, if no triplet or quadruplet is present among the four attributes being analyzed, or by gate 474 in FIG. 4E if a triplet or quadruplet is present and a store operation is carried out in the attribute file. Intermediate bucket number counter 332 is then at six and the I17 pulse applied to gate 474 produces an output on line 474A, which output is applied to flip-flop 382A in FIG. 4K to reset this flip flop to zero. The P11 plane clock pulse then produces a P13 output. The P13 clock pulse which is a plane routine pulse is applied to gate 422 in FIG. 4I. This gate is controlled by a decoder 421 which receives its inputs from counter 330. If this counter is not yet at 14, gate 442 produces a P14 output pulse; and this pulse is applied to increment counter 330 and initiate a new set of P clock pulses beginning with the clock pulse P2. Thereafter, the operation is the same as described above and is carried out on the plane or major bucket corresponding to the value then present in counter 330. Upon completion of the plane routine, and the included plane reduction intermediate bucket subroutines for the last major bucket, the P13 clock pulse applied to gate 422 produces an output on line 422A which resets trigger 378A in FIG. 4K to zero allowing the gate 378B to then produce an M6 clock pulse output. This pulse indicates that the plane routine is completed for all of the major subbuckets and is applied to block 384 in FIG. 4K to initiate the line routine which is shown in detail in FIG. 4K–5.

The line routine includes a line reduction subroutine (FIG. 4K–7) and a line store subroutine (FIG. 4K–7), and these operations are similar to the operations described above which are carried out on the plane or major buckets. The operation differs in that the mask entered into mask register 302 for each of the 35 line buckets in Section II of the attribute file is a three bit mask. Each mask is retrieved from address and mask store 320 under the control of the L clock pulses and is stored in mask register 302. This transfer is accomplished under control of the L6 clock pulse applied to gate 18 in FIG. 4G. The next following L7 pulse is applied in FIG. 4K to block 386 to initiate the line reduction routine (LR) and set the trigger 386A for this routine to its binary one state. The LR clock pulses then reduce the 15-bit attribute word in input register 300 to the proper 3-bit word identified by the mask in mask register 302. This 3-bit word is entered in the three low order flip-flops of shift register 312. When the last of the three bits has been entered into this shift register, a gate 500 shown in FIG. 4E, which is controlled by the 2 output line of decoder 434, produces an output on its output line designated 500A. This output is applied to reset flip-flop 386A in FIG. 4K to indicate completion of the line reduction routine for the mask then in mask register 302. An L10 clock pulse is then produced by gate 386B, and this clock pulse is applied to block 388 in FIG. 4K to initiate the line store routine (LS) and set the flip-flop 388A for this routine to its binary one state. The line store routine is simpler than the intermediate bucket routine, since it is only necessary to test and see if the three values in the three low order flip-flops of shift register 312 are binary ones. If so, an AND circuit 502 produces an output which is gated by a gate 404 to produce an LS2 clock pulse and continue the line store subroutine. Under control of the LS clock pulses, the proper address for the location in address and mask store 320 at which the next empty attribute file address for line bucket under consideration is stored is obtained from an adder 508 (FIG. 4I). This adder is controlled by line bucket base address register 526 and line bucket number counter 336, and the output of the adder is gated through a gate 510 to the MAR 320A of store 320. The appropriate next address is then read out of store 320 into its MDR 320B and transferred through gate 462 by the LS6 clock pulse to the MAR of the attribute file. At the same time, in the circuitry not shown but described above with reference to the previous embodiments, the record address in the MAR of the record file is gated to the MDR of the attribute file. A write operation is carried out to write the record address in the attribute file at the address obtained from the address and mask store 320.

The LS7 clock pulse increments the address in MDR 320B, and this incremented address is then written back into store 320 at the location for the line bucket specified by the address in MAR 320A. Upon completion of the store operation in store 320 and the attribute file not shown, the LS11 clock pulse is applied to a gate 514 which produces an output on its output line 514A which is applied in FIG. 4K to reset flip-flop 388A indicating that the line store routine for the particular line bucket has been completed. A line routine clock pulse, specifically an L13 pulse, is then produced which applied to a gate 520 shown in FIG. 4I. This gate receives its input from a decoder 522 which is connected to the line bucket counter 336. If counter 336 is at 34, indicating that the analysis has been completed for each of the line buckets, an output pulse is produced on line 520A. This pulse is applied to reset flip-flop 384A in FIG. 4K indicating completion of the store operation on the line buckets in the file. An M9 clock pulse is then applied in a manner described above to increment the record store address counter so that the next store operation for a record is carried out at the proper address. Another monitor clock pulse is also employed to test to see if the record store operation for the record analyzed as described above has been completed, and an output is then provided indicating the end of the store operation.

When the L13 clock pulse, as described above, is applied to gate 520 at a time when counter 336 has not reached 34, an L4 clock pulse is provided which increments counter 336 and begins another line routine begun with the line clock pulse L2. There are 35 such operations during each of which the line routine (L clock pulses) transfer the address for the line bucket from store 320 to the mask register 302. The line reduction routine LR clock pulses then form the proper 3-bit word in shift register 312 and if the three bits are all binary ones, the line store routine is carried out to store the record then under consideration at the proper address in the attribute file. This address is retrieved from the address and mask store 320. If the 3-bit word in shift register 312 includes one or more binary zeros, the LS1 clock pulse applied to gate 504 produces an output line 504A which is applied in FIG. 4K at set trigger 388A to its zero state. This indicates the end of the line store operation and is proper here, since under these conditions the record address is not to be stored in the attribute file in the line bucket attribute file then indicated by the value in bucket 386.

Upon completion of these operations, the L13 clock pulse applied to gate 520 in FIG. 1, which is then at 34 produces an output on line 520A which resets flip-flop 384 in FIG. 4K terminating the line routine and initiating the last steps of the monitor clock which are required to complete the store operation.

Query Operation

During a query operation, which in the fourth embodiment is carried out on three attributes, a 15-bit binary word is entered into input register 300. This word includes binary ones in the three positions of the attribute field on which the query is to be made. This 3-bit query is first encoded into three 4-bit binary numbers which are analyzed by circuitry shown in FIGS. 4B and 4C to determine whether the three attributes correspond to three points on a line in the geometry. If this is the case, the particular one of the 35 lines is determined and this information is used to obtain from the address and mask store 320 the next empty address for the corresponding line bucket. This address determines the last address in the attribute file which must be interrogated during the query operation. The starting address in the attribute file is determined by address arithmetic which is based upon the manner in which the files have been formatted. With these two addresses, all of the record addresses in the attribute file for records matching the query are obtained. Using these addresses, the appropriate records are read out of the record file.

If, when the three binary numbers representing the query are applied to the circuitry of FIGS. 4B and 4C, an output is provided indicating the three attributes are not on a line, the circuitry is first controlled to determine which of the planes and, therefore, which of the major buckets contain the record addresses matching the query. Once the major bucket is determined the mask for that plane is obtained from store 320. Using this mask, a plane reduction routine of the type described above is carried out to form a 7-bit word which is entered into shift register 312. The circuitry is then controlled by serially applying pulses to gates 106–1 to 106–7 in FIG. 4E to determine which of the buckets within the major bucket, and which subbucket in this bucket, matches the query. It is, of course, necessary to read out from the attribute file two subbuckets during any such operation. The *a* subbucket is always read out and the one of the four remaining subbuckets which matches the query is also read out of the attribute file in the same manner as has been described in the previous embodiments.

The last address for the query operation on each of the subbuckets is determined by the address stored in address and mask store 320. The first address is realized by address computations which are based upon the formatting of the file. Using these addresses, the two subbuckets in the attribute file are interrogated and the record addresses obtained from this file are used to read out the desired records from the record file.

Figure 4J:
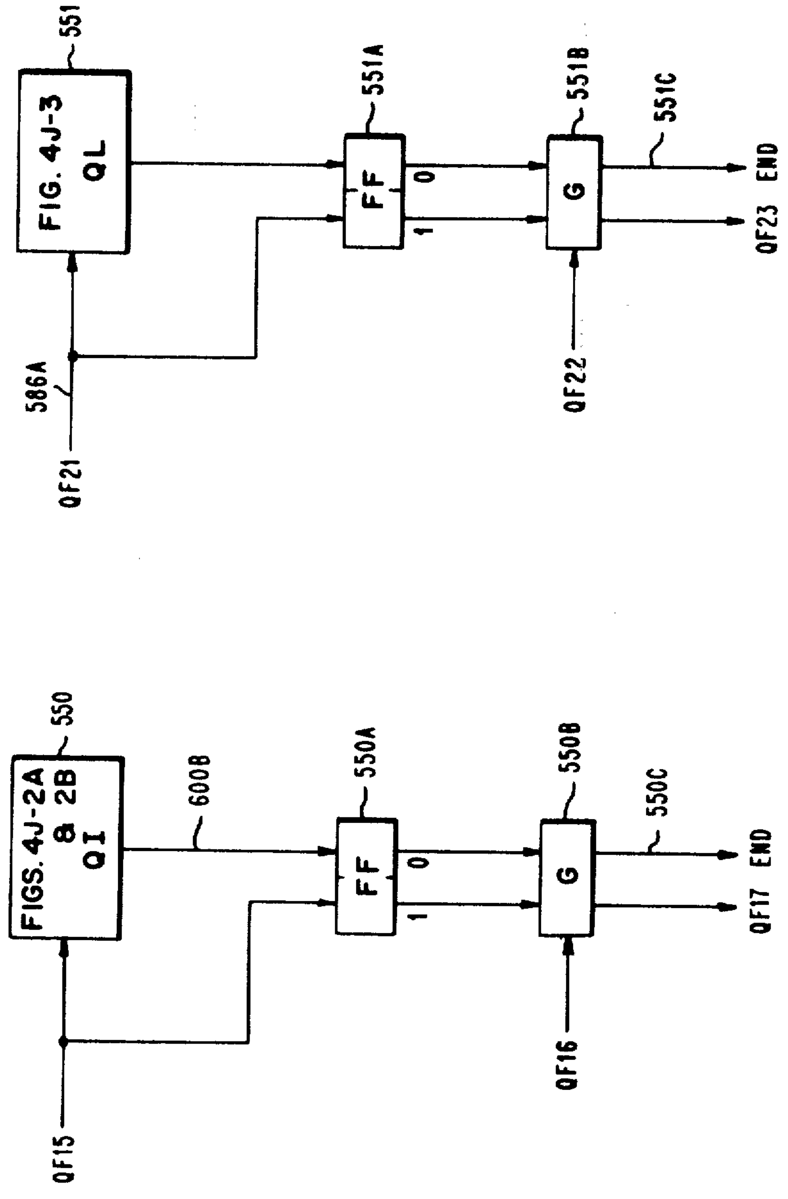
Figures 1, 4J:
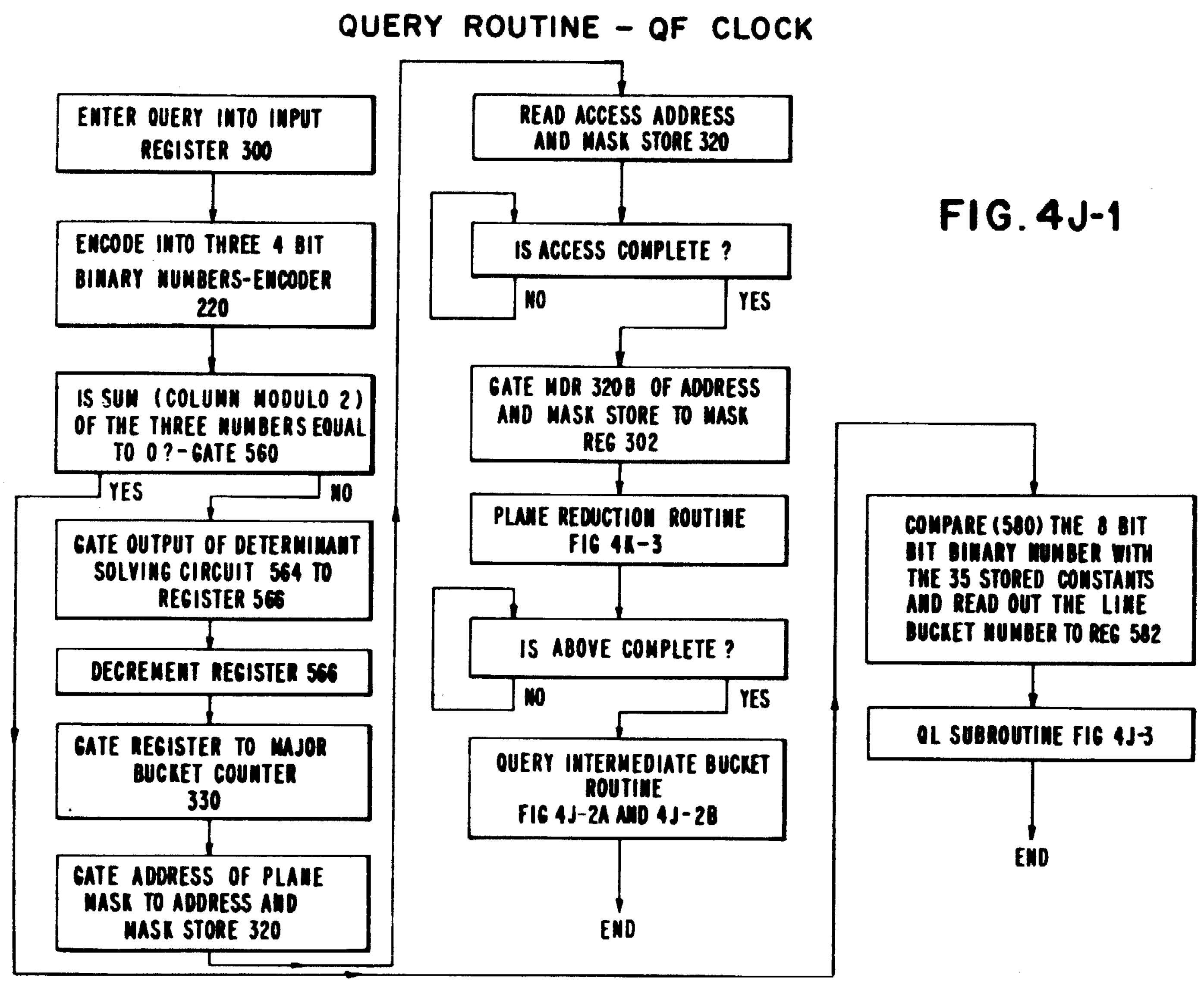
Figures 2B, 4J:
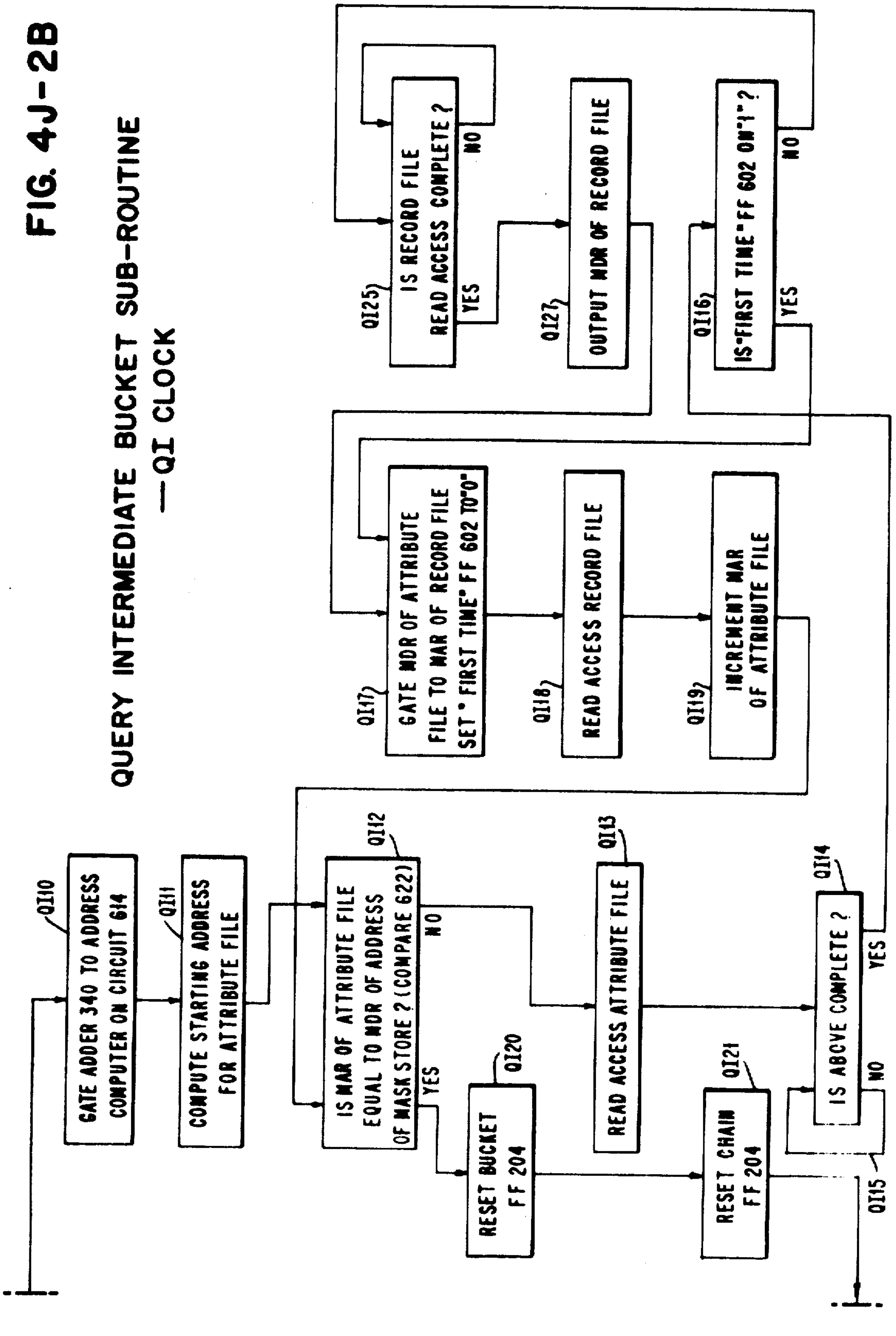
Figures 3, 4J:
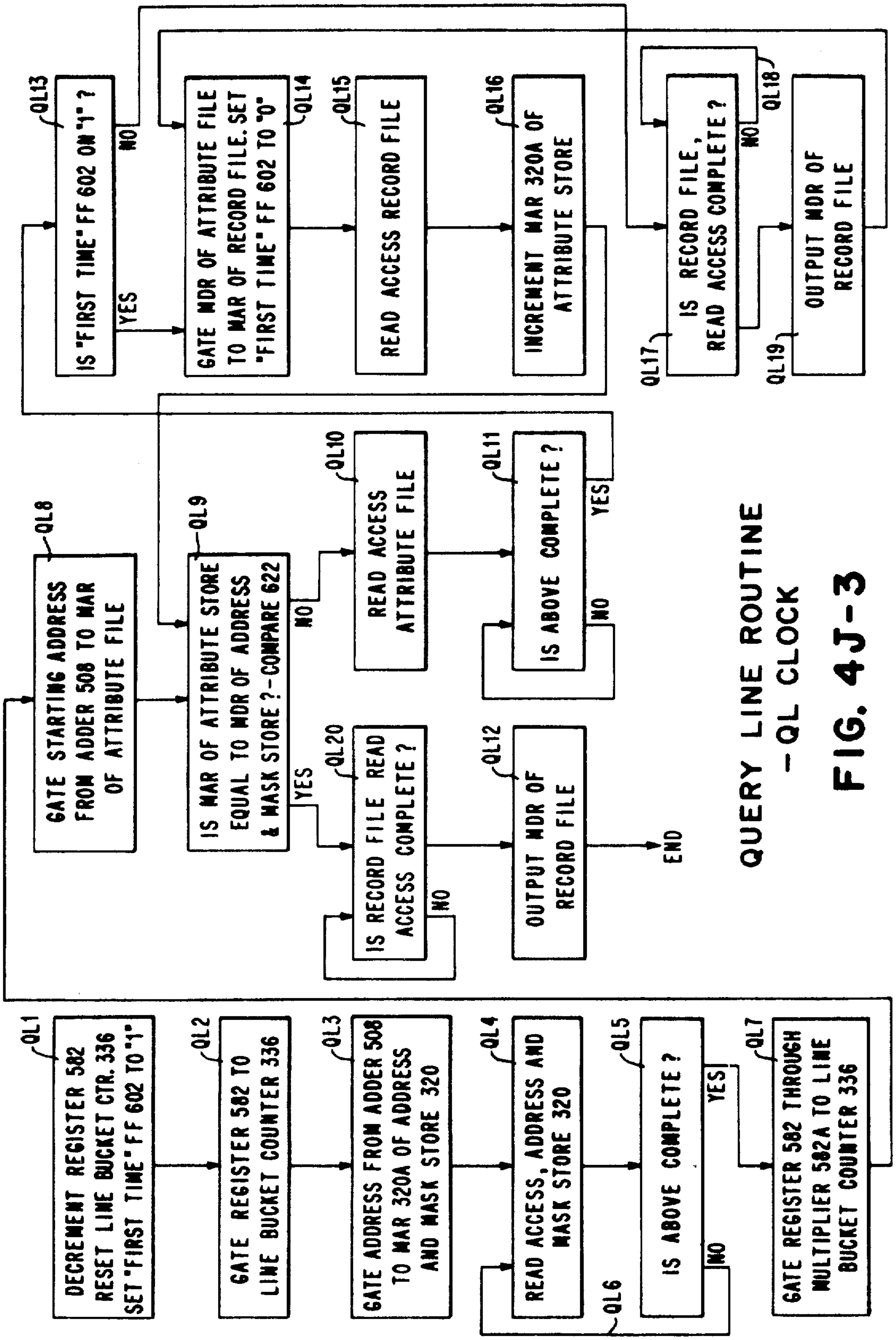
Figure 4K:
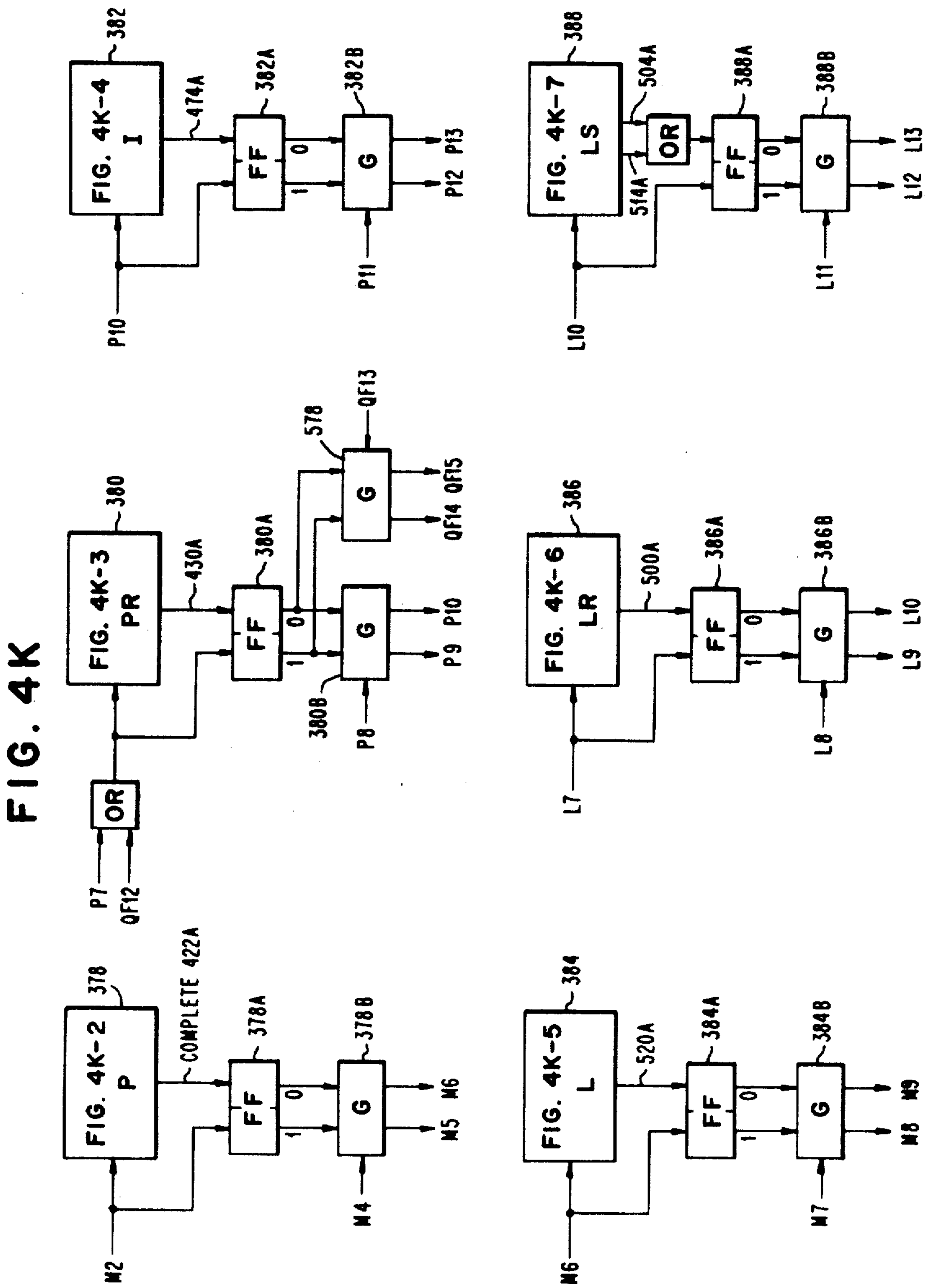
Figures 1, 4K:
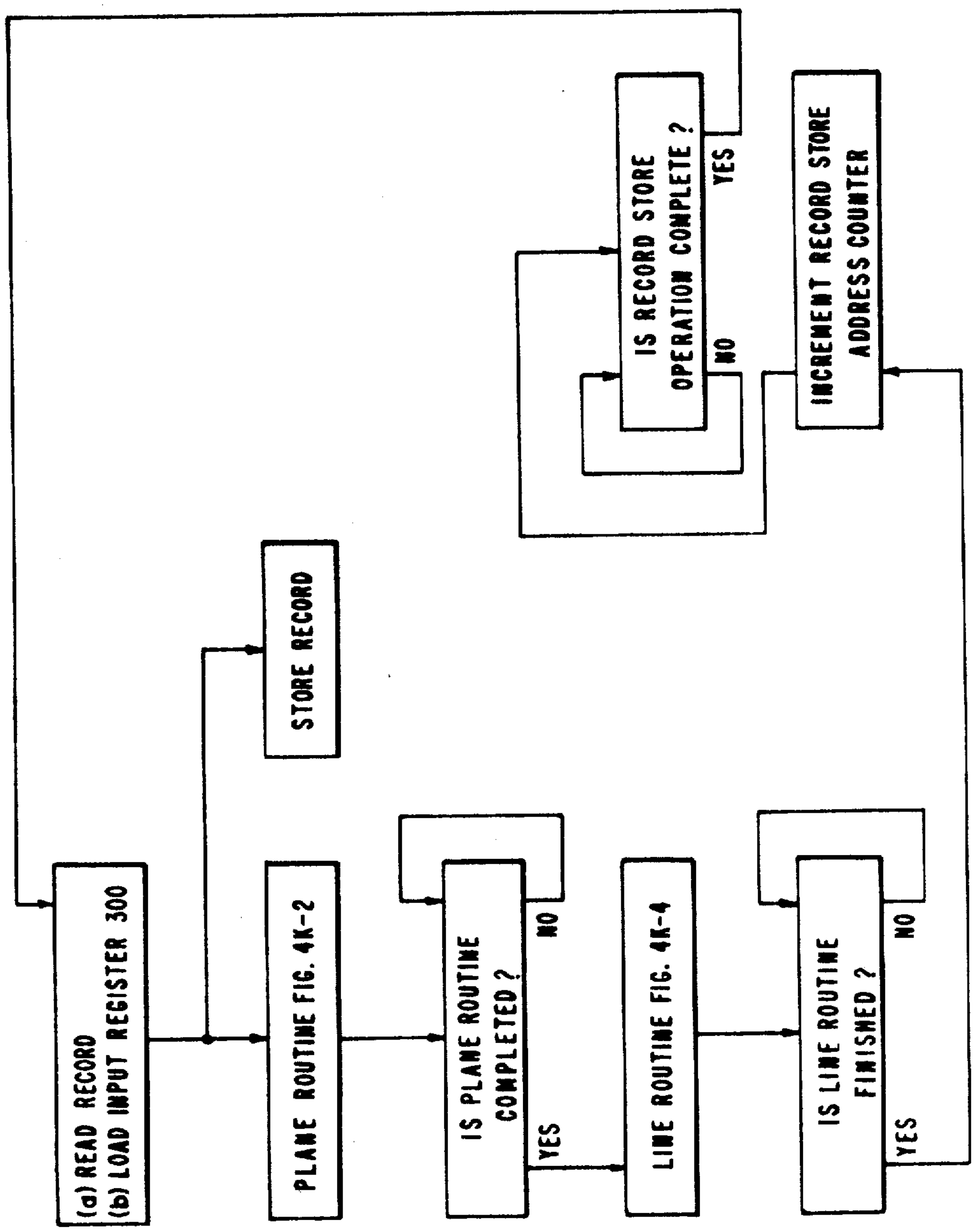
Figures 2, 4K:
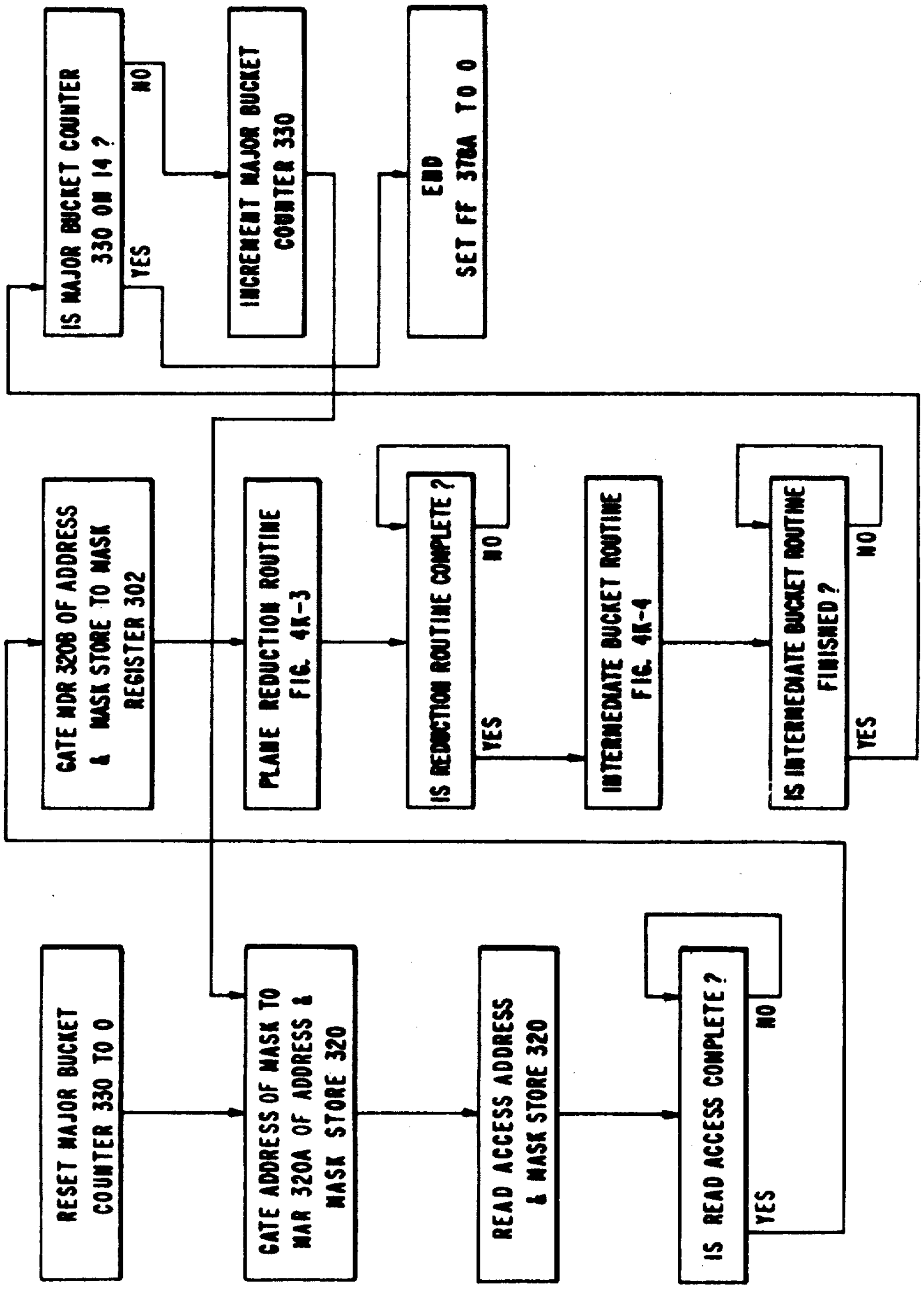
Figures 3, 4K:
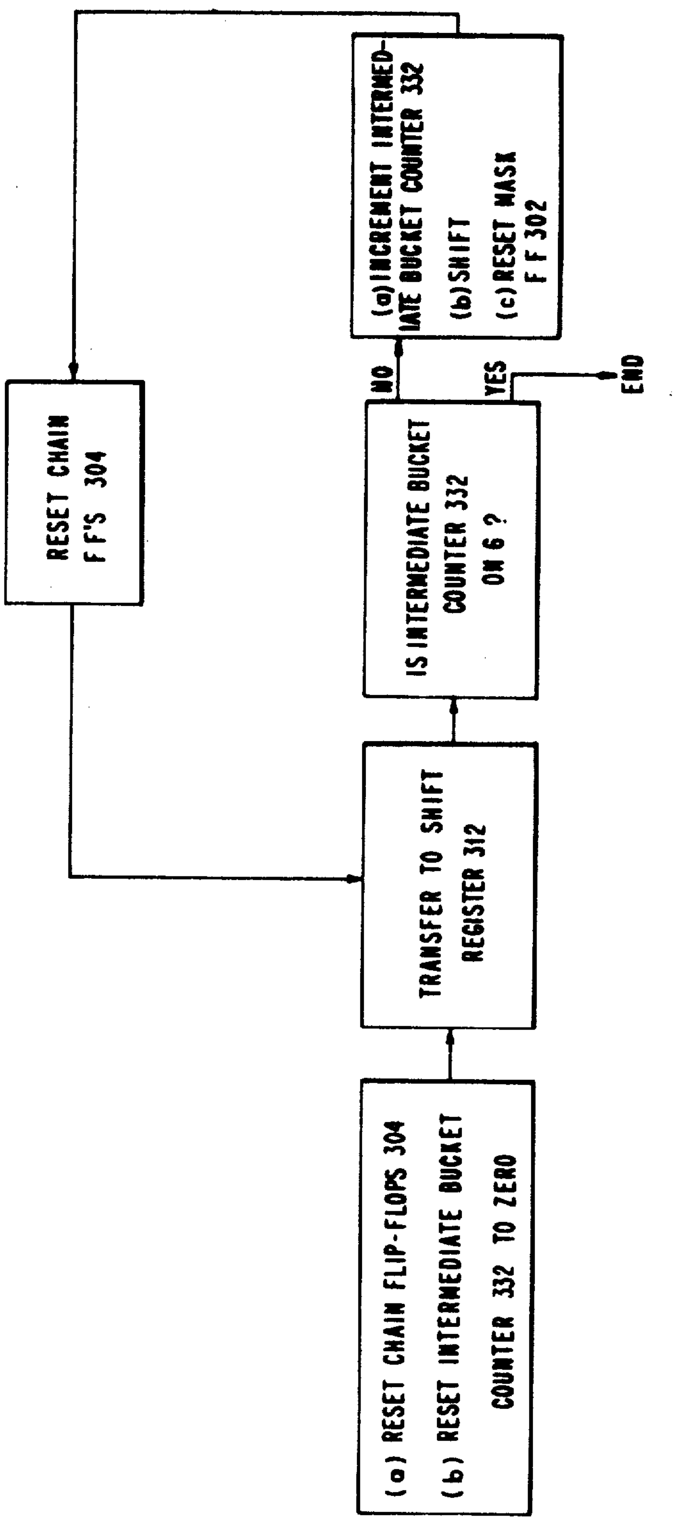
Figures 4, 4K:
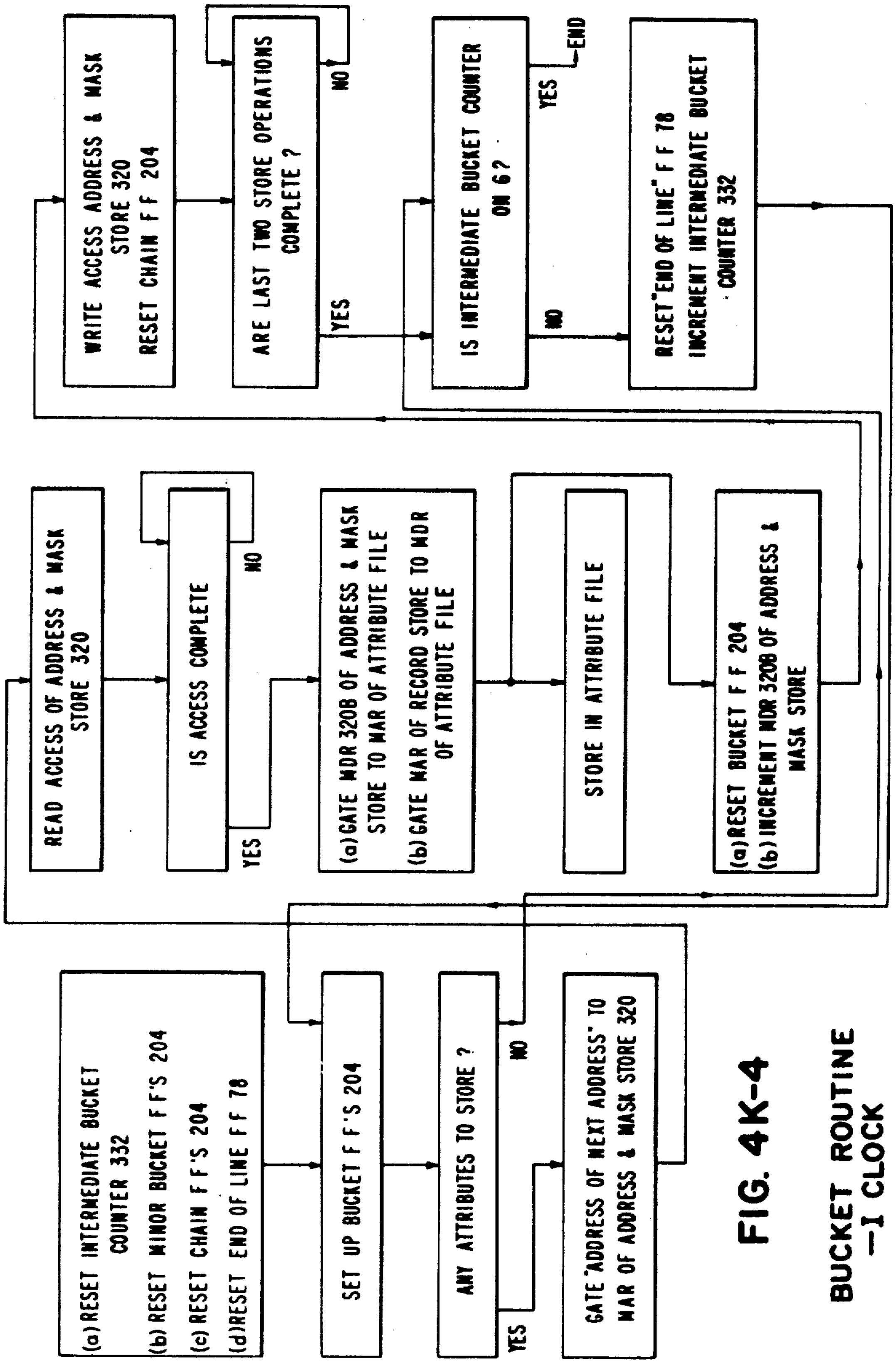
Figures 4, 4K, 5:
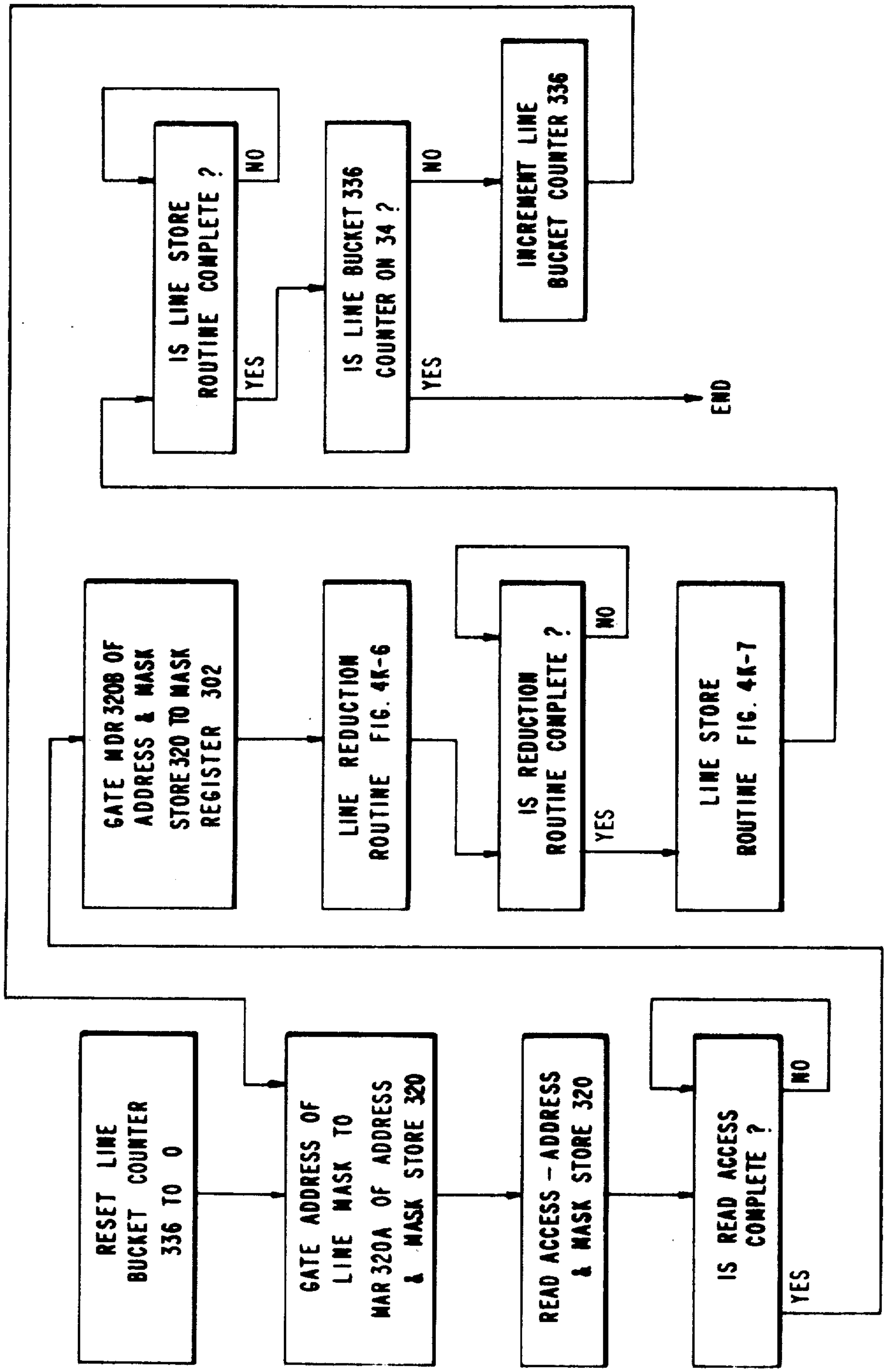
Figures 4, 4K, 5, 6:
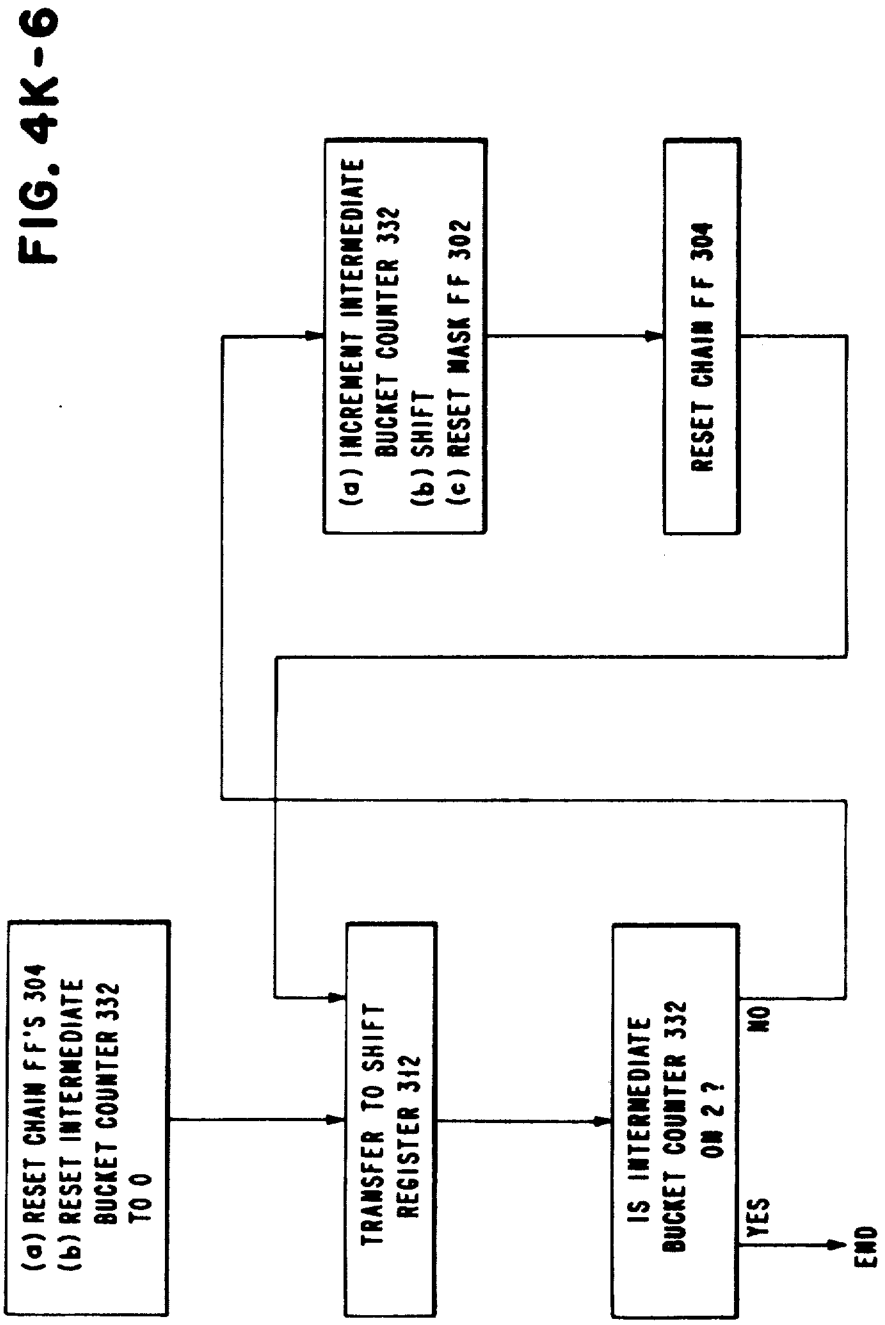
Figures 4, 4K, 5, 6, 7:
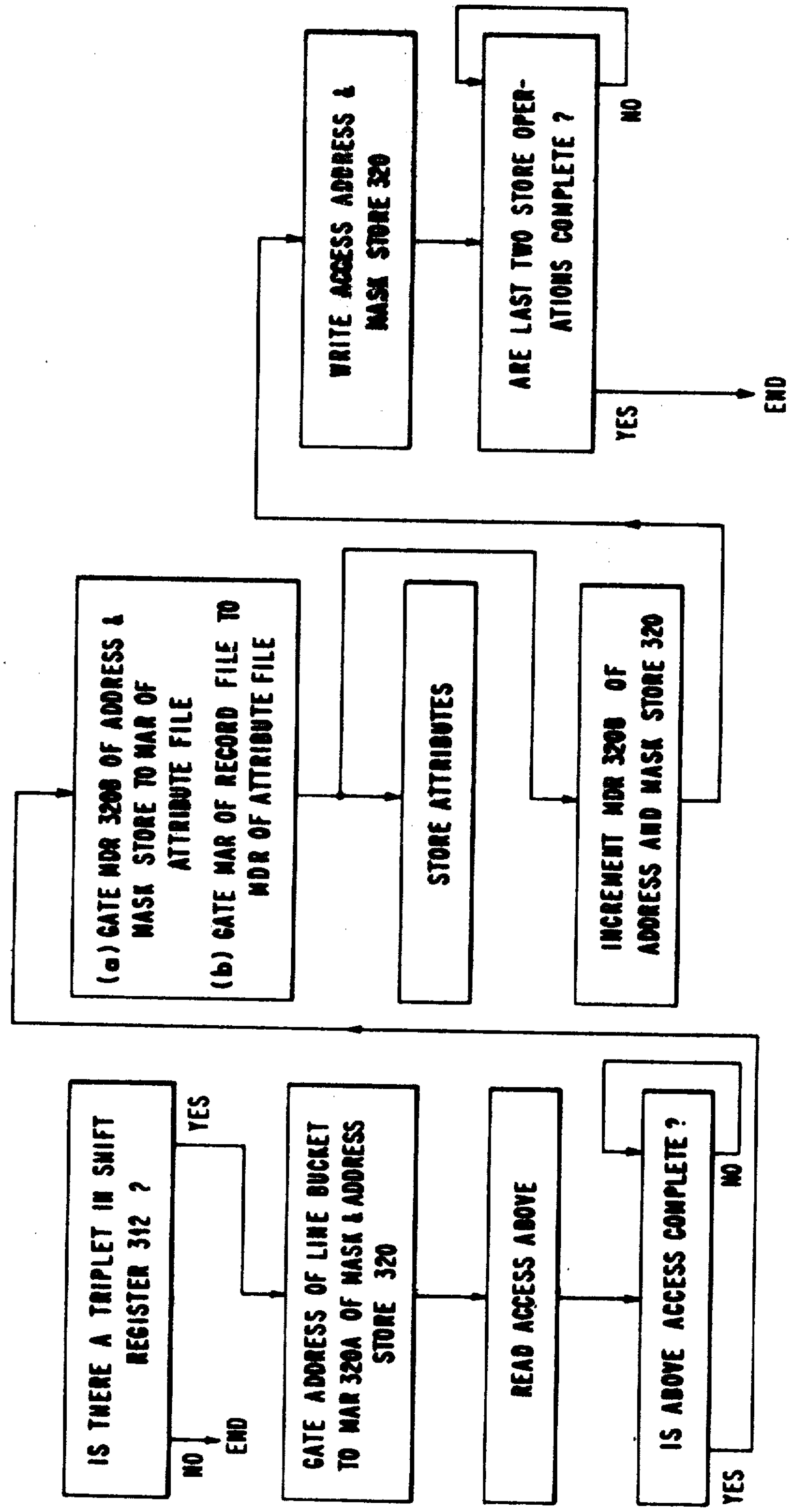

The program control for this query operation is supplied by a program or routine which is shown in FIG. 4J–1 and is termed the query routine. The clock pulses for this rqutine are termed QF pulses. There are also two subroutines for query operations. When the query combination is not on a line, the subroutine shown in FIGS. 4J–2A and 4J–2B is carried out. This subroutine is termed the query intermediate bucket routine, and the clock pulses used are record QI clock pulses. The general block diagram for this routine is shown in FIG. 4J and identified by the block 550. This subroutine also employs the plane reduction subroutine (PR) which was used, as described above, during the store operation.

When the input query is found to be on a line in the geometry and one of the 35 line buckets in the attribute file is to be read out, a query line routine (QL clock pulses) shown in FIG. 4J–3 is employed. The general block diagram for this subroutine is shown at 551 in FIG. 4J.

Each query operation is begun under the control of the query routine shown in FIG. 4J–1.

At the beginning of the query operation, the three binary ones representing the three attributes for the query are stored in appropriate ones of the flip-flops in input register 300. The outputs from these flip-flops are transferred via cable 300C to attribute encoder 220. This encoder is reset by the rise of the QF1 clock pulse and the encoding operation is begun by the fall of this pulse. Encoder 220 encodes the three attributes according to their position in the input register to three 4-bit binary numbers. The first of these numbers is transmitted via cable 220A to four flip-flops 226; the binary number representing the second of the attributes in sequence is transmitted via cable 220B to the four flip-flops 224; and the third attribute encoded in binary form is transmitted via cable 220C to the third group of flip-flops 222. The outputs of these flip-flops are connected in combination to a plurality of EXCLUSIVE OR circuits 552A and 552B. Four of these EXCLUSIVE OR circuits 552B have their outputs connected as inputs to a gate 554 which is activated by the QF2 clock pulse.

These EXCLUSIVE OR circuits determine by modulo 2 addition in each column, whether or not each column contains either zero or two binary ones. If this is the case, no outputs are produced on the output lines of the EXCLUSIVE OR circuits 552B which apply inputs to gate 554. If any one or more of the columns have an odd number of ones, an output is produced from one or more of the EXCLUSIVE OR circuits 552B. The signals transmitted through gate 554 are applied to four flip-flops 556, the binary one outputs of which are applied to an OR circuit 558. The output of OR circuit 558 is fed directly as one input to a gate 560, and is also inverted and applied as a second input to this gate. If one or more of the flip-flops 556 has been set to binary one, an output is produced on line 560A causing a QF4 clock pulse to be produced. This pulse indicates that the three attributes are not on a line. If all of the binary flip-flops 556 are on zero, a pulse is produced on line 560B causing a QF18 clock pulse to be produced. This pulse indicates that the three attributes are on a line.

If the three attributes under consideration are not on a line, and therefore, a pulse is produced on line 560A, the next clock pulse in the sequence is the QF4 clock pulse. This pulse is applied to a gate 562 shown in FIG. 4B. This gate is connected in the output of a determinant solving circuit 564 which has its input connected to the outputs of the three groups of flip-flops 222, 224, and 226. These flip-flops store the three binary numbers representing the three attributes on which the query is made and the determinant solving circuit 564 provides an output indicating which of the 15 planes or major buckets contain the points corresponding to these three attributes. The determinant solving circuit is not shown here in detail. This circuit is similar to the logical circuits shown for solving the determinants in the embodiments of FIGS. 2 and 3. The logic performed by this circuit is based upon the determinant solution of Equation 5 which is set forth above; and since there are four terms in this equation and four others in the binary numbers, the logic required is somewhat more extensive than in the previous embodiments.

Determinant solving circuit 464, therefore, delivers an output between one and 15 according to which of the major buckets has been identified. The number representing the major bucket is transmitted under control of the QF4 clock pulse through gate 562 and entered into a register 566. This register is decremented by the QF5 clock pulse. The purpose of this operation is to put the binary value in the proper form for address arithmetic. The QF6 clock pulse is applied to a gate 570 to gate the decremented value in register 566 to the major bucket number counter 330 in FIG. 4I. Thereafter, the address identification operation is similar to that described above to MAR the address of the proper plane mask. The output of counter 330 is combined with the base address in register 326 by adder 400 and applied to gate 402. The output of adder 400 identifies the address of the location in address and mask store 320 at which the plane mask for the major bucket is stored. This address is gated by the QF7 pulse applied to gate 402 to the MAR 320A for store 320.

A QF8 pulse is then applied in FIG. 4H through OR circuit 410 to initiate a read access operation on store 320 at the address in MAR 320B. This operation transfers the proper 15-bit plane mask, which includes seven binary ones, to MDR 320B from which this mask is transmitted as an input to gate 418 in FIG. 4G. Upon completion of the read access operation, a Q11 pulse is produced at the output of a gate 574 in FIG. 4H, and this pulse is applied through OR circuit 416 to activate gate 418 and enter the plane mask into the flip-flops of mask register 302.

The QF12 clock pulse is then applied to initiate the plane reduction subroutine (PR clock) which is identified by block 380 in FIG. 4K. This subroutine is operated in the same manner as described above for the store operation to form a 7-bit word in shift register 312. The binary values for the word are transferred from input register 300 under the control of the seven binary ones in mask register 302. In this case, three of the flip-flops in shift register 312 contain binary ones. The positions of these binary ones represent the attribute positions in sequence for the plane or major bucket which corresponds to the mask. At the completion of the PR subroutine, a Q15 clock pulse is produced by a gate 578 shown in FIG. 4K. The QF15 clock pulse is applied in FIG. 4J to initiate the QI subroutine represented in this FIG. by block 550. The detailed operation of this subroutine is shown in FIGS. 4J–2A and 4J–2B, and will be described below. Upon completion of the subroutine, a flip-flop 580A in FIG. 4J is set to its binary zero state allowing a signal to be produced on a line 550C which signifies the end of the query operation.

When in the initial portion of the operation under the control of the QF clock described above, the QF3 pulse applied to gate 560 in FIG. 4C produces an output on line 560B, the clock is stepped to QF18. In this case, the three attributes of the query are on a line and, therefore, one of the 35 line buckets in the attribute files must be read out. The QF18 pulse is applied in FIG. 4C to a compare circuit represented by a block 580. There are input lines to this circuit and these lines are taken from the binary flip-flops 226 and 224 which store the binary numbers representing the first two attributes in the sequence. These values are concatenated into an 8-digit binary number. Compare circuit 580 compress this 8-digit binary number with each of 35 8-bit numbers, one for each of the 35 line buckets in the system. It is only necessary to perform this concatenation on two of the attributes since from examination of the tables given above, it can be seen that the first two attributes are different for each of the 35 combinations of three attributes for the line buckets.

The output produced by comparison circuit 580 identifies the line buckets which contain the three attributes. This output is applied as an input to a register 582. The binary number in this register is between 1 and 35, according to which line bucket has been identified. Upon completion of the comparison operation, a flip-flop 584 is set to its binary zero state thereby allowing the QF19 clock pulse which is applied to a gate 586 to produce an output on line 586A to step the clock to QF21. The QF21 clock pulse is applied in FIG. 4J to initiate the query line subroutine represented by block 551. During this subroutine, which will be described below in detail the record file is read out using the proper addresses for the identified line bucket which are obtained from the attribute file. Upon completion of this subroutine, a flip-flop 551A is set to zero allowing the QF22 clock pulse applied to a gate 551B to produce a signal on a line 551C indicating the end of the query operation.

The query intermediate bucket routine (QI clock pulses) will now be described. This routine is necessary when the three attributes on which the query is made have been found not to be on one of the lines of the projective geometry. The addresses for the matching records are stored in Section I of the attribute file. As described above in the description of the query routine, in this event, a QF4 pulse is produced by gate 560 (FIG. 4C); and the QF clock is stepped from QF4 to QF15 to carry out the operations there described. At the time the QF15 pulse is applied, the shift register 312 is storing a 7-bit word with the three binary ones of the query in the proper flip-flops in the register. Major bucket number register 566 in FIG. 4B is storing the binary number for the major bucket decremented by one. The QI15 pulse is applied as described above to block 550 in FIG. 4J to initiate the QI subroutine. The first QI clock pulse resets two flip-flops 600 and 602 (FIG. 4C) to their binary zero state; resets intermediate bucket number counter 332 in FIG. 4E to zero; resets the flip-flops within block 204 to zero; and resets flip-flop 78 to zero.

The QI2 clock pulse is applied in FIG. 4F to AND circuit 114 to gate the output of OR circuit 42 to the *a* subbucket line which is applied as one input to block 204. At the same time, one of the other four subbucket lines receives a signal through gate 44. Signals are transmitted to circuit 204 only if the four flip-flops in shift register 312 then being analyzed include the three binary ones of the query. The combination of flip-flops then being analyzed is controlled by the zero setting in intermediate bucket number counter 332 which activates gate 106-1. The QI3 clock pulse is applied to the circuitry of block 204 to cause a further logical operation to be carried out by the circuitry of this block. The next following QI4 clock pulse is applied to a gate 604 in FIG. 4F. If at this time flip-flop 78 is in its binary zero state, a QI5 output is produced and if flip-flop 78 is in a one state, a QI22 output is produced. The state of flip-flop 78 is determined by the state of the four flip-flops in shift register 312 analyzed under control of gate 106-1. If these flip-flops include the three binary ones of the query, the QI3 clock pulse applied to block 204 causes an output to be produced on an appropriate one of the output lines extending to the right of this block. If not, then the query combination is not in the first bucket of this major bucket; and the QI3 pulse sets flip-flop 78 to its one state. This results in the QI22 pulse, the significance of which will later be explained.

It is here assumed that the query combination is in the first bucket and the clock is stepped to QI5. The QI5 clock pulse is applied in FIG. 4C to set flip-flops 600 and 602 to their binary one states. The next following QI6 clock pulse is applied to gate 350 in FIG. 4I to gate the output of adder 340 to MAR 320A. This adder at this time, in the manner described above for the store operation, responds to its four inputs to produce the location in store 320 at which the next empty address for the first bucket in this major bucket is stored. The QI7 pulse is applied through OR circuit 410 to initiate a read access operation and transfer the proper address from store 320 to MDR 320B. Upon completion of this operation, the clock is stepped to QI10 through a gate 610 activated by a QI8 pulse in FIG. 4H which together with flip-flop 412 tests to see if the read access operation is complete.

The QI10 pulse is applied to a gate 612 in FIG. 4I to gate the output of adder 340 to a circuit represented by block 614 which computes the starting address for the particular subbucket which has been selected in the attribute store. At this time, adder 340 is standing at a value which corresponds to the address of the next empty address for that subbucket in mask store 320. The computation carried out at block 614 is based upon the formatting of the file in accordance with which a 100 locations are allocated to each subbucket in Section I and line bucket in Section II of the attribute store. Therefore, the value of adder 340 is multiplied by a 100; and from this product 99 is subtracted. This computation is carried out during the time provided by the QI11 clock pulse. The output address is the starting address in the attribute file for the subbucket which is to be read out. The QI12 clock pulse is applied to a gate 620 shown in FIG. 4H to determine whether the output of compare circuit 622 is on equal or unequal. One input to this compare circuit is applied via a cable 622A and is the address in the MDR 320B which is the next empty address for the subbucket on which the query operation is being carried out. The other input to the compare circuit is applied via a cable 622B, and this input is obtained from the MAR of the attribute file and represents the address in the attribute file on which the next read access operation is to be performed. At this time, no read access operation has yet been carried out, and the value of the MAR of the attribute file is the starting address which was transmitted after the result of computation within block 614 during QI11 time. If at this time a combination is indicated by the compare circuit, it indicates that the starting address for the subbucket corresponds to the next empty address. There are then no record addresses in the attribute file in this subbucket and therefore no records in the record file matching the query. In such a case, an output is produced to step the QI clock to QI20.

At present, it is assumed that compare circuit 622 is provided with an unequal output and that the output from gate 620 steps the clock to QI13. The QI13, QI14 and QI15 clock pulses are allocated to control the read access operation in the attribute file. Upon completion of this operation, the clock is stepped to QI16; and this pulse is applied to a gate 602A in FIG. 4C to test the state of flip-flop 602. This flip-flop is now on binary one as a result of the QI5 clock pulse which was applied since the query was satisfied for the first bucket (test under control of gate 106-1). Therefore an output is now produced from gate 602A to step the clock to QI17. The QI17 pulse gates the MDR of the attribute file (not sown) to the MAR of the record file (not shown). This pulse is also applied to reset flip-flop 602 to its binary zero state. The QI18 clock pulse initiates a read access operation in the record file. The QI19 clock pulse increments the MAR of the attribute file and also steps the clock back to initiate another series beginning with the QI12 clock pulse.

The QI12 clock pulse is again applied to FIG. 4H to test whether or not a comparison is indicated by compare circuit 622. The comparison is here on the newly incremented value in the MAR of the attribute file. If no comparison is indicated, the operations described above to read access the attribute file and then the record file are carried out; and the MAR of the attribute file is again incremented. During the second and each succeeding one of these operations to read an address out of the attribute file, the QI clock pulse series is different than for the first such operation. The clock in the second and succeeding operations branches when the QI16 pulse is applied to gate 602A in FIG. 4C and a AI25 clock pulse is produced, since at this time flip-flop 602 is in its binary zero state The QI25, QI26 and QI27 clock pulses are employed to test for completion of the read access operation in the record store and to transfer the record read out to the output circuitry Upon completion of this operation, the clock reverts to the QI17 clock pulse to cause the MDR of the attribute file to be read out and the value therein transferred to the MAR of the record file in anticipation of the read out of another record. This cycle conditions until a comparison is achieved in compare circuit 622 causing gate 620 to produce a QI20 output when clock pulse QI12 is applied. A series of clock pulses is now begun to initiate the read out operation controlled by the *a* subbucket of the bucket which has been identified. The QI20 and QI21 clock pulses are applied to the logical circuitry of block 204 in FIG. 4F to reset flip-flops within this block and upon completion of this operation, only the flip-flop for the *a* subbucket is set in binary one The clock then branches to a QI28 clock pulse and this clock pulse and the QI29 and QI30 clock pulses are employed to test to see if the last read access operation in the record file has been completed and to control the transfer of the record obtained from this file to the output circuit.

The QI clock then branches back to QI3 to begin the query operation for the *a* subbucket under the control of the flip-flop in block 204 in FIG. 4F. Flip-flop 78 is at binary zero; and the next succeeding QI4 clock pulse, which is applied to gate 604, steps the clock to QI5 to begin the series of operations necessary to read out subbucket *a* in the attribute file. These operations are the same as described above, and the readout continues until a compare indication is provided by compare circuit 622 in FIG. 4H. The next succeeding QI12 clock pulse applied to gate 620 then steps the clock to QI20.

The QI20 and next following QI21 clock pulses reset the last remaining flip-flops (for the *a* subbucket) in block 204 to zero. As before, the clock then steps to QI28 and this clock pulse and the QI29 and QI30 pulses are employed to test for completion of the record store, and to transfer the record read out of this file to the output circuit. The operation described above is repeated, and the clock is stepped back to the QI3 clock pulse which is applied through the logical circuitry of block 204 in FIG. 4F to reset flip-flop 78 to one. The next following QI4 clock pulse applied to gate 604 then steps the clock to QI22. The QI22 clock pulse is applied to gate 600A in FIG. 4C. At this time, flip-flop 600 is in its binary one state, since the prior operations found the query to be satisfied for the first bucket. Therefore, the output from gate 600A indicates the end of this subroutine. This output is transmitted via a line 600B to reset flip-flop 550A (FIG. 4J) to zero. The program then reverts to the query routine (QF clock pulses) and the QF16 pulse produces an output on line 550C to indicate that the query operation has been completed.

In the operation above described, it was assumed that the three binary ones representing a query were present in the leftmost four of the flip-flops of shift register 312 in FIG. 4E. The query operation was carried out on the first bucket when gate 106–1 was activated under control of the value transmitted from intermediate bucket counter number 332 through decoder 434. If the binary ones are in other positions of the shift register, it is necessary to step the intermediate bucket number counter to activate the remaining gates 106–2 through 106–7 serially and to apply the subroutine clock pulses through clock pulse QI4. The QI4 pulse determines whether the query is satisfied by the bucket corresponding to the gate then activated. If the QI4 pulse applied to gate 604 in FIG. 4F produces a QI22 output, no QI5 pulse is produced and flip-flop 600 in FIG. 4C remains in its binary zero state until the query is satisfied by the signals transmitted through one of the gates 106–2 through 106–7.

When the query is found to be satisfied, the QI5 pulse is produced; and the operation is as described above. After each such operation when the query is not satisfied, intermediate bucket counter 332 is incremented by a QI24 clock pulse. This pulse also resets flip-flop 78 to prepare the circuit for the test on the next bucket under control of the appropriate one of the gates 106–1 through 106–7. The intervening QI23 clock pulse is applied to a gate 630 in FIG. 4F. This pulse tests to see if intermediate bucket number counter 332 is on six before it is incremented. This test will not be necessary if a proper word including three binary bits has been entered into shift register 312, and the circuit operation through block 204 has been carried out. In such a case, the query will have been found to have satisfied for one of the seven operations controlled by gates 106–1 through 106–7. If however, the query has not been satisfied during any one of these operations, an error signal is provided at the output of gate 630 when the QI23 pulse is applied.

For normal operation, however, the query will be satisfied by one of the operations carried out under control of gates 106–1 through 106–7. Upon completion of the read out of the appropriate one of the *b*, *c*, *d* or *e* subbuckets and the *a* subbucket of the attribute file, and of the matching records from the record file, the end of the QI subroutine is indicated on line 600B in FIG. 4C. The signal on this line, as described above, resets flip-flop 550A in FIG. 4J to step the query clock to QF17.

The QI subroutine described above is carried when the three attributes in the query correspond to points which are not on a line with the geometry. When the attribute query is on a line, the query routine (QF clock pulses) are applied as described above. The QF3 clock pulse applied to gate 560 in FIG. 4C then produces an output on line 560B to step the Q clock to the QF18 clock pulse. This pulse is applied to compare circuit 580 to obtain the number of the line bucket matching the query, and this number is entered into register 582. Upon completion of this operation, an output is realized from gate 586A which is applied in FIG. 4J to initiate the query line subroutine represented in that FIG. by block 551.

This routine begins with the application of the QL1 clock pulse clock pulse decrements register 582 (FIG. 4C), resets line bucket counter 336 (FIG. 4I) to zero, and sets flip-flops 600 and 602 in FIG. 4C to one. The next following QL2 clock pulse is applied to a gate 671 (FIG. 4C) and gates the value in register 582 to line bucket number counter 336. The QL3 clock pulse is applied to a gate 678 in FIG. 4I to gate the address then present in adder 508 to the MAR 320A of store 320. The address obtained from adder 508 is the location at which the next empty address for the identified line bucket is stored in store 320. This address is calculated by adding the line bucket number in counter 336 to the base address in register 324. The QL4 clock pulse is applied through OR circuit 410 to initiate a read access operation in store 320. This operation transfers the next empty address from the store to MDR 320B. Upon completion of the store operation, an output is obtained from a gate 670 to step the clock to QL7.

The QL7 pulse is applied to a gate 674 in FIG. 4C to transfer the value in register 582 (the line bucket number decremented by one) to an address computation circuit 582A. Circuit 582A multiplies the value received from register 582 by 100 and adds 51975 to the product. This operation is carried out during the time provided by the QL7 clock pulse and the value is transmitted from circuit 582A to counter 336 in FIG. 4I. The value computed in circuit 582A is then added in adder 508 to the line bucket base address (register 324) to determine the starting address in the attribute file for the identified line bucket.

The starting address is transferred by the QL8 clock pulse applied to gate 678 to the MAR of the attribute file. This address is also transmitted via a cable shown in FIG. 4H to compare circuit 622. The QL9 clock pulse is applied to a gate 680 to test the output of the compare circuit to determine whether the starting address then in the MAR of the attribute file matches the next empty address then in the MAR 320A for address and mask store 320. If this is the case, there are no records in the record file which match the query, and this clock is stepped to QL20. If there are records in the file, the QL10 clock pulse is produced by gate 680; and this pulse and the following QL11 and QL12 pulses are employed to perform a read access operation on the attribute file (not shown).

Upon completion of this operation, the QL13 clock pulse is applied to a gate 602B in FIG. 4C to test the state of flip-flop 602. This flip-flop is now at one; therefore, an output is produced from gate 602B to step the clock to QL14. The QL14 and QL15 clock pulses are employed to produce a readout operation in the record file under the control of the record address previously read out of the attribute file. The QL14 clock pulse also resets flip-flop 602 in FIG. 4C.

The QL16 clock pulse increments the MAR of the attribute file to the next address in the line bucket. This incremented address is transferred to compare circuit 622 in FIG. 4H and the clock is reverted to the QL9 clock pulse which is applied to gate 680 to test for a comparison. If a comparison is indicated, the clock is stepped to QL20. If not, the clock is stepped to QL10; and the operations described above are repeated to read the next record address out of the attribute file. Upon completion of this operation, the QL13 clock pulse applied to gate 602B in FIG. 4C steps the clock to QL17, and this pulse and the next following pulse QL18 and QL19 test to see if the previously initiated read access operation in the record file has been completed. Upon completion of this operation, the record readout of file is transferred to the output circuit. The clock is then stepped back to QL14 which prepares the circuitry for another readout operation in the record file by transferring the address in the MDR of the attribute file to the MAR of the record file. These operations continue in the manner described above to read out all of the matching records from the record file at which time a comparison output is produced by compare circuit 622 in FIG. 4H. The output of gate 680 then steps the clock to QL20, and this pulse and the next following QL21 pulse test for completion of the last readout operation in the record file. The next following QL22 clock pulse reads this record from the MDR of the record file to the output circuitry and is also applied in FIG. 4J to reset flip-flop 551A to zero signifying the end of the QL subroutine. Gate 551B under the control of the query clock pulse QF22 then produces an output on line 441C which signifies the end of the query routine.

General Summary

In the description above of the fourth embodiment, the determinant solving circuit 564 is employed to provide an output indicating the major bucket which includes the query combination. The output is a 4-bit output and is derived from the input of three 4-bit numbers applied to circuit 564. Each of these 4-bit binary numbers represents the four coordinates for a corresponding one of the attributes. The circuit 564 provides a solution of Equation 5 above for these three binary numbers. This equation and the determinants for each of the four terms are shown in the table below. The logical expression, in Boolean form, for the first determinant ($a_0$) is also shown. The logical pattern for solving the other three determinants is the same. In this table, the unprimed $x$'s are the binary values for the lowest of the three attribute numbers, the single primed $x$'s correspond to the second attribute, and the double primed $x$'s are for the third attribute.

The table also sets forth the binary numbers used to identify the various major buckets. These binary numbers are not in the same sequence as the bucket designations B–1 through B–15 given in the table included in the initial portion of the description for the fourth embodiment. Thus, the first major bucket in this binary sequence is B–4; the second is B–3; the third is B–10, etc. In keeping with the address arithmetic employed, this is the order in which the plane masks as well as the major buckets are arranged in the address and mask store and in the attribute file.

Equation 5

$$a_0x_0 + a_1x_1 + a_2x_2 + a_3x_3 = 0$$

$$a_0 = \begin{vmatrix} x_1 & x_2 & x_3 \\ x_1' & x_2' & x_3' \\ x_1'' & x_2'' & x_3'' \end{vmatrix}$$

$$a_1 = \begin{vmatrix} x_0 & x_2 & x_3 \\ x_0' & x_2' & x_3' \\ x_0'' & x_2'' & x_3'' \end{vmatrix}$$

$$a_2 = \begin{vmatrix} x_0 & x_1 & x_3 \\ x_0' & x_1' & x_3' \\ x_0'' & x_1'' & x_3'' \end{vmatrix}$$

$$a_3 = \begin{vmatrix} x_0 & x_1 & x_2 \\ x_0' & x_1' & x_2' \\ x_0'' & x_1'' & x_2'' \end{vmatrix}$$

$$\begin{aligned} a_0 = \; & (x_1((x_2'x_3'')\veebar(x_3'x_2''))) \\ & \veebar(x_1'((x_2x_3'')\veebar(x_3x_2''))) \\ & \veebar(x_1''((x_2x_3')\veebar(x_3x_2'))) \end{aligned}$$

BINARY IDENTIFICATION NUMBERS FOR MAJOR BUCKETS

| | | |
|---|---|---|
| B1–1000 | B6–1010 | B11–1110 |
| B2–0100 | B7–1001 | B12–1101 |
| B3–0010 | B8–0110 | B13–1011 |
| B4–0001 | B9–0101 | B14–0111 |
| B5–1100 | B10–0011 | B15–1111 |

Logical circuitry using AND and EXCLUSIVE OR circuits of the types shown in detail in the embodiments of FIGS. 2 and 3 can be employed within circuit 564. The logical circuitry is evident from the Boolean expression in the above table.

However, as will be obvious to one skilled in the art, it is not necessary that special purpose circuitry be employed for this function or for many of the other functions required by the inventive method. The logical and arithmetical circuitry available in the CPU of data processing systems of the type which may be used to carry out the inventive method may be controlled to perform the same function as the logical circuitry shown. This holds true not only for circuit 564, but for the other multiplier and arithmetic circuitry shown in the embodiments. Separate multipliers are not required, nor are special address computation circuits. Special circuitry of this type, of course, can speed up the operation; but the method can be practiced by controlling the CPU to carry out the required computations.

The same equivalency follows for the various registers and counters shown in the circuits for the four embodiments. The values in these units may be stored at appropriate address locations in the memory of the machine and the information obtained from the memory and used as is, or after incrementation or decrementation as required by the step of the method then being performed.

In the embodiments described herein, the records are stored separately in the record file and the addresses for these records in the attribute file. The reason for this is that, in most applications, the records are lengthy; and therefore, it is preferable to avoid the necessity of redundantly storing the records in the attribute file. This is so even where, as here, the attribute file is so organized as to minimize the redundancy of storage. In some cases, however, where either the entire record is small or only a portion of the record need be retrieved, the records themselves or that portion of the record which is to be retrieved may be stored in the attribute file. Therefore, in the practice of the method, the attribute file will include some record information This record information will be the address of the record if stored completely in another file, or the record information may be a portion of the record or the record in its entirety In other applications, it may be necessary to retrieve only the number of records matching a particular query and not the records themselves. This number is readily available in the form of the starting and next empty addresses for the subbuckets in the attribute file.

While the invention has been particularly shown and described with reference to preferred embodiments thereof, it will be understood by those skilled in the art that the foregoing and other changes in form and details may be made therein without departing from the spirit and scope of the invention.

We claim:

1. The method of operating a data processing machine to store a plurality of records each having a number of attributes in a file from which the records can be retrieved in response to queries specifying particular combinations of said attributes, comprising the steps of:

a. storing the records in an addressable memory file of the machine;
b. storing the addresses of the stored records in a plurality of buckets at different locations in said memory file with each of said buckets having stored therein the addresses for all those records that include at least one particular combination of at least two of said attributes; and
c. retrieving records from said file by applying queries specifying particular combinations of attributes to circuitry within said machine which specifies the locations in the memory file of the addresses of those records which satisfy the particular queried combinations;

wherein said queries specify particular combinations of $k$ attributes, where $k \geqq 2$, and at least some of the buckets include the addresses for all of the records that include $k$ attributes out of a unique set of $k+1$ attributes, and each address is stored only once in each such bucket, wherein each such bucket includes $k+2$ subbuckets and with the addresses of all records which include all of the $k+1$ attributes for the bucket being stored in one subbucket and all of the addresses for the remaining records that include one of the $k+1$ unique combinations of $k$ only of the $k+1$ attributes for that bucket being stored in a corresponding one of the remaining subbuckets, and wherein, when one of the queries applied to said circuitry in said machine specifies a particular combination of $k$ attributes of the unique set of $k+1$ attributes for one of such buckets, the method includes the step of reading out both the one subbucket which stores the addresses of all of the records that include the unique set of $k+1$ attributes for that bucket and the one of the remaining sub-buckets which stores the addresses of the records that include the particular combination of $k$ attributes specified by the query.

2. The method of claim 1 including the step of controlling said machine to first encode each of the particular attributes, which are combined into the query, into signals representing a multiorder binary value, and applying said signals representative of said encoded binary values to circuitry within the machine which uniquely specifies the locations in the memory file of the addresses of those records which satisfy the particular queried combination.

3. The method of claim 2 wherein each of the $k$ multiorder binary values encoded by the machine for each query correspond to the coordinates for a point in a particular finite geometry, and the $k$ points corresponding to the query satisfies at least one linear equation for that geometry.

4. The method of claim 2 wherein the $k$ multiorder binary values correspond to at least certain of said queries represent $k$ points on a single line in said geometry.

5. The method of claim 4 wherein the single line represented by the $k$ points in said geometry includes a further point, said further point corresponding to a different multiorder binary value representing a different attribute, the attributes for said $k$ points and said further point corresponding to the unique set of $k+1$ points for one of said buckets.

6. The method of claim 3 wherein the linear equation satisfied by the $k$ multiorder binary values corresponding to certain queries is an equation for a plane in said finite geometry.

7. A method of arranging a group of records, each having attributes, into the memory file of a data processing machine from which all records identified by any unique one of a plurality of $l!/(l-k)\ (k)!$ possible combinations of $k$ of the $l$ attributes can be retrieved in response to a query identifying one of the unique combinations of $k$ attributes, where $l \geqq k \geqq 2$ said method comprising the steps of:

a. storing the records in an addressable memory file of the machine;
b. and storing the addresses for the stored records in a group of buckets in the memory file of the machine with each of a plurality of said buckets having stored therein the addresses for all records including combinations of at least $k$ attributes of a unique set of $k+1$ of the $l$ attributes, and no set of $k$ of the attributes being common to any one of the unique sets of $k+1$ of the $l$ attributes for each bucket;
c. including the step of arranging the addresses within each bucket in said plurality into $k+2$ subbuckets, with the addresses of all records which include all of the $k+1$ attributes for the bucket being stored in one subbucket, and all of the addresses for the remaining records that include one of the $k+1$ unique combinations of $k$ only of the $k+1$ attributes for that bucket being stored in a corresponding one of the remaining subbuckets.

8. The method of claim 7 wherein $l=7$, $k=2$, and the addresses for said records are stored in seven buckets, each of which includes four subbuckets.

9. The method of claim 7 wherein $l=8$, $k=3$, and the addresses for all of said records are stored in 14 buckets each of which includes five subbuckets.